US008263143B2

(12) United States Patent
Soper et al.

(10) Patent No.: US 8,263,143 B2
(45) Date of Patent: *Sep. 11, 2012

(54) DEGRADABLE CHEWING GUM

(75) Inventors: Paul D. Soper, Beaconsfield (GB); Vesselin Danailov Miladinov, Denville, NJ (US); Jose A. Amarista, Morristown, NJ (US); Ian Smith, Reading (GB); Carole Elleman, Reading (GB); Mark Taylor, Reading (GB); Nigel Kenneth Harry Slater, Sutton Coldfield (GB); Mark Edward Eccleston, Bishops Stortford (GB)

(73) Assignee: Kraft Foods Global Brands LLC, Northfield, IL (US)

(*) Notice: Subject to any disclaimer, the term of this patent is extended or adjusted under 35 U.S.C. 154(b) by 1083 days.

This patent is subject to a terminal disclaimer.

(21) Appl. No.: 11/546,476

(22) Filed: Oct. 11, 2006

(65) Prior Publication Data

US 2007/0104829 A1    May 10, 2007

Related U.S. Application Data

(63) Continuation-in-part of application No. 11/508,020, filed on Aug. 22, 2006, and a continuation-in-part of application No. 11/283,331, filed on Nov. 18, 2005, and a continuation-in-part of application No. 11/283,217, filed on Nov. 18, 2005, said application No. 11/546,476 is a continuation-in-part of application No. PCT/US2006/032849, filed on Aug. 22, 2006, and a continuation-in-part of application No. PCT/US2006/032851, filed on Aug. 22, 2006.

(60) Provisional application No. 60/816,180, filed on Jun. 23, 2006, provisional application No. 60/710,064, filed on Aug. 22, 2005, provisional application No. 60/710,341, filed on Aug. 22, 2005.

(51) Int. Cl.
*A23G 4/08* (2006.01)
(52) U.S. Cl. .............................. 426/6; 426/3
(58) Field of Classification Search .................. 426/3, 4, 426/5, 6
See application file for complete search history.

(56) References Cited

U.S. PATENT DOCUMENTS

| | | | |
|---|---|---|---|
| 25,959 A | 11/1859 | Duckworth |
| 194,008 A | 8/1877 | Stadler |
| 2,076,112 A | 4/1937 | Barker |
| 2,922,747 A | 1/1960 | Scanlan |
| 3,356,811 A | 12/1967 | Cushing et al. |
| 3,492,131 A | 1/1970 | Schlatter |
| 3,736,274 A | 5/1973 | Schoenholz et al. |
| 3,761,429 A | 9/1973 | Yamano et al. |
| 3,974,293 A | 8/1976 | Witzel |
| 3,984,574 A | 10/1976 | Comollo |
| 4,032,661 A | 6/1977 | Rowsell et al. |
| 4,136,163 A | 1/1979 | Watson et al. |
| 4,187,320 A | 2/1980 | Koch et al. |
| 4,230,688 A | 10/1980 | Rowsell et al. |
| 4,241,090 A | 12/1980 | Stroz et al. |
| 4,241,091 A | 12/1980 | Stroz et al. |
| 4,271,197 A | 6/1981 | Hopkins et al. |
| 4,279,931 A | 7/1981 | Verwaerde et al. |
| 4,306,989 A | 12/1981 | Motsenbocker |
| 4,352,822 A | 10/1982 | Cherukuri et al. |
| 4,352,823 A | 10/1982 | Cherukuri et al. |
| 4,357,355 A | 11/1982 | Koch et al. |
| 4,378,374 A | 3/1983 | Reggio et al. |
| 4,387,108 A | 6/1983 | Koch et al. |
| 4,446,157 A | 5/1984 | Boden et al. |
| 4,452,820 A | 6/1984 | D'Amelia et al. |
| 4,459,425 A | 7/1984 | Amano et al. |
| 4,479,969 A | 10/1984 | Bakal et al. |
| 4,497,832 A | 2/1985 | Cherukuri et al. |
| 4,518,615 A | 5/1985 | Cherukuri et al. |
| 4,533,487 A | 8/1985 | Jones |
| 4,552,692 A | 11/1985 | Gillespie |
| 4,582,707 A | 4/1986 | Calabro |
| 4,619,834 A | 10/1986 | Zanno et al. |
| 4,627,977 A | 12/1986 | Gaffar et al. |
| 4,647,450 A | 3/1987 | Peters et al. |
| 4,721,620 A | 1/1988 | Cherukuri et al. |
| 4,794,003 A | 12/1988 | Cherukuri et al. |
| 4,863,745 A | 9/1989 | Zibell |
| 5,037,924 A | 8/1991 | Tazi et al. |
| 5,045,325 A | 9/1991 | Lesko et al. |
| 5,080,821 A | 1/1992 | Lutringer |
| 5,087,459 A | 2/1992 | Chuu et al. |
| 5,116,626 A | 5/1992 | Synosky et al. |
| 5,156,866 A | 10/1992 | Sato et al. |
| 5,227,154 A | 7/1993 | Reynolds |

(Continued)

FOREIGN PATENT DOCUMENTS

EP         0065381        11/1982

(Continued)

OTHER PUBLICATIONS

U.S. Appl. No. 11/283,217 Advisory Action dated: May 27, 2009 (3 pages).
U.S. Appl. No. 11/283,217 Final Office Action dated: Mar. 18, 2009 (11 pages).
U.S. Appl. No. 11/283,217 Non-Final Office Action dated Jul. 29, 2008 (12 pages).
U.S. Appl. No. 11/283,217 Non-Final Office Action dated: Aug. 31, 2008 (11 pages).
U.S. Appl. No. 11/283,331 Advisory Action dated: Jun. 5, 2009 (3 pages).
U.S. Appl. No. 11/283,331 Final Office Action dated: Mar. 31, 2009 (20 pages).

(Continued)

*Primary Examiner* — Nikki H Dees
(74) *Attorney, Agent, or Firm* — Cantor Colburn LLP

(57) ABSTRACT

The present invention provides gum base compositions and chewing gum compositions having non stick or reduced-stick properties and/or increased degradability. Methods of preparing the gum base and chewing gum compositions, as well as methods of use, are provided.

17 Claims, 23 Drawing Sheets

U.S. PATENT DOCUMENTS

| | | | |
|---|---|---|---|
| 5,266,336 A | 11/1993 | McGrew et al. | |
| 5,266,592 A | 11/1993 | Grub et al. | |
| 5,277,154 A | 1/1994 | McDowell | |
| 5,286,501 A | 2/1994 | Song et al. | |
| 5,300,305 A | 4/1994 | Stapler et al. | |
| 5,366,740 A | 11/1994 | Shaw et al. | |
| 5,378,131 A | 1/1995 | Greenberg | |
| 5,401,496 A | 3/1995 | Fitzig et al. | |
| 5,407,665 A | 4/1995 | McLaughlin et al. | |
| 5,424,081 A | 6/1995 | Owusu-Ansah et al. | |
| 5,431,930 A | 7/1995 | Patel et al. | |
| 5,437,878 A | 8/1995 | Panhorst et al. | |
| 5,462,754 A | 10/1995 | Synosky et al. | |
| 5,466,336 A | 11/1995 | Kinsley, Jr. | |
| 5,482,722 A | 1/1996 | Cook | |
| 5,545,424 A | 8/1996 | Nakatsu et al. | |
| 5,562,936 A | 10/1996 | Song et al. | |
| 5,580,590 A | 12/1996 | Hartman | |
| 5,601,858 A | 2/1997 | Mansukhani et al. | |
| 5,659,008 A | 8/1997 | Wood et al. | |
| 5,672,367 A | 9/1997 | Grijpma et al. | |
| 5,679,389 A | 10/1997 | Wong et al. | |
| 5,708,126 A | 1/1998 | Wood et al. | |
| 5,773,053 A | 6/1998 | Song et al. | |
| 5,882,702 A | 3/1999 | Abdel-Malik et al. | |
| 5,945,143 A | 8/1999 | Bunczek | |
| 6,013,287 A | 1/2000 | Bunczek et al. | |
| 6,017,566 A | 1/2000 | Bunczek et al. | |
| 6,020,008 A | 2/2000 | Li | |
| 6,030,646 A | 2/2000 | Cain et al. | |
| 6,077,547 A | 6/2000 | Wolf | |
| 6,086,925 A | 7/2000 | Song et al. | |
| 6,153,231 A | 11/2000 | Li et al. | |
| 6,159,509 A | 12/2000 | Johnson et al. | |
| 6,190,706 B1 | 2/2001 | Bunczek et al. | |
| 6,194,008 B1 | 2/2001 | Li et al. | |
| 6,214,320 B1 | 4/2001 | Gaffar et al. | |
| 6,235,694 B1 | 5/2001 | Pearl | |
| 6,306,382 B1 | 10/2001 | Uemura et al. | |
| 6,315,987 B1 * | 11/2001 | Plochocka | 424/49 |
| 6,441,126 B1 | 8/2002 | Cook et al. | |
| 6,444,782 B1 | 9/2002 | Hamlin | |
| 6,464,961 B2 * | 10/2002 | Plochocka | 424/48 |
| 6,469,129 B1 | 10/2002 | Cook et al. | |
| 6,573,308 B1 | 6/2003 | Braun et al. | |
| 6,592,913 B2 | 7/2003 | Cook et al. | |
| 6,599,542 B1 | 7/2003 | Abdel-Malik et al. | |
| 6,613,158 B2 | 9/2003 | Gross et al. | |
| 6,613,363 B1 | 9/2003 | Li | |
| 6,627,233 B1 | 9/2003 | Wolf et al. | |
| 6,685,916 B1 | 2/2004 | Holme et al. | |
| 6,733,578 B2 | 5/2004 | Liu et al. | |
| 6,733,730 B1 | 5/2004 | Griffiths et al. | |
| 6,780,443 B1 | 8/2004 | Nakatsu et al. | |
| 6,797,077 B2 | 9/2004 | Pearl | |
| 6,821,937 B2 | 11/2004 | Gross | |
| 6,824,623 B1 | 11/2004 | Gross et al. | |
| 6,858,238 B2 | 2/2005 | Lee et al. | |
| 6,929,702 B1 | 8/2005 | Motsenbocker | |
| 6,982,244 B2 | 1/2006 | Gross et al. | |
| 6,986,907 B2 | 1/2006 | Phillips et al. | |
| 7,018,969 B1 | 3/2006 | Gross et al. | |
| 7,056,542 B1 | 6/2006 | Bridger et al. | |
| 7,178,753 B2 | 2/2007 | Berger et al. | |
| 7,247,326 B2 | 7/2007 | Södergård | |
| 7,479,293 B2 | 1/2009 | Gráwe et al. | |
| 2002/0016274 A1 | 2/2002 | Pearl | |
| 2002/0054859 A1 | 5/2002 | Alvarez Hernandez | |
| 2002/0112744 A1 | 8/2002 | Besseling | |
| 2003/0032764 A1 | 2/2003 | Cook et al. | |
| 2003/0072842 A1 | 4/2003 | Johnson et al. | |
| 2003/0099741 A1 | 5/2003 | Gubler | |
| 2003/0118692 A1 | 6/2003 | Wang et al. | |
| 2003/0157213 A1 | 8/2003 | Jenkins | |
| 2003/0157214 A1 | 8/2003 | Bonsignore et al. | |
| 2003/0198710 A1 | 10/2003 | Ross et al. | |
| 2003/0206993 A1 | 11/2003 | Gubler | |
| 2003/0215417 A1 | 11/2003 | Uchiyama et al. | |
| 2003/0215543 A1 | 11/2003 | Liu et al. | |
| 2003/0235639 A1 | 12/2003 | Lin et al. | |
| 2004/0001903 A1 | 1/2004 | Lee et al. | |
| 2004/0038847 A1 | 2/2004 | Gross | |
| 2004/0058833 A1 | 3/2004 | Gross et al. | |
| 2004/0064544 A1 | 4/2004 | Barsness et al. | |
| 2004/0081713 A1 | 4/2004 | Maxwell et al. | |
| 2004/0086595 A1 | 5/2004 | Liu et al. | |
| 2004/0091573 A1 | 5/2004 | Sodergard | |
| 2004/0115305 A1 | 6/2004 | Andersen et al. | |
| 2004/0142066 A1 | 7/2004 | Andersen et al. | |
| 2004/0146599 A1 | 7/2004 | Andersen et al. | |
| 2004/0156949 A1 | 8/2004 | Andersen et al. | |
| 2004/0166197 A1 | 8/2004 | Ribadeau-Dumas et al. | |
| 2004/0180111 A1 | 9/2004 | Andersen et al. | |
| 2004/0247742 A1 | 12/2004 | Bridger et al. | |
| 2005/0025858 A1 | 2/2005 | Phillips et al. | |
| 2005/0032670 A1 | 2/2005 | Besseling | |
| 2005/0048121 A1 | 3/2005 | East et al. | |
| 2005/0112234 A1 | 5/2005 | Patel et al. | |
| 2005/0130869 A1 | 6/2005 | Gross et al. | |
| 2005/0244538 A1 | 11/2005 | Andersen et al. | |
| 2006/0024244 A1 | 2/2006 | Gebreselassie et al. | |
| 2006/0045934 A1 | 3/2006 | Kabse et al. | |
| 2006/0051455 A1 | 3/2006 | Andersen et al. | |
| 2006/0051456 A1 | 3/2006 | Kabse et al. | |
| 2006/0052455 A1 | 3/2006 | Koga et al. | |
| 2006/0083818 A1 | 4/2006 | Bridger et al. | |
| 2006/0099300 A1 | 5/2006 | Andersen et al. | |
| 2006/0121156 A1 | 6/2006 | Andersen et al. | |
| 2006/0134025 A1 | 6/2006 | Trivedi et al. | |
| 2006/0141094 A1 | 6/2006 | Sato et al. | |
| 2006/0165842 A1 | 7/2006 | Andersen et al. | |
| 2006/0182845 A1 | 8/2006 | Grawe et al. | |
| 2006/0240143 A1 | 10/2006 | Andersen et al. | |
| 2006/0240144 A1 | 10/2006 | Shalaby et al. | |
| 2006/0246174 A1 | 11/2006 | Andersen et al. | |
| 2006/0275344 A1 | 12/2006 | Mody et al. | |
| 2007/0042078 A1 | 2/2007 | Miladinov et al. | |
| 2007/0042079 A1 | 2/2007 | Miladinov et al. | |
| 2007/0093404 A1 | 4/2007 | Gross et al. | |
| 2007/0098845 A1 | 5/2007 | Soper et al. | |
| 2007/0104829 A1 | 5/2007 | Soper et al. | |
| 2007/0116800 A1 | 5/2007 | Prakash et al. | |
| 2007/0154591 A1 | 7/2007 | Andersen | |
| 2008/0138465 A1 | 6/2008 | Soper et al. | |

FOREIGN PATENT DOCUMENTS

| | | |
|---|---|---|
| EP | 0134120 | 3/1985 |
| EP | 0333301 A2 | 3/1989 |
| EP | 0376779 | 12/1989 |
| EP | 0130613 | 3/1991 |
| EP | 0497476 A2 | 1/1992 |
| EP | 0549281 A1 | 12/1992 |
| EP | 0763980 | 3/1997 |
| EP | 0702520 | 4/1997 |
| EP | 0676923 | 10/2000 |
| EP | 1246539 | 10/2002 |
| EP | 0929230 | 1/2003 |
| EP | 0711506 | 4/2003 |
| EP | 0814671 | 5/2003 |
| EP | 1283860 | 5/2006 |
| EP | 1250054 | 7/2006 |
| EP | 1406505 | 9/2006 |
| EP | 1448656 | 2/2007 |
| EP | 1702516 | 4/2007 |
| EP | 1772496 | 4/2007 |
| EP | 1780259 | 5/2007 |
| EP | 1542542 | 8/2008 |
| ES | 2190875 | 8/2003 |
| FR | 2717493 | 9/1995 |
| GB | 1025958 | 4/1966 |
| GB | 2230189 A | 10/1990 |
| GB | 2336596 | 10/1999 |
| JP | 61-031481 | 2/1986 |
| JP | 11-346664 | 12/1999 |
| JP | 2005-179308 A | 7/2005 |
| JP | 2005-179406 | 7/2005 |
| NZ | 215654 | 10/1988 |

| | | |
|---|---|---|
| WO | 9004926 | 5/1990 |
| WO | 9006061 | 6/1990 |
| WO | 9103147 | 3/1991 |
| WO | 92/08836 | 5/1992 |
| WO | 9317574 | 9/1993 |
| WO | 94/17673 | 8/1994 |
| WO | 94/28737 | 12/1994 |
| WO | 95/12322 | 5/1995 |
| WO | 96/00622 | 1/1996 |
| WO | 9608166 | 3/1996 |
| WO | 9620609 | 7/1996 |
| WO | 96/28041 | 9/1996 |
| WO | 9700618 | 1/1997 |
| WO | 97/04742 A1 | 2/1997 |
| WO | 98/15189 | 4/1998 |
| WO | 98/17123 | 4/1998 |
| WO | 98/17124 | 4/1998 |
| WO | 98/58550 | 12/1998 |
| WO | 99/09134 | 2/1999 |
| WO | 99/31995 | 7/1999 |
| WO | 9931995 | 7/1999 |
| WO | 99/39588 | 8/1999 |
| WO | 00/02992 | 1/2000 |
| WO | 00/05972 | 2/2000 |
| WO | 0008944 | 2/2000 |
| WO | 00/19837 | 4/2000 |
| WO | 00/28992 | 5/2000 |
| WO | 0025598 | 5/2000 |
| WO | 0035297 | 6/2000 |
| WO | 00/52128 | 9/2000 |
| WO | 0101788 | 1/2001 |
| WO | 01/21719 | 3/2001 |
| WO | WO 0139606 A1 * | 6/2001 |
| WO | 01/52662 | 7/2001 |
| WO | 0147368 | 7/2001 |
| WO | 0154512 | 8/2001 |
| WO | 01/90289 | 11/2001 |
| WO | 0217730 | 3/2002 |
| WO | 02/076227 A1 | 10/2002 |
| WO | 02/076228 | 10/2002 |
| WO | 02/076229 | 10/2002 |
| WO | 02/076230 | 10/2002 |
| WO | 02/076232 | 10/2002 |
| WO | 03/011043 | 2/2003 |
| WO | 03/064496 | 8/2003 |
| WO | 03/088757 | 10/2003 |
| WO | 03/096819 | 11/2003 |
| WO | 2004/000030 | 12/2003 |
| WO | 2004/002236 | 1/2004 |
| WO | 2004/028265 | 4/2004 |
| WO | 2004/028266 | 4/2004 |
| WO | 2004/028268 | 4/2004 |
| WO | 2004/028269 | 4/2004 |
| WO | 2004/034804 | 4/2004 |
| WO | 2004028267 | 4/2004 |
| WO | 2004028270 | 4/2004 |
| WO | 2004/039170 | 5/2004 |
| WO | 2004/068964 | 8/2004 |
| WO | 2004064544 | 8/2004 |
| WO | 2004/082660 A1 | 9/2004 |
| WO | 2005004621 | 1/2005 |
| WO | 2005/042600 | 5/2005 |
| WO | 2005/063037 | 7/2005 |
| WO | 2005/063038 | 7/2005 |
| WO | 2005/073284 | 8/2005 |
| WO | 2005/092112 | 10/2005 |
| WO | 2006/004721 | 1/2006 |
| WO | 2006/016179 | 2/2006 |
| WO | 2006/066572 | 6/2006 |
| WO | 2006/066573 | 6/2006 |
| WO | 2006/066575 | 6/2006 |
| WO | 2006/066576 | 6/2006 |
| WO | 2006/079338 | 8/2006 |
| WO | 2006/099866 | 9/2006 |
| WO | 2007/062497 | 6/2007 |
| WO | 2007/076856 | 7/2007 |
| WO | 2007/076857 | 7/2007 |
| WO | 02076231 | 12/2007 |

OTHER PUBLICATIONS

U.S. Appl. No. 11/283,331 Non-Final Office Action dated: Sep. 2, 2009 (20 pages).
U.S. Appl. No. 11/283,331 Non-Final Office Action dated: Sep. 30, 2008 (18 pages).
Riboflavin RDA (1998), http://lpi.oregonstate.edu/infocenter/vitamins/riboflavin.
International Search Report for International Application No. PCT/US2007/004735, 2007.
International Search Report for International Application No. PCT/US2006/032849, 2007.
International Search Report for International Application No. PCT/US2006/032851, 2007.
Chemicals Used in Food Processing publication 1274, p. 63-258 by National Academy of Science.
Clorets gum packaging showing ingredients (2 pgs).
Trident gum packaging showing ingredients (2 pgs).
FDA Accepts GRAS Petition for Stephan's Captrin; IFL.NR.6 1994.
Hein, Michael; Medium-Chain Triglycerides Rediscovered; Food Product Design; Nov. 1992I p. 34.
J. Dent; Res. vol. 28 No. 2, p. 160-171, 1949.
Kirk-Othmer Encyclopedia of Chemical Technology, 3rd Ed. vol. 5, p. 854-884.
Medium Chain Triglycerides (MCT's) for Food Use; Food Tech Europe; Sep./Nov. 1993; p. 53-54.
Cheryl Megremis; Medium-Chain Triglycerides; A Nonconventional Fat; Food Technology; Feb. 1991; p. 108, 110, 114.
Patent Baristas; CAFC: A Salt Doesn't Literally Infringe an Acid Claim, Mar. 24, 2006, www.patentbaristar.com/archives/000364.php.
Steer, James; Structure and Reactions of Chlorophyll: http://www.ch.ic.ac.uk.local/projects/steer/chloro.htm (last visited Dec. 14, 2004).
The Future of MCTs; Food Product Design; Dec. 1993; og 62-63.
Timmermann, Dr. Francis; Medium Chain Triglycerides The Unconventional Oil, IFI NR.3; p. 11-18, 1993.
International Search Report for International Application No. PCT/US2006/044765.
Flick, E.W. "Emulsifying Agents an industrial Guide" Noyes Publications, Park Ridge, NJ pp. 223, 1990.
Francis, F.J. "Food Colorings." Colour in Food-Improving Quality. Ed. D.B. MacDougall. Cambridge: Woodhead. pp. 315-316.
Smith, J, Hong-Shum, L. 2003. Food Additives Data Book pp. 212-214, Blackwell Publishing.
J. Ortega et al., Lipase-mediated Acidolysis of Fully Hydrogenated Soybean Oil with Conjugated Linoleic Acid, vol. 69, Nr. 1, 2004—Journal of Food Science, Published on Web Dec. 5, 2003, 6 pages.
Rivarola et al., Crystallization of Hydrogenated Sunflower-Cottonseed Oil, JAOCS, vol. 64, No. 11, Nov. 1987, 1537-1543.
Schmidt et al., 1996. Preparation of modified fats from vegetable oil and fully hydrogenated vegetable oil by randomization with alkali catalysts. Food Chemiistry. vol. 55 No. 4. pp. 343-348.
U.S. Appl. No. 11/923,229 Non-Final Office Action dated: Sep. 15, 2010.
U.S. Appl. No. 11/283,217 Final Office Action dated: Mar. 2, 2010.
U.S. Appl. No. 11/283,331 Final Office Action Mar. 4, 2010.
U.S. Appl. No. 11/508,020 Non Final Office Action dated: Jan. 27, 2010.
U.S. Appl. No. 11/508,020 Final Office Action dated: Jun. 9, 2010.
U.S. Appl. No. 11/508,020 Non-Final Office Action dated: Oct. 26, 2010, 20 pages.
U.S. Appl. No. 11/981,922 Non-Final Office Action dated: Oct. 18, 2010, 14 pages.
The International Searching Authority, Written Opinion, PCT/GB2010/001645, Date of Mailing: Aug. 4, 2011, 10 pages.
CA2656244 Office Action, Jun. 17, 2011, 2 pages.

* cited by examiner

DEGRADABLE CHEWING GUM

CROSS-REFERENCE TO RELATED APPLICATION

This application is a continuation-in-part of U.S. application Ser. No. 11/508,020, filed Aug. 22, 2006, which U.S. application Ser. No. 11/508,020 claims the benefit of U.S. Application No. 60/816,180, filed Jun. 23, 2006, and which U.S. application Ser. No. 11/508,020 is a continuation-in-part of U.S. application Ser. No. 11/283,331, filed Nov. 18, 2005, which claims the benefit of U.S. Provisional Application No. 60/710,064, filed Aug. 22, 2005, and which U.S. application Ser. No. 11/508,020 is a continuation-in-part of U.S. application Ser. No. 11/283,217, filed Nov. 18, 2005, which claims the benefit of U.S. Provisional Application No. 60/710,341, filed Aug. 22, 2005, the full contents of all of which are incorporated by reference herein; and this present application is a continuation-in-part of PCT/US2006/032849, filed Aug. 22, 2006, which claims the benefit of U.S. application Ser. No. 11/283,331, filed Nov. 18, 2005, which claims the benefit of U.S. Provisional Application No. 60/710,064, filed Aug. 22, 2005; and this present application is a continuation-in-part of PCT/US2006/032851, filed Aug. 22, 2006, which claims the benefit of U.S. application Ser. No. 11/283,217, filed Nov. 18, 2005, which claims the benefit of U.S. Provisional Application No. 60/710,341, filed Aug. 22, 2005.

FIELD OF THE INVENTION

The present invention relates to chewing gum compositions and products that degrade over time after chewing, where degradation is defined as a process whereby the deposited gum cud becomes brittle and begins to break down into particles and/or becomes less adhesive, either by the effect of environmental factors such as rain, sun, frost, etc., or by the effect of cleaning processes, including the action of detergents. Moreover, the present invention further relates to chewing gum bases for use in such chewing gum compositions which contribute to the ability of the chewing gum compositions and products to degrade due to environmental influences or cleaning processes.

BACKGROUND

Conventional chewing gum products are not "environmentally-friendly." They can maintain stickiness during and after chewing and adhere to the ground (as well as any other surface with which the gum product may come into contact) if care is not used with regard to disposal of the gum product. The stickiness of such conventional chewing gum products results, in large part, from the use of elastomer solvents (i.e., resins) and other "tacky" ingredients (such as wax) during the manufacturing process. In particular, conventional chewing gums manufactured using elastomer solvents exhibit a continuous or substantially continuous phase when chewed. As the continuous phase is characterized by an amorphous elastomer matrix containing sticky elastomer solvents, the gum bolus that results upon chewing also is sticky.

Many elastomers, and particularly high molecular weight elastomers (e.g. 200,000 mw or greater), used in chewing gum compositions are usually solid at room temperature. They are usually purchased as blocks of solid material and generally require softening using solvents to be useful in chewing gum compositions. Softening elastomers in the absence of elastomer solvents is difficult, because the solid elastomer must still be processed into a continuous homogeneous and flowable mass to be useful in chewing gum compositions.

Although gum products that are manufactured without the use of elastomer solvents and/or other "tacky" ingredients have reportedly been developed, such gum products often rely on "non-conventional" gum ingredients to achieve desired properties. U.S. Pat. No. 5,882,702, for example, obviates the need for elastomer solvents by replacing elastomers with a plasticized proteinaceous material such as zein. The incorporation of non-conventional ingredients in gum products, however, often compromises taste and thus can be undesirable from a consumer acceptability standpoint.

Moreover, although gum products that allegedly do not stick to teeth and oral prosthetics during mastication are reported (see, e.g., U.S. Pat. No. 4,518,615), there nevertheless remains a need for chewing gum products that also exhibit reduced stickiness or non-stick properties upon disposal of the gum product subsequent to chewing. In particular, there remains a need for environmentally-friendly chewing gum boluses that exhibit either reduced stickiness to, do not stick to, or are rapidly degraded on, those surfaces where gum boluses that are improperly disposed of are often found (e.g., pavement, shoes, hair, undersides of tables and desks).

Additionally, there remains a need for environmentally-friendly chewing gum boluses that are capable of degrading in a short period of time.

SUMMARY OF THE INVENTION

Figure 1A:
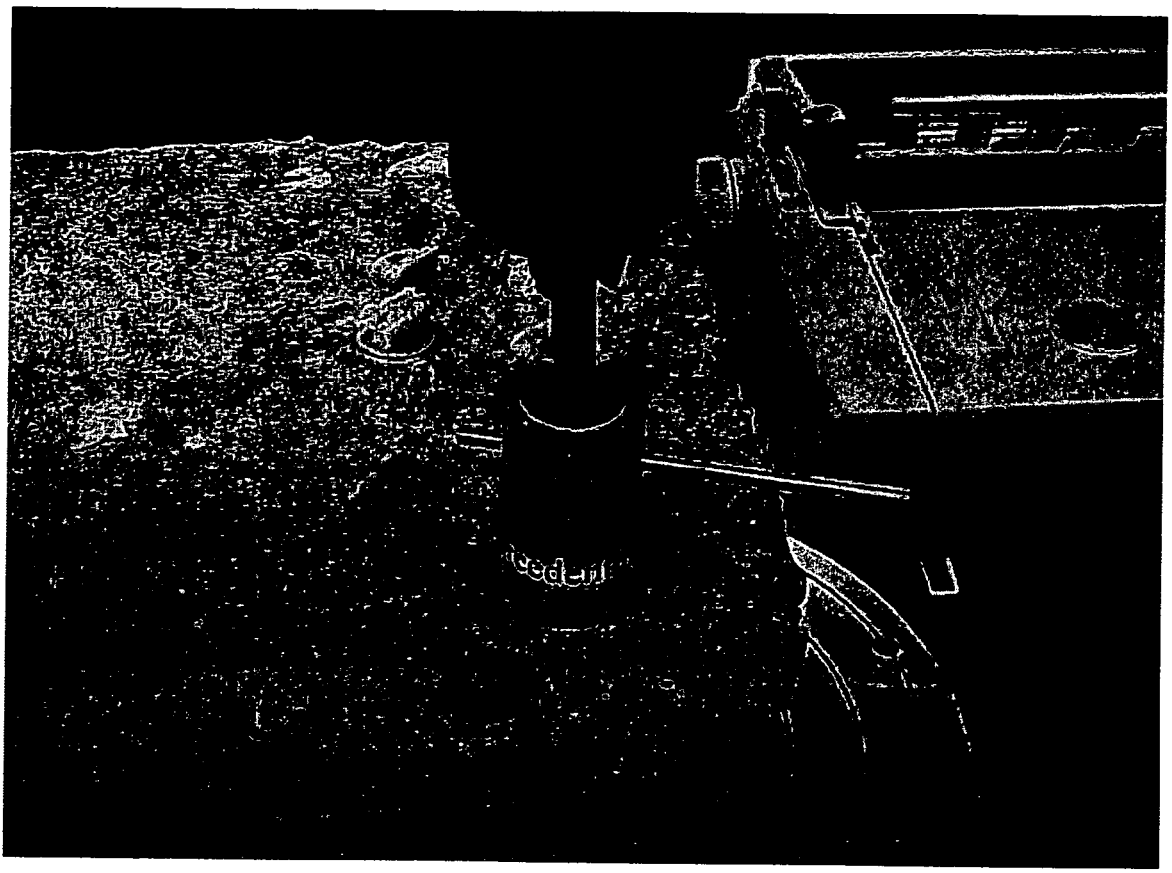
FIGS. 1A and 1B are photographs that illustrate how gum samples were applied to a brick and subjected to an adhesion test as described herein.

In some embodiments, there is provided a gum base including:
(a) a polymer including hydrolyzable units and/or a salt of a polymer including hydrolyzable units; and
(b) an elastomer.

In some embodiments, there is provided a chewing gum product including:
a) a gum base including:
(i) a polymer including hydrolyzable units and/or a salt of a polymer including hydrolyzable units;
(ii) an elastomer; and
(iii) a solvent or softener for said elastomer; and
b) at least one component selected from the group consisting of sweetener, flavors, sensates and combinations thereof;
wherein said chewing gum product has increased degradability and/or reduced-stick properties in the presence of the polymer including hydrolyzable units and/or the salt of the polymer including hydrolyzable units as compared to in the absence of the polymer including hydrolyzable units and/or the salt of the polymer including hydrolyzable units.

In some embodiments, there is provided a method of preparing a chewing gum composition including:
(a) providing a gum base including:
(i) at least one polymer including hydrolyzable units and/or a salt of a polymer including hydrolyzable units;
(ii) an elastomer; and
(iii) a solvent or softener for said elastomer; and
(b) combining said gum base with at least one component selected from the group consisting of sweeteners, flavors, sensates and combinations thereof.

In some embodiments, there is provided a method of increasing the degradability of a chewing gum base including:
(a) providing a gum base including:
(i) at least one polymer including hydrolyzable units and/or at least one salt of a polymer including hydrolyzable units;
(ii) an elastomer; and
(iii) a solvent or softener for said elastomer; and
(b) exposing the chewing gum base to mastication in the oral cavity of an individual;
wherein at least one hydrolyzable unit of the polymer including hydrolyzable units and/or at least one hydrolyzable unit of the salt of the polymer including hydrolyzable units begins to hydrolyze or hydrolyzes upon mastication in the oral cavity.

In some embodiments, there is provided a method of increasing the degradability of a chewing gum base composition including:
(a) providing a gum base composition including:
(i) at least one polymer including hydrolyzable units and/or at least one salt of a polymer including hydrolyzable units;
(ii) an elastomer; and
(iii) a solvent or softener for said elastomer; and
(b) contacting the chewing gum base with water;
wherein at least one hydrolyzable unit of the polymer including hydrolyzable units and/or at least one hydrolyzable unit of the salt of the polymer including hydrolyzable units begins to hydrolyze or hydrolyzes upon contact with the water.

In some embodiments, there is provided a chewing gum composition including:
a) a gum base including:
(i) a polymer including hydrolyzable units and/or a salt of a polymer including hydrolyzable units;
(ii) an elastomer; and
(iii) a solvent or softener for said elastomer;
b) at least one component selected from the group consisting of sweeteners, flavors, sensates and combinations thereof; and
c) a non-stick inducing component.

In some embodiments, there is provided a chewing gum composition including:
a) a gum base including:
(i) a polymer including hydrolyzable units and/or a salt of a polymer including hydrolyzable units;
(ii) an elastomer; and
(iii) a solvent or softener for said elastomer;
b) at least one component selected from the group consisting of sweeteners, flavors, sensates and combinations thereof; and
c) a photodegradation component.

In some embodiments, there is provided a chewing gum composition including:
a) a polymer including hydrolyzable units and/or a salt of a polymer including hydrolyzable units;
b) an elastomer; and
c) at least one component selected from the group consisting of sweeteners, flavors, sensates, and combinations thereof.

Some embodiments provide a chewing gum base composition which includes:
(i) at least one elastomer having a glass transition temperature prior to processing into a substantially homogenous mass; and
(ii) at least one non-stick and/or degradability inducing component which softens and permits processing of the elastomer into a substantially homogenous mass wherein the presence of the elastomer processing aid provides a maximum change in glass transition temperature of the elastomer of about three degrees or less.

In some embodiments there is provided a gum base composition including at least one elastomer matrix containing domains including at least one non-stick and/or degradability inducing component.

In some embodiments there is provided a chewing gum composition including:
(i) at least one elastomer having a glass transition temperature prior to processing into a substantially homogenous mass;
(ii) at least one non-stick and/or degradability inducing component which permits processing of the elastomer into a substantially homogenous mass, wherein the presence of the non-stick and/or degradability inducing component processing aid provides a maximum change in glass transition temperature of the elastomer of about three degrees or less; and
(iii) at least one of a flavor and a sweetener.

In some embodiments there is provided a method of processing a solid elastomer including:
(i) providing an elastomer suitable for use in a chewing gum base; and (ii) combining the elastomer with a non-stick and/or degradability inducing component including at least one fat having an HLB range of about 3.5- to about 13 in amounts sufficient to process the elastomer into a homogenous mass.

In some embodiments there is provided a method of making a chewing gum composition having reduced-stick properties and/or increased degradability properties including:
(a) providing a gum base including:
(i) at least one elastomer having a glass transition temperature; and
(ii) at least one non-stick and/or degradability inducing component which permits processing of the elastomer into a substantially homogenous mass, wherein the presence of the non-stick and/or degradability inducing component provides a maximum change in glass transition temperature of the elastomer of about three degrees or less; and
(b) combining said gum base with at least one component selected from the group consisting of sweeteners, flavors and combinations thereof.

In some embodiments there is provided a method of making a chewing gum composition having reduced-stick properties and/or increased degradability properties including:
(a) providing a gum base including:
(i) a gum base including an elastomer composition including a predominant amount of a material selected from the group consisting of polyisobutylene, butyl rubber, butadiene-styrene rubber and combinations thereof, the elastomer composition having an average molecular weight of at least about 200,000; and
(ii) a non-stick and/or degradability inducing component, wherein the non-stick and/or degradability inducing component maintains the glass transition temperature of the elastomer within a three degree range upon admixture with the elastomer; and
(b) combining said gum base with at least one sweetener and at least one flavor.

In some embodiments there is provided a method of making a chewing gum composition including:
(a) providing a gum base including:
(i) at least one elastomer; and
(ii) at least one non-stick and/or degradability inducing component having an HLB range is of about 3.5 to about 13; and
(b) combining said gum base with at least one sweetener and at least one flavor.

In some embodiments there is provided a chewing gum product including:
(a) a gum base;
(b) at least one material selected from flavors, sweeteners and combinations thereof; and
(c) at least one non-stick and/or degradability inducing component;
wherein the non-stick and/or degradability inducing component is present in an amount sufficient to provide reduced-stick surface properties and/or increased degradability properties subsequent to being chewed as compared to the same product in the absence of the non-stick and/or degradability inducing component.

In some embodiments there is provided a chewing gum base including:
(a) about 1% to about 30% by weight of the total gum base of at least one elastomer having an average molecular weight of at least about 200,000 and a Tg; and
(b) about 10% to about 60% by weight of the total gum base of at least one fat which changes the Tg of the elastomer no more than about three degrees or less;
wherein the gum base has reduced stickiness as compared to the same composition in the absence of the fat.

In some embodiments there is provided a method of processing an elastomer for use in a gum base without substantially changing the Tg of the elastomer as measured by DSC including the step of mixing at least one elastomer and at least one fat.

In some embodiments there is provided a chewing gum product including:
(a) a gum base;
(b) at least one component selected from flavors, sweeteners and combinations thereof; and
(c) at least one non-stick and/or degradability inducing component;
wherein the gum product is free or substantially free of added elastomer solvents and wherein the gum product has reduced stickiness and/or increased degradability as compared to chewing gum products that are not free or substantially free of added elastomer solvents.

In some embodiments there is provided a chewing gum base including:
(a) about 1% to about 30% by weight of the total gum base of at least one elastomer having an average molecular weight of at least about 200,000;
(b) about 10% to about 60% by weight of the total gum base of at least one non-stick and/or degradability inducing component; and
(c) no more than about 5% by weight of the total gum base of at least one elastomer solvent;
wherein the gum base has reduced stickiness and/or increased degradability properties as compared to chewing gum bases that do not contain the non-stick and/or degradability inducing component.

In some embodiments there is provided a method of reducing the stickiness and/or increasing the degradability of a chewing gum composition including:
(a) providing a chewing gum composition including components including at least one elastomer and at least one elastomeric solvent;
(b) replacing at least a portion of the elastomeric solvent in the composition with at least one non-stick and/or degradability inducing component prior to admixing the components; and
(c) admixing the components to form a reduced-stick chewing gum composition and/or a chewing gum composition that exhibits enhanced degradability.

In some embodiments there is provided a chewing gum composition including an elastomer matrix, wherein the elastomer matrix includes at least one discontinuous phase such that the chewing gum composition has at least one surface that is less sticky in the presence of the discontinuous phase than in the absence of the discontinuous phase.

In some embodiments there is provided a gum bolus formed by chewing a chewing gum composition including at least one elastomer and at least one non-stick and/or degradability inducing component, wherein the composition exhibits at least one discrete and separate domain which includes the non-stick and/or degradability inducing component.

In some embodiments there is provided a chewing gum composition including at least one elastomer and at least one non-stick and/or degradability inducing component including at least one hydrophobic portion and at least one hydrophilic portion, wherein the at least one hydrophobic portion is oriented inwardly in the gum composition and the at least one hydrophilic portion is oriented outwardly in the gum composition such that the chewing gum composition exhibits reduced stickiness in the presence of the at least one non-stick and/or degradability inducing component as compared to in the absence of the at least one non-stick and/or degradability inducing component.

In some embodiments there is provided a reduced-stick gum bolus formed by chewing a chewing gum composition including at least one elastomer and at least one non-stick and/or degradability inducing component wherein the orientation of the non-stick and/or degradability inducing component within the gum bolus is such that a reduced-stick barrier is formed on the surface of the gum bolus and/or the gum bolus exhibits enhanced degradation properties.

In some embodiments there is provided a chewing gum composition including:
(i) an elastomer;
(ii) at least one non-stick and/or degradability inducing component; and
(iii) a resin;
wherein the composition has reduced-stick properties in the presence of the non-stick and/or degradability inducing component than in the absence of the non-stick and/or degradability inducing component and/or wherein the composition has enhanced degradability.

In some embodiments, there is provided a biodegradable chewing gum composition including:
(a) a gum base;
(b) at least one flavor; and
(c) at least one free-radical generator.

In some embodiments there is provided a method of preparing a biodegradable chewing gum including:
(a) providing a gum base; and
(b) admixing the gum base with a free-radical generator.

In some embodiments there is provided a biodegradable chewing gum composition including:
(a) a gum base;
(b) at lease one sweetener; and
(c) at least one free-radical generator.

In some embodiments there is provided a photodegradable chewing gum composition including:
(a) a gum base;
(b) at least one flavor; and
(c) at least one photosensitizer.

In some embodiments, there is provided a photodegradable chewing gum composition including:
(a) a gum base;
(b) at least one sweetener; and
(c) at least one photosensitizer.

Some embodiments provide a chewing gum base composition which includes:
(i) at least one elastomer having a glass transition temperature prior to processing into a substantially homogenous mass; and
(ii) at least one non-stick and/or degradability inducing component which softens and permits processing of the elastomer into a substantially homogenous mass, wherein the presence of the elastomer processing aid provides a maximum change in glass transition temperature of the elastomer of about three degrees or less.

In some embodiments there is provided a gum base composition including at least one elastomer matrix containing domains including at least one non-stick and/or degradability inducing component.

In some embodiments there is provided a chewing gum composition including:
(i) at least one elastomer having a glass transition temperature prior to processing into a substantially homogenous mass;
(ii) at least one non-stick and/or degradability inducing component which permits processing of the elastomer into a substantially homogenous mass, wherein the presence of the non-stick and/or degradability inducing component processing aid provides a maximum change in glass transition temperature of the elastomer of about three degrees or less; and
(iii) at least one of a flavor and a sweetener.

In some embodiments there is provided a method of processing a solid elastomer including:
(i) providing an elastomer suitable for use in a chewing gum base; and
(ii) combining the elastomer with a non-stick and/or degradability inducing component including at least one fat having an HLB range of about 3.5- to about 13 in amounts sufficient to process the elastomer into a homogenous mass.

In some embodiments there is provided a method of making a chewing gum composition having reduced-stick properties including:
(a) providing a gum base including:
(i) at least one elastomer having a glass transition temperature; and
(ii) at least one non-stick and/or degradability inducing component which permits processing of the elastomer into a substantially homogenous mass, wherein the presence of the non-stick and/or degradability inducing component provides a maximum change in glass transition temperature of the elastomer of about three degrees or less; and
(b) combining said gum base with at least one component selected from the group consisting of sweeteners, flavors and combinations thereof.

In some embodiments there is provided a method of making a chewing gum composition having reduced-stick properties and/or increased degradation properties including:
(a) providing a gum base including:
(i) a gum base including an elastomer composition including a predominant amount of a material selected from the group consisting of polyisobutylene, butyl rubber, butadiene-styrene rubber and combinations thereof, the elastomer composition having an average molecular weight of at least about 200,000; and
(ii) a non-stick and/or degradability inducing component, wherein the non-stick and/or degradability inducing component maintains the glass transition temperature of the elastomer within a three degree range upon admixture with the elastomer; and
(b) combining said gum base with at least one sweetener and at least one flavor.

In some embodiments there is provided a method of making a chewing gum composition including:
(a) providing a gum base including:
(i) at least one elastomer; and
(ii) at least one non-stick and/or degradability inducing component having an HLB range of about 3.5 to about 13; and
(b) combining said gum base with at least one sweetener and at least one flavor.

In some embodiments there is provided a chewing gum product including:
(a) a gum base;
(b) at least one material selected from flavors, sweeteners and combinations thereof; and (c) at least one non-stick and/or degradability inducing component;
wherein the non-stick and/or degradability inducing component is present in an amount sufficient to provide reduced-stick surface properties and/or increased degradability properties subsequent to being chewed as compared to the same product in the absence of the non-stick and/or degradability inducing component.

In some embodiments there is provided a chewing gum base including:
(a) about 1% to about 30% by weight of the total gum base of at least one elastomer having an average molecular weight of at least about 200,000 and a Tg; and
(b) about 10% to about 60% by weight of the total gum base of at least one fat which changes the Tg of the elastomer no more than about three degrees or less;
wherein the gum base has reduced stickiness as compared to the same composition in the absence of the fat.

In some embodiments there is provided a method of processing an elastomer for use in a gum base without substantially changing the Tg of the elastomer as measured by DSC including the step of mixing at least one elastomer and at least one fat.

In some embodiments there is provided a chewing gum product including:
(a) a gum base;
(b) at least one component selected from flavors, sweeteners and combinations thereof; and
(c) at least one non-stick and/or degradability inducing component;
wherein the gum product is free or substantially free of added elastomer solvents and wherein the gum product has reduced stickiness and/or increased degradability as compared to chewing gum products that are not free or substantially free of added elastomer solvents.

In some embodiments there is provided a chewing gum base including:
(a) about 1% to about 30% by weight of the total gum base of at least one elastomer having an average molecular weight of at least about 200,000;
(b) about 10% to about 60% by weight of the total gum base of at least one non-stick and/or degradability inducing component; and
(c) no more than about 5% by weight of the total gum base of at least one elastomer solvent;
wherein the gum base has reduced stickiness and/or increased degradability as compared to chewing gum bases that do not contain the non-stick and/or degradability inducing component.

In some embodiments there is provided a method of reducing the stickiness and/or increasing the degradability of a chewing gum composition including:
(a) providing a chewing gum composition including components including at least one elastomer and at least one elastomeric solvent;
(b) replacing at least a portion of the elastomeric solvent in the composition with at least one non-stick and/or degradability inducing component prior to admixing the components; and
(c) admixing the components to form a reduced-stick chewing gum composition and/or a chewing gum composition exhibiting increased degradability.

In some embodiments there is provided a chewing gum composition including an elastomer matrix, wherein the elastomer matrix includes at least one discontinuous phase such that the chewing gum composition has at least one surface that is less sticky in the presence of the discontinuous phase than in the absence of the discontinuous phase.

In some embodiments there is provided a gum bolus formed by chewing a chewing gum composition including at least one elastomer and at least one non-stick and/or degradability inducing component, wherein the composition exhibits at least one discrete and separate domain which includes the non-stick and/or degradability inducing component.

In some embodiments there is provided a chewing gum composition including at least one elastomer and at least one non-stick and/or degradability inducing component including at least one hydrophobic portion and at least one hydrophilic portion, wherein the at least one hydrophobic portion is oriented inwardly in the gum composition and the at least one hydrophilic portion is oriented outwardly in the gum composition such that the chewing gum composition exhibits reduced stickiness and/or had increased degradation properties in the presence of the at least one non-stick and/or degradability inducing component as compared to in the absence of the at least one non-stick and/or degradability inducing component.

In some embodiments there is provided a reduced-stick gum bolus and/or a gum bolus having increased degradation properties formed by chewing a chewing gum composition including at least one elastomer and at least one non-stick and/or degradability inducing component wherein the orientation of the non-stick and/or degradability inducing component within the gum bolus is such that a reduced-stick barrier is formed on the surface of the gum bolus.

In some embodiments there is provided a chewing gum composition including:
(i) an elastomer;
(ii) at least one non-stick and/or degradability inducing component; and
(iii) a resin;
wherein the composition has reduced-stick properties and/or increased degradability properties in the presence of the non-stick and/or degradability inducing component than in the absence of the non-stick and/or degradability inducing component.

DETAILED DESCRIPTION

Some embodiments of the invention are directed to producing degradable and/or reduced-stick or non-stick gum bases and degradable and/or reduced-stick or non-stick chewing gum compositions using such gum bases. The degradable and/or reduced or non-stick properties may be achieved by adding hydrophilic precursor components to a chewing gum base, a chewing gum composition, or to both a chewing gum base and a chewing gum composition and exposing the chewing gum base, chewing gum composition or both to a condition that promotes hydrolysis. Upon hydrolysis, the surface of the gum base is rendered more hydrophilic, thereby reducing the stickiness of the chewing gum and/or rendering the chewing gum more degradable. Moreover, the degradable and/or reduced-stick and/or non-stick properties also may be achieved by employing certain fats and/or oils which soften the elastomers in chewing gum without causing excess stickiness.

Some embodiments of the invention are directed to producing degradable chewing gum bases and degradable chewing gum compositions using such degradable gum bases. Degradability is enhanced by incorporating a hydrophilic precursor component into a chewing gum base, a chewing gum composition, or both a chewing gum base and a chewing gum composition.

Other embodiments of the invention are directed to incorporating at least one hydrophilic precursor component into a gum base and exposing the gum base to at least one condition that promotes hydrolysis. Such conditions include, for example, mastication, exposure to moisture, or exposure to a hydrolysis-promoting condition, such as exposure to cycling weather conditions of rain and sunlight. In some embodiments, the condition that promotes hydrolysis promotes increased degradability.

In some embodiments, the invention relates to rendering chewing gum compositions degradable. Degradability is enhanced by incorporation of free-radical generators, such as photosensitizers.

Some embodiments of the invention are directed to producing gum bases that are non-sticky or exhibit reduced stickiness and/or that are degradable.

Some embodiments of the invention are directed to producing reduced-stick or non-stick gum bases and reduced-stick or non-stick chewing gum compositions using such gum bases. The reduced or non-stick properties are achieved by employing certain fats and/or oils which soften the elastomers in chewing gum without causing excess stickiness. Other embodiments of the invention relate to rendering chewing gum compositions biodegradable. Degradability, including biodegradability, is enhanced by the incorporation of free-radical generators, such as photosensitizers.

DEFINITIONS

As used herein the transitional term "comprising," (also "comprises," etc.) which is synonymous with "including," "containing," or "characterized by," is inclusive or open-ended and does not exclude additional, unrecited elements or method steps, regardless of its use in the preamble or the body of a claim.

As used herein, the terms "bubble gum" and "chewing gum" are used interchangeably and are both meant to include any gum composition.

As used herein, the term "degradation" refers to any process whereby a deposited gum cud becomes brittle and begins to breakdown into particles and/or becomes less adhesive, either by the effect of environmental factors including weather conditions such as rain, sun, frost, etc., including cycling weather conditions, and/or by the effect of cleaning processes including the action of detergents. Moreover, as used herein, the term "degradable" refers to the tendency of a deposited gum base to break up in the environment due the effect of weather conditions (rain, sun, frost, etc.), such as cycling weather conditions, and/or through the action of cleaning processes and/or detergents.

As used herein, the phrase "hydrophilic precursor component(s)" refers to any component(s) that is/are capable of promoting hydrolysis and which also has hydrophobic character. Although the hydrophilic precursor component contains a hydrophilic portion or hydrophilic portions which allow it to attract water and promote hydrolysis, at least a significant portion of the component is hydrophobic, which allows the component to be readily dispersed in a gum base, and which imparts an overall hydrophobic character.

Moreover, it will be understood that the term hydrophilic precursor component(s) includes hydrophilic precursor component(s) and salts thereof, whether such salts are formed before or after formulation, and any combination thereof. Hydrophilic precursor components include, for example, any component that is capable of hydrolyzing during mastication to promote the breakdown of a chewing gum composition and/or to reduce adhesion of a chewing gum composition to a surface, including salts of such components, whether formed before or after formulation. As such, hydrophilic precursor components include any component having at least one hydrolyzable unit, including salts of components having at least one hydrolyzable unit. Suitable salts of components having at least one hydrolyzable unit include, for example, alkali metal salts of components having at least one hydrolyzable unit and alkaline earth metal salts of components having at least one hydrolyzable unit.

Examples of hydrophilic precursor components include, for example, copolymers of methyl vinyl ether and maleic anhydride, and salts thereof; copolymers of polystyrene and maleic anhydride, and salts thereof; a copolymer of a hydrophobic monomer and an acid anhydride monomer, and salts thereof; and polyimides, such as polysuccinimides, and salts thereof. It will be understood that any combination of hydrophilic precursor components and their salts (whether formed before or after formulation) may be used in the present invention.

As used herein, the term "hydrolyzable units" refers to any portion of a molecule that is capable of being hydrolyzed. Examples of hydrolyzable units include, for example, ester bonds and ether bonds.

As used herein, the phrase "condition that promotes hydrolysis" refers to any condition that causes the hydrolysis of at least one hydrolyzable unit. Such conditions include, for example, moisture, mastication in the mouth, and exposure to a hydrolysis-promoting component, and exposure to cycling weather conditions of rain and sunlight. As used herein, the term "hydrolysis-promoting component" refers to any component that promotes the hydrolysis of a hydrolyzable unit. Such components include, for example, any alkaline component having a pH from about 8 to about 14. Examples of hydrolysis-promoting components include, for example, detergents having a basic pH, rain water, and deionised water. In some embodiments, hydrolysis-promoting components include filler components such as talc, carbonate-based fillers, such as calcium carbonate, and dical.

As used herein, the term "stomaching" refers to using a machine to simulate the mastication of a chewing gum base or chewing gum composition or chewing gum product in the mouth. As such, a chewing gum base or composition or product that has been stomached has been subjected to "stomaching" as that term is defined herein.

As used herein, the term "non-stick and/or increased degradability inducing component(s)" refers to components that are incorporated in a gum composition such that the gum composition exhibits reduced stickiness and/or increased degradability as compared to the same gum composition in the absence of the non-stick inducing components. It will be understood that the term "non-stick and/or increased degradability inducing component(s)" includes non-stick inducing component(s), increased degradability inducing component(s), and component(s) that act both as a non-stick inducing agent and as an increased degradability inducing component. It will be further understood that in some embodiments, the non-stick inducing component may be the same as the increased degradability inducing component, and in some embodiments it may be different.

Desirably, the non-stick and/or increased degradability inducing components have a number of advantages, including facilitating the softening of solid elastomer components in the production of a gum base as well as preventing or reducing the tendency of chewing gum compositions and products made therefrom from sticking to surfaces such as packages, teeth, oral prosthetics such as implants and dentures, as well as to concrete, stone, plastic, wood, pavement, brick, glass and various other similar surfaces. The non-stick and/or increased degradability inducing component may be any component that is capable of hydrolyzing during mastication to promote breakdown of a chewing gum composition and/or to reduce adhesion of a chewing gum composition to a surface. Moreover, the non-stick and/or increased degradability inducing components may be any component that causes the final (as defined herein) Tg of an elastomer used in a chewing gum composition to change no more than about three degrees (3°), up or down from the initial Tg (as defined herein) during processing. The non-stick and/or increased degradability inducing components also may be any components that serve as a release agent, as defined herein. Moreover, the non-stick and/or increased degradability inducing components may be any components that promote the degradation of a chewing gum composition. In particular, the non-stick and/or increased degradability inducing component may be any component that serves as a hydrophilic precursor component, as defined herein. Furthermore, the non-stick and/or increased degradability components may be any components that crystallize or form domain regions in the gum base elastomers. Additionally, the non-stick and/or increased degradability inducing components may be any components that have a hydrophobic portion and a hydrophilic portion, wherein the hydrophobic portion is capable of orienting inwardly within a gum bolus and the hydrophilic portion is capable of orienting outwardly within a gum bolus. Non-stick and/or increased degradability inducing components include, for example, oils and other fats that may be included in a gum composition in an amount sufficient to render the composition non-sticky, both during processing and after processing of a chewing gum subsequent to chewing of the gum products made therefrom. These non-stick and/or increased degradability inducing components may be used to replace some or all of the elastomer solvent materials, such as resins and waxes conventionally used in chewing gum compositions. The non-stick and/or increased degradability inducing components, when added to a gum base may also act as an elastomer processing aid to permit softening processing of the elastomer from a solid to a useful gum base material.

As used herein, the term "Tg" refers to the glass transition temperature of an elastomer used in chewing gum compositions as measured at any time before or after processing of the elastomer. More particularly, the term "Tg initial" refers to the glass transition temperature of an elastomer prior to processing of the elastomer into a substantially homogenous mass in the presence of a non-stick inducing component. The term "Tg final" refers to the glass transition temperature of an elastomer subsequent to processing of the elastomer into a softened mass useful for gum base.

Glass transition temperature (Tg) is generally understood to be the temperature below which molecules have very little mobility. On a larger scale, polymers are rigid and brittle below their glass transition temperature and can undergo plastic deformation above it. Tg is usually applicable to amorphous phases and is commonly applicable to glasses, plastics and rubbers. In polymers, Tg is often expressed as the temperature at which the Gibbs free energy is such that the activation energy for the cooperative movement of a significant portion of the polymer is exceeded. This allows molecular chains to slide past each other when a force is applied.

As used herein, the phrase "release properties" means properties that allow a chewing gum base and/or chewing gum product to exhibit reduced adherence to a surface.

As used herein, the phrase "limited capability to plasticize polymers" means that that a component will not change the Tg of a gum base more than about plus/minus three (+/−3) degrees upon incorporation of the component into the gum base.

As used herein, the term "processing" refers to any step taken during the manufacture of a gum base and/or gum product, including any step that occurs when manufacturing a gum product by means of batch systems, continuous systems, or any other system manufacturing system known in the art. As used herein, the term processing includes the process of "masticating an elastomer" so that it is suitable for inclusion in a chewing gum product.

As used herein, the phrase "non-conventional gum ingredients" refers to ingredients not conventionally included in chewing gum products and includes ingredients such as zein and seed oils from the plant genus Cuphea.

As used herein, the phrase "conventional gum ingredients" refers to ingredients traditionally included in gum products such as elastomers and elastomer solvents.

As used herein, the term "surface", when used in connection with non-stick and/or degradable properties, refers to any surface with which a chewing gum base, chewing gum composition, chewing gum product or chewing gum bolus comes into contact. Such surfaces include without limitation, for example, the following: any surface in the oral cavity such as the surface of a tooth or the surface of any dental or orthodontic device contained in the oral cavity; any surface on a human body including the skin, such as the skin on the face, and hair; and any surface external to a human body, such as the surface of pavements, sidewalks, roadways, brick, glass, wood, plastic, stone, furniture, carpeting, the soles of footwear including shoes or sneakers, cardboard, paper, metal, and surfaces of porous nature to which conventional gum ingredients stick and are difficult to remove.

As used herein, the term "HLB" refers to hydrophilic lipophilic balance.

As used herein, the term "stomaching" refers to the action of mechanical aqueous extraction of a gum using a device known as a stomacher (for example, a Seward Ltd. Stomacher™ 400). In some embodiments, stomaching involves placing gum samples in polythene bags with a known volume of water and beating the bags for a specific period of time.

Non-Stick and/or Reduced Stick and/or Degradable Aspects

The present invention provides numerous advantages over conventional chewing gum compositions by the incorporation of certain components which aid in the processing of the gum base, as well as contribute to certain advantages and properties in the final chewing gum compositions and products made therefrom. One such advantage is the reduced-stick and/or non-stick properties and/or increased degradability properties that are imparted to the gum base and consequently to the chewing gum compositions as a whole, both during processing of the chewing gum base and subsequent to chewing. Another advantage is the ability to process elastomer gum base components without relying on conventional solvent additives, such as gum resins. Yet another advantage is the ability to substitute some or all of the elastomer solvent within a gum base with the non-stick inducing components. In some embodiments, only a portion of an elastomer solvent is replaced to take advantage of the softening capabilities of the solvent without imparting stickiness to chewing gum compositions made therefrom.

In some embodiments of the invention, various chewing gum compositions and products made therefrom are provided with reduced stickiness or non-stick and/or increased degradability properties by the incorporation of non-stick and/or increased degradability inducing components which include hydrophilic precursor components and/or various fats and oils. These non-stick and/or increased degradability inducing components may be used to partially or fully replace conventional components such as elastomer solvents and certain waxy materials, which are conventionally used to soften gum base elastomers such that they are processible for chewing gum compositions, but which are known to contribute to the stickiness of chewing gum compositions made therefrom. The incorporation of these non-stick and/or increased degradability inducing components have a number of advantages in the processing of gum base as well as contributes to the overall reduced stickiness and/or increased degradability in the final chewing gum compositions and products made therefrom.

The non-stick and/or increased degradability inducing components may contribute to one or more of the following advantages: (i) facilitate the process of converting a solid or solid-like elastomer into some other form, such as a homogenous or substantially homogenous softened or malleable mass; (ii) allow sufficient softening for processing and for use in a chewing gum product; and (iii) provide softening without an increase in stickiness of the final gum product. The non-stick and/or increased degradability inducing components, when used in the present invention may provide one or more of these advantages, as well as modulate the change in elastomer Tg during formation of the gum base. In some embodiments, when the non-stick and/or increased degradabilty inducing components are used to make a chewing gum base, the Tg of the elastomer used to make the gum base changes no more than about three degrees (3°) up or down (plus/minus) as compared to the Tg of the elastomer prior to gum base processing. The maximum three degrees change (i.e., Tg final) includes a change either higher or lower than the Tg initial. For example, if the Tg initial of the elastomer is 60° C., the Tg final of the elastomer subsequent to the addition of the non-stick and/or increased degradability inducing component may be about 57° C. to about 63° C., e.g., +/−3° C. The term "non-stick and/or increased degradability inducing components" also includes, for example, any component that facilitates the process of converting solid or solid-like elastomers to a form useful for chewing during batch systems, continuous systems, and other manufacturing systems and/or processes known in the art. Desirably, the elastomer processing aid has a limited capability to plasticize polymers, as defined herein below.

In some embodiments, the non-stick and/or increased degradability inducing components, when added to the gum base, allow for softening in the gum base elastomers such that they can be easily processed from solid rubbers to soft matrices, which can then be incorporated into chewing gum compositions.

In some embodiment of the invention, the addition of the non-stick and/or increased degradability inducing components balances the softening of the gum base elastomer components, as well as the chewing gum composition as a whole, while reducing the overall stickiness and/or increasing the degradability of the products made therefrom.

In some embodiments, the elastomer components in chewing gum compositions, such as those used to form gum bases, are softened through the incorporation of the non-stick and/or increased degradability inducing components without changing the glass transition temperature (Tg° C.) of the elastomer more than three degrees above its initial Tg° C. nor less than three degrees below the initial Tg° C., i.e., +/− three (3) degrees.

In other embodiments, the non-stick and/or increased degradability inducing components have been found to exhibit various physical properties including the ability to migrate to the surface of the chewing gum product to create a release barrier which reduces the ability of the chewing gum product to stick to surfaces. In some embodiments, the non-stick and/or increased degradability inducing components have hydrophobic and hydrophilic character, i.e., HLB (hydrophilic lipophilic balance) values, which enhance the release barrier characteristics due to the tendency of these materials to molecularly orient themselves such that the hydrophobic portion orients itself inward of the chewing gum and the hydrophilic portion orients itself to the surface of the chewing gum, thereby contributing to the release properties and reducing the stickiness.

Non-stick and/or increased degradability inducing components may be present in the gum base prior to its use in a chewing gum composition, as well as being added to the chewing gum composition as a whole. In some embodiments, conventional components which contribute to stickiness, such as elastomer solvents, may be partially or fully replaced with the non-stick and/or increased degradability inducing components of the present invention. It has also been discovered that the addition of a methyl ester liquid rosin, desirably in low amounts, may be advantageously employed to enhance softening without contributing to stickiness. It has been discovered that methyl ester liquid resins tend to be relatively small molecules which do not destroy emulsions which may be formed by the elastomer/non-stick and/or increased degradability inducing components.

Any suitable non-stick and/or increased degradability inducing components as defined herein may be incorporated in the present inventive chewing gum bases.

In some embodiments, the non-stick and/or increased degradability inducing component is incorporated into the gum base such that the gum base surface has greater hydrophilic character.

In some embodiments, the non-stick and/or increased degradability inducing component(s) provide(s) a maximum change in glass transition temperature of an elastomer of about +/−3° when brought into contact with an elastomer (e.g., by mixing) during manufacture of a chewing gum base.

In some embodiments, the chewing gum compositions of the present invention include a non-stick and/or increased degradability inducing component in an amount sufficient to migrate to the surface of a chewing gum product formed therefrom and provide a surface barrier. Desirably, the surface barrier has release properties such that a gum bolus formed upon chewing exhibits a reduced adherence to a variety of surfaces as compared to gum compositions not containing the non-stick and/or increased degradability inducing component.

In some embodiments, the chewing gum compositions of the present invention include non-stick and/or increased degradability inducing components that are molecularly oriented within the gum base in such a manner that the gum base exhibits reduced stickiness as compared to the gum base in the absence of the non-stick and/or increased degradability inducing components. In particular, in some embodiments, the non-stick and/or increased degradability inducing components contain a hydrophobic portion that is oriented inwardly within the chewing gum product and a hydrophilic portion that is oriented outwardly.

For example, in some embodiments, the non-stick and/or increased degradability inducing component may be a surface release agent having a hydrophilic portion and a hydrophobic portion. When such a surface release agent is employed, the hydrophobic portion of the surface release agent tends to direct itself within the chewing gum composition and the hydrophilic portion tends to direct itself toward the chewing gum composition surface upon migration of the surface release agent to the surface of the chewing gum.

In some embodiments, the non-stick and/or increased degradability inducing components when added to gum bases form domain regions which indicate the crystallization of the non-stick components within an elastomer matrix. The non-stick and/or increased degradability inducing components may have limited miscibility in the elastomer at room temperature such that upon cooling of the gum base or chewing gum composition, a separate crystalline phase forms. In particular, in some embodiments of the invention, such domains can form upon cooling of the gum base during processing. Advantageously, chewing gum compositions incorporating gum bases containing such domains exhibit reduced stickiness to surfaces that are both internal and external to the mouth, as compared to gum bases not containing such domains. Moreover, when a gum base contains at least one domain and at least one elastomer, the at least one domain may be characterized by a particular Tg value and the at least one elastomer may be characterized by a different Tg value.

Accordingly, unlike conventional gum bases which have a continuous phase of a sticky elastomer matrix, the gum bases of the present invention may have a discontinuous phase that is separate and distinct from the elastomer matrix of the gum base. Gum bases of the present invention that contain a discontinuous phase exhibit reduced stickiness as compared to gum bases not having a discontinuous phase.

The discontinuous phase may be a result of one or more of the following: the formation of a release barrier on the surface of the gum base due to the incorporation of a non-stick inducing component therein; the presence of domains; and the orientation of the non-stick inducing component such that the gum base surface has greater hydrophilic character.

Additionally, the non-stick and/or increased degradability inducing component may include, for example, any suitable fat or oil or combination thereof which performs to reduce stickiness or render non-stick the composition and products made therefrom. In particular, they may include fats and oils having an HLB range of about 3.5 to about 13. Useful fats and oils include those having a wide range of melting points, for example from about 10° C. to about 75° C., desirably from about 20° C. to about 73° C. and more desirably about 40° C. to about 70° C.

More particularly, non-stick and/or increased degradability inducing components may include, without limitation, the following: various fats and oils including saturated and unsaturated fatty acids having a carbon chain length of $C_{14}$ to $C_{24}$; including for example saturated and unsaturated fatty acids such as stearic acid, oleic acid, palmitic acid, linoleic acid, arachidonic acid, myristic acid, palmitoleic acid and vaccenic acid; monoglycerides, diglycerides, and triglycerides of saturated and unsaturated fatty acids having a chain length of $C_{14}$ to $C_{24}$; natural fats containing predominantly triglycerides of saturated and unsaturated fatty acids having a chain length of $C_{14}$ to $C_{24}$, including hydrogenated and non-hydrogenated cottonseed oil, soybean oil, canola oil, olive oil, grape seed oil, peanut oil, sunflower oil, safflower oil, palm oil, cocoa butter, coconut oil, and palm kernel oil; esters of monoglycerides and diglycerides, such as acetylated monoglycerides and acetylated diglycerides and the glycerol esters of fatty acids including glycerol monostearate (GMS); animal fats such as beef tallow oil, lard, butter and chicken fat; fatty esters of sugars; esters of alcohols such as lower alkyl ($C_{1-4}$) stearates including methyl and ethyl stearates, as well as high molecular weight esters of alcohols; phospholipids such as lecithin and lanolin; and mixtures and combinations thereof.

Fatty acids and their esters having lengths of $C_2$-$C_{13}$ may also be employed in combination with the $C_{14}$-$C_{24}$ fatty acid esters described above but due to the tendency of the medium chain triglycerides (MCTs having a carbon chain length of $C_6$-$C_{12}$) to be more miscible or compatible with the elastomer, their presence must be balanced such that the Tg final as defined herein is maintained and/or separate crystals and/or domains are present or maintained in the elastomer matrix.

The ratio of non-stick and/or increased degradability inducing component to elastomer (non-stick: elastomer) may be in the range of about 1:1 to about 10:1 and desirably in the range of about 4:1 to about 8:1. When optional components such as elastomer solvents or waxes are employed along with the non-stick and/or increased degradability inducing component, the ratio of non-stick and/or increased degradability inducing component to elastomer solvent (non-stick solvent or wax) may be about 1:0 to about 4:1.

Desirably, some embodiments include inventive gum bases which have at least one non-stick and/or increased degradability inducing component having a melting point of about 60° C. to about 70° C. and at least one other non-stick and/or increased degradability inducing component having a melting point of about 20° C. to about 40° C. More particularly, the present inventive gum bases may include at least one fat having a melting point of about 70° C. and at least one fat having a melting point of about 40° C.

The non-stick and/or increased degradability inducing component may be present in amounts of about 10% to about 60% by weight of the chewing gum base. In some embodiments, the non-stick inducing component may be present in amounts of about 20% to about 50% by weight of the chewing gum base. In other embodiments, the non-stick and/or increased degradability inducing component may be present in amounts of about 30% to about 40% by weight of the chewing gum base.

In some embodiments, the non-stick and/or increased degradability inducing component may be, for example, a hydrophilic precursor component as defined herein. In particular, the non-stick and/or increased degradability inducing component may include, for example, any polymer and/or salt thereof (whether formed before or after formulation) containing at least one hydrolyzable unit, as defined herein. In some embodiments where the non-stick and/or increased degradability inducing component is a hydrophilic precursor component, the chewing gum base containing the same will be less sticky or exhibit less stickiness and/or will exhibit enhanced degradability compared to a chewing gum base not including a hydrophilic precursor component as a non-stick inducing component.

In some embodiments, the chewing gum bases of the present invention do not stick to a variety of surfaces or exhibit reduced stickiness as compared to chewing gum bases not having the present inventive compositions. In particular, during manufacture, the chewing gum bases do not stick to processing equipment. Moreover, during chewing, the chewing gum bases do not stick to surfaces within the oral cavity, including the teeth and any orthodontic or dental appliances. Additionally, gum boluses of the present invention will not stick to, or will have reduced stickiness, to a variety of surfaces external to the oral cavity, including, for example, asphalt, bricks, wood, plastic, hair, skin, carpeting, and the soles of shoes, as compared to gum boluses not having the formulations of the gum boluses of the present invention.

Some embodiments of the present invention provide chewing gum compositions and products that have non-stick surfaces during processing and subsequent to chewing into a gum bolus.

Additional Degradable Aspects

In other embodiments of the invention, the chewing gum compositions may be rendered more environmentally friendly by the incorporation of additional components which enhance the degradation of the chewing gum, such that it looses its ability to maintain its cohesiveness and crumbles and breaks apart into smaller, discontinuous pieces over time. Components which contribute to the degradation include light absorbing materials which upon exposure to light, e.g. sunlight, react with the elastomer components and cause them to degrade, or otherwise become modified to become less sticky. In some embodiments, upon exposure to light, the molecular weight of the elastomer component is reduced sufficiently enough to render them and chewing gum compositions containing them less sticky. In some embodiments, there may be included components which when exposed to light cause an increase in the molecular weight of the elastomer components sufficient to reduce the stickiness of the elastomer, as well as reduce the stickiness of chewing gum compositions containing them.

Any agent that is capable of degrading an elastomer may be incorporated in various chewing gum composition embodiments. Desirably, the agent is lipophilic and is incorporated in the gum base composition. In some embodiments, an agent serves to enhance the degradation of the gum product in the presence of light, i.e., photodegradation. A particularly useful agent that is capable of enhancing the elastomer degradation in the presence of light is chlorophyll and derivatives such as chlorophyllin, pheophytin, pyropheophytin and pheophorbide. Chlorophyll and its derivatives are capable of absorbing light and generating free radicals. The presence of free radicals may react with elastomer components to render them less sticky.

In general, chlorophyll may be present in an amount from about 0.01% to about 0.3% by weight of the gum base. Desirably, chlorophyll may be present in an amount from about 0.05% to about 0.2% by weight of the gum base. More desirably, chlorophyll may be present in an amount from about 0.07 to about 0.12% by weight of the gum base.

Other suitable components to enhance degradation include other photosensitizers such as phthalocyanine derivatives, riboflavin, hemoglobin, myoglobin, and heme. In some embodiments, the elastomer component may be degraded by oxidation to form smaller discontinuous phases of elastomer. In some embodiments, the elastomer component may interact with free radicals to increase the elastomer molecular weight. When certain elastomer components are used in combination with the chlorophyll, such as elastomers with unsaturated bonds, the chlorophyll may increase the molecular weight of the elastomeric component by inducing higher molecular weight reaction products caused by free radical generation. A variety of reaction possibilities may occur depending on such factors as the type of elastomer present, the amount of degradation agent present such as free-radical inducing agent, the particular chewing gum composition, as well as the type of light and environmental exposure the chewing gum sees.

In some embodiments, the at least one agent capable of degrading an elastomer is encapsulated. Encapsulation may be desirable to prevent premature degradation of the chewing gum base prior to mastication. The at least one agent capable of degrading an elastomer may be encapsulated as microcapsules or microparticles as described in PCT Publication No. WO 2004/064544, which is incorporated herein by reference in its entirety. Suitable encapsulants include, but are not limited to, fats, polymers, carbohydrates and combinations thereof. A particularly suitable encapsulant is gum arabic.

In some embodiments the agent capable of degrading an elastomer is present in the chewing gum composition as part of the center-fill. In such compositions the agent may be encapsulated or non-encapsulated.

In some embodiments, the agent capable of degrading an elastomer is present in a coating of the chewing gum composition. For example, such coatings are used on sugarless tablet gums to provide crunchiness as well as flavor, sweetness and sensate perception. In such compositions, the agent may be encapsulated or non-encapsulated.

In general, the at least one agent capable of degrading an elastomer is present in an amount sufficient to substantially degrade the chewing gum product subsequent to mastication over time. Desirably, in some embodiments, the at least one agent capable of degrading an elastomer is present in an amount sufficient to substantially degrade the chewing gum product subsequent to mastication within about twenty-five (25) weeks. More desirably, the at least one agent capable of degrading an elastomer is present in an amount sufficient to substantially degrade the chewing gum product subsequent to mastication within about ten (10) weeks.

Desirably, the at least one agent capable of degrading an elastomer is present in an amount from about 0.01% to about 0.3% by weight of the gum base. More desirably, the at least one agent capable of degrading an elastomer is present in an amount from about 0.05% to about 0.2% by weight of the gum base. Most desirably, the at least one agent capable of degrading an elastomer is present in an amount from about 0.07% to about 0.12% by weight of the gum base.

Other components which contribute to degradation of a chewing gum composition include hydrophobic components, i.e., hydrophilic precursor components as defined herein, which hydrolyze or begin to hydrolyze upon exposure to a particular condition that promotes hydrolysis, such as upon exposure to mastication and/or upon exposure to moisture and/or upon exposure to a component that promotes hydrolysis and/or upon exposure to alkaline pH conditions in the range of about 8 to about 14. By incorporating a hydrophilic precursor polymer into a chewing base and/or chewing gum composition, it is possible to enhance the hydrophilicity of a chewing gum composition following mastication. In particular, it is possible to delay the onset of hydrophilicity through the use of such hydrophobic precursors to hydrophilic materials. By delaying the onset of hydrophilicity, it is possible to produce a gum base and chewing gum product which is stable, yet is capable of hydrolyzing upon exposure to certain conditions, such as the moisture and mechanical action of mastication.

Desirably, in some embodiments, a hydrophilic precursor component is present in a chewing gum composition in an amount sufficient to impart reduced stickiness or non-stickiness to the gum base and/or to promote breakdown of the gum base within days and, more desirably, within hours upon exposure to a condition that promotes hydrolysis. It is particularly useful to incorporate a hydrophilic precursor component in the inventive gum bases in an amount that is from about 0.1% by weight to about 10% by weight of the total gum base. More desirably, a hydrophilic precursor component is present in the inventive gum bases in an amount that is from about 1% by weight to about 5% by weight. Most desirably, a hydrophilic precursor component is present in the inventive gum bases in an amount that is about 5% by weight.

Any hydrophilic precursor component may be used in the chewing gum bases and/or chewing gum compositions and/or chewing gum products of the present invention. In particular, a hydrophilic precursor component may be incorporated into a chewing gum base, a chewing gum composition, or both a chewing gum base and a chewing gum composition. Moreover, the hydrophilic precursor component may be added to the chewing gum base and/or chewing gum composition during manufacture, after manufacture, or during production of the gum itself.

Suitable hydrophilic precursor components include, for example, polymers including hydrolyzable units and salts of polymers including hydrolzyable units, whether formed before or after formulation, and any combination thereof. It will be understood that the salts of such polymers including at least one hydrolyzable unit include, for example, the alkali metal salts, including the sodium and potassium salts, and the alkaline earth metal salts, including the magnesium and calcium salts.

Without wishing to be bound by any particular theory, it is hypothesized that in some embodiments a salt may be formed by the reaction of an acid form of a hydrophilic precursor component with a filler component of a chewing gum base, including, for example, a filler component such as calcium carbonate, calcium carbonate/dical, dical, dicalcium phosphate and/or talc. Such salts may include, for example, alkali metal salts, including sodium and potassium salts, and alkaline earth metal salts, including magnesium and calcium salts, and/or any combination thereof.

Suitable hydrophilic precursor polymers include the following: copolymers of methyl vinyl ether and maleic anhydride and/or salts thereof (such as any of the GANTREZ® AN products and/or salts thereof, including GANTREZ® AN-119 (which has a molecular weight of about 200,000), GANTREZ® AN-903 (which has a molecular weight of about 800,000), GANTREZ® AN-139 (which has a molecular weight of about 1,000,000), and GANTREZ® AN-169 (which has a molecular weight of about 2,000,000), all of which are available from International Specialty Products (ISP), and/or salts thereof); copolymers of polystyrene and maleic anhydride and/or salts thereof; polysuccinimide and/or salts thereof; and combinations thereof. Other suitable copolymers include the free acid form of GANTREZ AN copolymers and/or salts thereof (particularly, any of the GANTREZ S® copolymers and/or salts thereof, including GANTREZ® S-96 solution (which has a molecular weight of about 700,000), GANTREZ® S-97 powder (which has a molecular weight of about 1,200,000), and GANTREZ® S-97 solution (which has a molecular weight of about 1,500,000), all of which are available from International Specialty Products), and/or salts thereof, and half-ester derivatives of GANTREZ® S copolymers and/or salts thereof (particularly, any of the GANTREZ® ES products and/or salts thereof including GANTREZ® ES-225 (which has a molecular weight from about 100,000 to about 150,000) and GANTREZ® ES-425 (which has a molecular weight from about 90,000 to about 150,000), each of which are available from International Specialty Products) and/or salts thereof. Other suitable hydrophilic precursor components include copolymers of vinyl pyrrolidone and vinyl acetate and/or salts thereof (such as Plasdone® S-630 (which has a molecular weight of about 27,000), available from International Specialty Products, and/or salts thereof) and alginates and/or salts thereof. Suitable polymers for use as hydrophilic precursor components, including the aforementioned GANTREZ products, are more particularly described in "Polymers for Oral Care: Product and Applications Guide," by International Specialty Products (© 2003 ISP), the contents of which are incorporated herein by reference. Any of the aforementioned polymers and/or any salts thereof may be used alone or in combination.

Useful salts of hydrophilic precursor polymers include, for example, any alkali metal salt of a hydrophilic precursor polymer and/or any alkaline earth metal salt of a hydrophilic precursor polymer and/or combinations thereof. Particularly useful alkali metal salts of hydrophilic precursor polymers include, for example, the sodium and potassium salts of hydrophilic precursor polymers and/or combinations thereof. Particularly useful alkaline earth metal salts of hydrophilic precursor polymers include, for example, the magnesium and calcium salts of hydrophilic precursor polymers and/or combinations thereof. A particularly useful hydrophilic precursor polymer is GANTREZ® MS, which is a mixed sodium and calcium salt of GANTREZ® S-97, both of which are available from International Specialty Products. A particularly useful GANTREZ® MS polymer is GANTREZ® MS 995 (which has a molecular weight of about 1,000,000), which also is available from International Specialty Products.

The hydrophilic precursor component may have any suitable molecular weight. Suitable molecular weights range from about 900,000 to about 5,000,000, and more desirably from about 200,000 to about 5,000,000.

In particular, when the hydrophilic precursor component is GANTREZ® AN-119, the molecular weight is approximately 200,000. When the hydrophilic precursor component is GANTREZ® AN-903, the molecular weight is approximately 800,000. When the hydrophilic precursor component is GANTREZ® AN-139, the molecular weight is approximately 1,000,000. When the hydrophilic precursor component is GANTREZ® AN-169, the molecular weight is approximately 2,000,000.

Moreover, when the hydrophilic precursor component is GANTREZ® S-96, the molecular weight is approximately 700,000. When the hydrophilic precursor component is GANTREZ® S-97 powder, the molecular weight is approximately 1,200,000. When the hydrophilic precursor component is GANTREZ® S-97 solution, the molecular weight is approximately 1,500,000.

Furthermore, when the hydrophilic precursor component is GANTREZ® ES-225, the molecular weight is approximately from about 100,000 to about 150,000. When the hydrophilic precursor component is GANTREZ® ES-425, the molecular weight is approximately from about 90,000 to about 150,000. When the hydrophilic precursor component is GANTREZ® MS, the molecular weight is approximately 1,000,000.

Additionally, when the hydrophilic precursor component is PLASDONE® S-630, the molecular weight is approximately 27,000.

Effect of Exposure to a Condition that Promotes Hydrolysis

In some embodiments, the incorporation of a hydrophilic precursor component in a chewing gum composition and subsequent exposure to a condition that promotes hydrolysis will result in a chewing gum composition that degrades faster than a gum base that does not contain a hydrophilic precursor component. In particular, exposure to a condition that promotes hydrolysis enhances the breakdown of a chewing gum cud, such as a chewing gum cud that has been deposited on a surface) into particles and/or causes the chewing gum cud to become less adhesive.

Conditions that promote hydrolysis include environmental factors such as cycling weather conditions (particularly, exposure to rain, sun, frost, heat, etc., or a combination thereof). Other conditions that promote hydrolysis include exposure to cleaning processes, including the action of alkaline components such as detergents. Still other conditions that promote hydrolysis include the effect of mechanical agitation upon mastication. It will be understood that any of the aboveidentified conditions may act alone or in combination to promote hydrolysis and thereby promote degradability of a chewing gum. Moreover, the mechanical and frictional effects of pedestrian and vehicle traffic may act in combination with any of the aforementioned conditions to promote degradability of a chewing gum.

Effect of Exposure to an Alkaline Component Having a pH of About 8 to About 14

In some embodiments, the incorporation of a hydrophilic precursor component in a chewing gum base and/or chewing gum composition and subsequent exposure to a cleaning process (including exposure to an alkaline component such as a cleaning detergent) will result in a chewing gum base and/or chewing gum composition that degrades faster than a chewing gum base and/or chewing gum composition that does not contain a hydrophilic precursor component. In particular, the incorporation of a hydrophilic precursor component in a chewing gum base and/or chewing gum composition and subsequent exposure to an alkaline component (such as a cleaning detergent) having a pH between about 8 and about 14 will result in a chewing gum base and/or chewing gum composition that degrades faster than a chewing gum base and/or chewing gum composition that does not contain a hydrophilic precursor component.

Effect of Exposure to Rainwater and/or Sunlight

In some embodiments, the incorporation of a hydrophilic precursor component in a chewing gum base and/or chewing gum composition and subsequent exposure to rainwater and/or sunlight (for example, exposure to cycling conditions of rainwater and/or sunlight) will result in a chewing gum base and/or composition that degrades faster than a chewing gum base and/or chewing gum composition that does not contain a hydrophilic precursor component. Moreover, in some embodiments, exposure of an inventive chewing gum base and/or chewing gum composition containing a hydrophilic precursor component (such as a GANTREZ® copolymer and/or a salt thereof) to rainfall will desirably breakdown the chewing gum base and/or chewing gum composition to a powder which may be removed from a surface by brushing.

Effect of Exposure to Deionised Water

In some embodiments, the incorporation of a hydrophilic precursor component in a chewing gum base and/or composition and subsequent exposure to deionised water will result in a chewing gum base and/or composition that degrades faster than a chewing gum base and/or chewing gum composition that does not contain a hydrophilic precursor component.

Effect of Filler Component

In some embodiments, a gum base containing a hydrophilic precursor component will degrade faster in the presence of a filler component than in the absence of the filler component upon exposure to a condition that promotes hydrolysis. In particular, in some embodiments, a gum base containing, e.g., talc, calcium carbonate, dicalcium phosphate, and a hydrophilic precursor component will degrade faster upon exposure to a condition that promotes hydrolysis than a like gum base that does not contain talc as a filler component. Moreover, it has unexpectedly been discovered that gum bases that contain talc as a filler component in combination with a hydrophilic precursor component will degrade faster in some embodiments than gum bases that contain a carbonate as a filler component in combination with a hydrophilic precursor component upon exposure to a condition that promotes hydrolysis. Without wishing to be bound to any particular theory, it is theorized that enhanced hydrolysis is catalyzed by the carbonate filler, thereby resulting in increased extraction of the GANTREZ® copolymer.

The filler may be in the gum base, in the chewing gum composition portion or in both the gum base and the chewing gum portion. Without wishing to be bound to any particular theory, it is theorized that the filler creates a matrix that promotes the penetration of the hydrophilic precursor component within the gum base, thereby promoting the hydrolysis and consequent degradation of the gum base upon exposure to a condition that promotes hydrolysis.

Effect of Order of Addition of Hydrophilic Precursor Component

In some embodiments, incorporating a hydrophilic precursor component into a chewing gum base prior to the addition of other components such as polyols and flavoring agents will result in a chewing gum composition that exhibits increased degradability in comparison to a chewing gum composition where the hydrophilic precursor component is added after the polyols and flavoring agents are added. Moreover, in some embodiments, incorporating a hydrophilic precursor component into a chewing gum base prior to the addition of other components such as polyols and flavoring agents will allow lower amounts of the hydrophilic precursor component to be used to achieve increased degradation.

Without wishing to be bound to any theory, it is postulated that the incorporation of a GANTREZ® copolymer containing an anhydride and/or a salt thereof, whether formed before or after formulation, into a gum base prior to the addition of polyols improves retention of the GANTREZ® copolymer and/or salt thereof during stomaching, thereby allowing higher levels of fragmentation to be achieved with lower levels of GANTREZ® copolymer and/or a salt thereof. In particular, without wishing to be bound to any theory, it is postulated that adding the GANTREZ® copolymer and/or a salt thereof, whether formed before or after formulation, prior to the addition of the polyols decreases the likelihood of an unwanted partial reaction of the anhydride with the hydroxyl groups of the polyols (which results in increased hydrophilicity of the GANTREZ® copolymer and/or salt thereof and consequent enhanced premature extraction from the gum). Thus, it is postulated that the incorporation of GANTREZ® copolymer and/or a salt thereof, whether formed before or after formulation, into the hydrophobic gum base may lead to an initial protective effective.

Effect of pH

In general, the rate of fragmentation of a chewing gum composition containing a hydrophilic precursor component increases with increasing pH. In particular, by increasing the pH, particularly above 7.0, it is possible to decrease the amount of time (i.e., the lag time) required for the chewing gum composition to hydrate and fragment.

Effect of the Concentration of the Hydrophilic Precursor Component

In general, the rate of fragmentation of a chewing gum composition containing a hydrophilic precursor component increases with increasing amounts of the hydrophilic precursor component.

Rate of Fragmentation

In some embodiments, chewing gum bases containing a hydrophilic precursor component in accordance with the present invention will begin to fragment after approximately 2 hours and will completely fragment within 48 hours. In particular, in some embodiments, a chewing gum composition containing 10% of a GANTREZ® copolymer and/or a salt thereof (whether formed before or after formulation) (particularly, GANTREZ AN™ and/or a salt thereof) in accordance with the present invention that is exposed to an alkaline component having a pH of about 12 will begin to show signs of fragmentation (particularly, a slight whitening and roughening of the surface) after approximately 2 hours and will completely fragment within 48 hours of exposure to an alkaline component having a pH of about 12.

In some embodiments, a chewing gum composition containing 7.5 wt. % of a GANTREZ® copolymer and/or a salt thereof (whether formed before or after formulation) will begin to show signs of surface fragmentation after about 3 days of exposure to an alkaline component having a pH of about 8.0 and will substantially or completely fragment after about one week of exposure to an alkaline component having a pH of about 8.0

In yet other embodiments, a chewing gum composition containing 5 wt. % of a GANTREZ® copolymer and/or a salt thereof (whether formed before or after formulation), particularly, a talc-based chewing gum composition containing 5 wt. % of a GANTREZ® copolymer and/or a salt thereof, that has been stomached for 10 minutes will exhibit rapid fragmentation within four hours after exposure to an alkaline component (particularly, a 50% aqueous solution of a domestic surface cleaning product).

In still other embodiments, a chewing gum composition containing 5 wt. % of a GANTREZ® copolymer and/or a salt thereof (whether formed before or after formulation), particularly, a talc-based chewing gum composition containing 5 wt. % of a GANTREZ® copolymer and/or a salt thereof that has been stomached for 10 minutes, will exhibit rapid fragmentation after 139 hours of exposure to rain water.

In some embodiments, the hydrophilic precursor polymer is used in chewing gum bases and/or compositions containing elastomer solvents. In other embodiments, the hydrophilic precursor polymer is used in chewing gum bases and/or compositions that do not contain elastomer solvents. In particular, elastomer solvents may or may not be present in the present inventive compositions.

In some embodiments, the incorporation of the hydrophilic precursor polymer in the chewing gum base and the subsequent exposure of the chewing gum base to a condition that promotes hydrolysis render chewing gum compositions containing the chewing gum base less sticky.

Advantages of Use of Hydrophilic Precursor Component

In addition to promoting the fragmentation of a chewing gum composition upon exposure to a condition that promotes hydrolysis, the use of hydrophilic precursor component is beneficial from an organoleptic perspective. In particular, by using a hydrophilic precursor component, it is possible to delay the onset of the hydrophilic character of the gum, thereby enabling the gum to have a perceived texture during mastication.

Other Aspects

The elastomers (rubbers) employed in the gum base will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and combinations thereof. Examples of synthetic elastomers include, without limitation, styrene-butadiene copolymers (SBR), polyisobutylene, isobutylene-isoprene copolymers, polyethylene, polyvinyl acetate and the like, and combinations thereof. Specific examples of elastomers include polyisobutylene, styrene butadiene rubber, butyl rubber, and combinations thereof.

Additional useful polymers include: polybutylmethacrylate/acrylic acid copolymers, polyvinylacetate/vinylalcohol copolymers, microcrystalline cellulose, sodium carboxymethyl cellulose, hydroxylpropylmethyl cellulose, crosslinked cellulose acetate phthalate, crosslinked hydroxyl methyl cellulose polymers, zein, crosslinked polyvinyl pyrrolidone, polymethylmethacrylate/acrylic acid copolymers, copolymers of lactic acid, polyhydroxyalkanoates, plasticized ethylcellulose, polyvinyl acetatephthalate and combinations thereof.

In general, the elastomer employed in the gum base may have an average molecular weight of at least about 200,000. Desirably, the elastomer employed in the gum base has an average molecular weight from about 200,000 to about 2,000,000.

In some embodiments, it is particularly useful to include an elastomer composition including a predominant amount of a material selected from polyisobutylene, butyl rubber, butadiene-styrene rubber and combinations thereof, the elastomer composition having an average molecular weight of at least about 200,000; and a mastication processing aid, wherein the addition of the non-stick and/or degradability inducing component maintains the glass transition temperature of the elastomer within a three degree (3°) range, i.e., +/− three degrees. By "predominant" is meant that the composition includes greater than about 50% to about 98% of a material selected from polyisobutylene, butyl rubber, butadiene-styrene rubber and combinations thereof.

The amount of elastomer employed in the gum base may vary depending upon various factors such as the type of gum base used, the consistency of the gum composition desired and the other components used in the composition to make the final chewing gum product. In general, the elastomer may be present in the gum base in an amount from about 1% to about 30% by weight of the gum base. Desirably, the elastomer is present in an amount from about 2% to about 15% by weight of the gum base. More desirably, the elastomer is present in the gum base in an amount from about 3% to about 10% by weight of the gum base.

In some embodiments, the elastomer will be present in the gum base in an amount from about 10% to about 60% by weight, desirably from about 35% to about 40% by weight.

In some embodiments, the chewing gum base may include a texture-modifier. In general, the texture-modifier has a molecular weight of at least about 2,000.

In some embodiments, the texture-modifier includes a vinyl polymer. Suitable texture-modifiers include, for example, polyvinyl acetate, polyvinyl laurate acetate, polyvinyl alcohol or mixtures thereof.

Desirably, the texture-modifier is present in an amount from about 15% to about 70% by weight of the gum base. More desirably, the texture-modifier is present in an amount from about 20% to about 60% by weight of the gum base. Most desirably, the texture-modifier is present in an amount from about 30% to about 45% by weight of the gum base.

In addition to the components set out above, the gum base may include a variety of other ingredients, such as components selected from elastomer solvents, emulsifiers, plasticizers, fillers, and mixtures thereof. As mentioned above, the use of elastomer solvents is not needed to masticate the rubber during the manufacturing process. It may be present in limited amounts, but can lessen from the non-stick properties of the invention if used in amounts above about 5% by weight of the gum base. In certain embodiments of the invention, elastomer solvents may be used in amounts of about 4% to about 5% by weight of the gum base to provide non-stick properties which are sufficient to provide non-stick properties to teeth, dentures, oral implants and other oral prosthetics.

In some embodiments, the gum base may also contain less than conventional amounts of elastomer solvents to aid in softening the elastomer component. In particular, in some embodiments, such solvents are not required, but may be used in limited amounts along with the non-stick and/or degradability inducing components. By less than conventional amounts is meant that the elastomer solvent is employed in the gum base, for example, in amounts from about 0% to about 5.0% and preferably from about 0.1% to about 3.0%, by weight, of the gum base. In some embodiments, the gum base includes a maximum of about 5.0% by weight of an elastomer solvent. In other embodiments, the gum base is free of added elastomer solvents. In some embodiments the gum base is also free of added waxes.

In other embodiments, conventional amounts of elastomer solvents are incorporated in the gum bases to aid in softening the elastomer component.

Such elastomer solvents may include those elastomer solvents known in the art, for example, terpinene resins such as polymers of alpha-pinene or beta-pinene, methyl, glycerol and pentaerythritol esters of rosins and modified rosins and gums such as hydrogenated, dimerized and polymerized rosins, and mixtures thereof. Examples of elastomer solvents suitable for use herein may include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof.

Desirably, the incorporation of an elastomer solvent in the gum base does not interfere with the non-stick inducing components of the gum base and/or with the ability of the gum base to degrade. In particular, in some embodiments where non-stickiness or reduced stickiness is desired, the elastomer solvent desirably softens the gum base without contributing to stickiness. Moreover, the Tg of the gum base desirably does not change more than +/− three (3°) upon incorporation of the elastomer solvent in the gum base in some embodiments where non-stickiness or reduced stickiness is desired.

In some embodiments, when a hydrophilic precursor component is incorporated into the inventive gum bases, an elastomer solvent may or may not be present. In particular, in some embodiments when a hydrophilic precursor component is used, the elastomer solvent is present is less than conventional amount, i.e., in amounts from about 0% to about 5% and preferably from about 0.1% to about 3%, by weight, of the gum base. In other embodiments when a hydrophilic precursor component is used, the elastomer solvent is present in conventional amounts, i.e., in amounts greater than about 5% by weight for the gum base. For example, the elastomer solvent may be present in an amount from about 2.0% to about 15% and, more particularly, from about 5% by weight to about 15% by weight of the gum base and, even more particularly, in amounts from about 7% by weight of the gum base to about 11% by weight of the gum base.

In some embodiments, the elastomer solvent employed may have at least one hydrophilic portion and at least one hydrophobic portion such that the hydrophilic portion orients inwardly within a gum base and such that the hydrophilic portion orients outwardly within a gum base made from elastomers. Suitable elastomer solvents having at least one hydrophilic portion and at least on hydrophobic portion include, for example, methyl ester liquid rosin. In some embodiments, it is especially useful to incorporate a methyl ester liquid rosin in relatively low amounts. Methyl ester liquid rosin interferes less with the non-stick and/or degradability inducing components as compared to other resins, but yet acts to increase softening of the gum base without contributing to increased stickiness when used in combination with the non-stick inducing component.

Desirably, in some embodiments, a methyl ester liquid rosin is incorporated in a gum base in an amount from about 0.5% by weight to about 5.0% by weight of the gum base. More desirably, a methyl ester liquid rosin is incorporated in a gum base in an amount from about 1.0% by weight to about 3.0% by weight of the gum base.

The gum base also may include emulsifiers which aid in dispersing the immiscible components of the gum base into a single stable system. The emulsifiers useful in this invention include glyceryl monostearate, lecithin, fatty acid monoglycerides, diglycerides, propylene glycol monostearate, and the like, and mixtures thereof. In some embodiments, the emulsifier may be employed in amounts from about 0% to about 50% and, more specifically, from about 2% to about 7%, by weight, of the gum base. In other embodiments, the emulsifier may be employed in amounts from about 2% to about 15% and, more specifically, from about 7% to about 11% by weight of the gum base.

The gum base also may include plasticizers or softeners to provide a variety of desirable textures and consistency properties. Because of the low molecular weight of these ingredients, the plasticizers and softeners are able to penetrate the fundamental structure of the gum base making it plastic and less viscous. Useful plasticizers and softeners include triacetin (glyceryl triacetate), lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, waxes, and the like, and mixtures thereof. Other softeners include carob, tragacanth, locust bean, and carboxymethyl cellulose. In some embodiments, the aforementioned plasticizers and softeners are generally employed in the gum base in amounts up to about 20% by weight of the gum base, and more specifically in amounts from about 2% to about 12%, by weight of the gum base. In other embodiments, the plasticizers and softeners are generally employed in the gum base in amounts up to about 20% by weight of the gum base and, more specifically, in amounts from about 9% to about 17% by weight of the gum base.

Plasticizers also include hydrogenated vegetable oils, such as soybean oil and cottonseed oils, which may be employed alone or in combination. These plasticizers provide the gum base with good texture and soft chew characteristics. These plasticizers and softeners are generally employed in amount from about 5% to about 14% and, more specifically, in amounts from about 5% to about 13.5%, by weight, of the gum base.

Suitable waxes, include for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like. Wax can be present in the gum base in an amount from about 1% to about 15% by weight of the gum base. In some embodiment, when used, the wax is desirably present in an amount from about 2% to about 10% by weight of the gum base and, more desirably, is present in an amount from about 3% to about 8% by weight of the gum base. In other embodiments when wax is used, the wax may be present in the gum base in an amount from about 6% to about 10% and, more desirably, from about 7% to about 9.5% by weight of the gum base.

In some embodiments, the gum base includes a maximum of about 8% of a wax. In other embodiments, the gum base is free of added wax.

In some embodiments when wax is present, the waxes employed may have a melting point below about 60° C. and, more desirably, between about 45° C. and about 55° C. The wax having a low melting point may be, for example, a paraffin wax.

In addition to low melting point waxes, in some embodiments, waxes having a higher melting point may be used in the gum base in amounts up to about 5% by weight of the gum base. Such high melting waxes include, for example, beeswax, vegetable wax, candelilla wax, carnuba wax, most petroleum waxes, and the like and mixtures thereof.

Anhydrous glycerin also may be employed as a softening agent, such as the commercially available United States Pharmacopeia (USP) grade. Glycerin is a syrupy liquid with a sweet warm taste and has a sweetness of about 60% of that of cane sugar. Because glycerin is hygroscopic, the anhydrous glycerin may be maintained under anhydrous conditions throughout the preparation of the chewing gum composition.

In some embodiments, the gum base of this invention may include bulking agents that are water-insoluble and/or mineral-based. In particular, the gum base of this invention also may include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, starch, tricalcium phosphate, dicalcium phosphate, calcium sulfate, atomite, and the like, and mixtures thereof. These fillers or adjuvants may be used in the gum base compositions in various amounts. The filler may be present in an amount from about zero to about 60% by weight of the gum base and/or composition and, more specifically, from about zero to about 50% by weight and, even more specifically, from about zero to about 40%, by weight, of the gum base and/or chewing gum composition. In some embodiments, the filler may be present in an amount from about 0% by weight to about 30% by weight of the gum base and/or chewing gum composition. Moreover, in some embodiments, the amount of filler will be from about zero to about 15% by weight of the gum base and/or chewing gum composition and, more specifically, from about 3% to about 11%, by weight, of the gum base and/or chewing gum composition. In other embodiments, the amount of filler, when used, may be present in an amount from about 15% to about 40% and, desirably, from about 20% to about 30% by weight of the gum base.

In some embodiments, the gum base also may include at least one hydrophilic, water-absorbing polymer to help reduce the stickiness of the gum base and any resultant gum product made from the gum base. Suitable hydrophilic, water-absorbing polymers include the following: native and modified starches; chemically modified cellulose, including methyl cellulose, ethyl cellulose, carboxymethyl cellulose, hydroxypropyl cellulose; gums including xanthan gum, carrageenan gum, guar gum, gum arabic, locust bean gum, curdlan, arabinoxylan, agara, and alginates; and pectin and gelatin.

In general, at least one hydrophilic, water-absorbing polymer is included in an amount from about 0.1% to about 10% by weight of the gum base. Desirably, at least one hydrophilic, water-absorbing polymer is present in an amount from about 2% by weight to about 8% by weight of the gum base. More desirably, at least one hydrophilic, water-absorbing polymer is present in an amount from about 3% by weight to about 6% by weight of the gum base.

In some embodiments, at least one antioxidant may be present in the chewing gum bases. Desirably, the antioxidant is water-soluble. Suitable antioxidants include, for example, butylated hydroxytoluene (BHT), butylated hydroxyanisole (BHA), propyl gallate, vitamin C, vitamin E and mixtures thereof.

When an antioxidant is included in the gum base, the antioxidant is generally present in an amount from about 0.01% by weight to about 0.3% by weight of the gum base. Desirably, the antioxidant is included in the gum base in an amount from about 0.05% by weight to about 0.1% by weight of the gum base. When incorporated in embodiments together with the agent capable of degrading the elastomer, it is desirable to keep the antioxidant down to lower amounts to prevent any interference with free radicals which may be generated by photosensitizers.

In some embodiments, the chewing gum compositions include at least one elastomer and at least one agent capable of changing the molecular weight of the elastomer over time, such as by degrading the elastomer or increasing the molecular weight of the elastomer.

In some embodiments, a chewing gum base as discussed above may be incorporated in a chewing gum composition in an amount from about 5% by weight to about 95% by weight. More desirably, a chewing gum base may be present in an amount from about 28% by weight to about 42% by weight of the total chewing gum composition, and even more specifically, the range may be from about 28% to about 30% by weight of the total chewing gum composition. In the case of center-filled chewing gum compositions, this weight percent may be based on the gum region rather than the center-filled region.

The present inventive chewing gum compositions may include bulk sweeteners such as sugars, sugarless bulk sweeteners, or the like, or mixtures thereof. In some embodiments, bulk sweeteners generally are present in amounts of about 5% to about 99% by weight of the chewing gum composition.

Suitable sugar sweeteners generally include mono-saccharides, di-saccharides and poly-saccharides such as but not limited to, sucrose (sugar), dextrose, maltose, dextrin, xylose, ribose, glucose, mannose, galactose, fructose (levulose), invert sugar, fructo oligo saccharide syrups, partially hydrolyzed starch, corn syrup solids, isomaltulose, and mixtures thereof.

Suitable sugarless bulk sweeteners include sugar alcohols (or polyols) such as, but not limited to, sorbitol, xylitol, mannitol, galactitol, maltitol, hydrogenated isomaltulose (ISOMALT), lactitol, erythrytol, hydrogenated starch hydrolysate, stevia and mixtures thereof.

Suitable hydrogenated starch hydrolysates include those disclosed in U.S. Pat. Nos. 25,959, 3,356,811, 4,279,931 and various hydrogenated glucose syrups and/or powders which contain sorbitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN®, a commercially available product manufactured by Roquette Freres of France, and HYSTAR®, a commercially available product manufactured by SPI Polyols, Inc. of New Castle, Del., also are useful.

The sweetening agents used may be selected from a wide range of materials including water-soluble sweeteners, water-soluble artificial sweeteners, water-soluble sweeteners derived from naturally occurring water-soluble sweeteners, dipeptide based sweeteners, and protein based sweeteners, including mixtures thereof. The term "sweetener" or "sweetening agent" may encompass bulk sweeteners as well as high intensity sweeteners. Without being limited to particular sweeteners, representative categories and examples include:

(a) water-soluble sweetening agents such as dihydrochalcones, monellin, stevia, steviosides, rebaudioside A, glycyrrhizin, dihydroflavenol, and sugar alcohols such as sorbitol, mannitol, maltitol, xylitol, erythritol, and L-aminodicarboxylic acid aminoalkenoic acid ester amides, such as those disclosed in U.S. Pat. No. 4,619,834, which disclosure is incorporated herein by reference, and mixtures thereof;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and mixtures thereof;

(c) dipeptide based sweeteners, such as L-aspartic acid derived sweeteners, such as L-aspartyl-L-phenylalanine methyl ester (Aspartame) and materials described in U.S. Pat. No. 3,492,131, L-alphaaspartyl-N-(2,2,4,4-tetramethyl-3-thietanyl)-D-alaninamide hydrate (Alitame), N-[N-(3,3-dimethylbutyl)-L-aspartyl]-L-phenylalanine 1-methyl ester (Neotame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, and mixtures thereof;

(d) water-soluble sweeteners derived from naturally occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructofuranoside, or 4,1'-dichloro-4,1'-dideoxygalactosucrose; 1',6'-dichloro1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro4,6,1',6'-tetradeoxygalacto-sucrose; and 4,6,1',6'-tetradeoxy-sucrose, and mixtures thereof;

(e) protein based sweeteners such as thaumaoccous danielli (Thaumatin I and II); and (f) the naturally occurring sweetener monatin (2-hydroxy-2-(indol-3-ylmethyl)4-aminoglutaric acid) and its derivatives; and (g) the sweetener Lo han guo (sometimes also referred to as "Lo han kuo").

The intense sweetening agents may be used in many distinct physical forms well-known in the art to provide an initial burst of sweetness and/or a prolonged sensation of sweetness. Without being limited thereto, such physical forms include free forms, such as spray dried, powdered, beaded forms, encapsulated forms, and mixtures thereof.

In general, the sweetener is present in an amount sufficient to provide the level of sweetness desired, and this amount may vary with the sweetener or combination of sweeteners selected. The exact range of amounts for each type of sweetener may be selected by those skilled in the art. In general, a sweetener is present in amounts from about 0.001% to about 3.0% by weight and, more specifically, from about 0.01% to about 2.0% by weight of the chewing gum composition.

The chewing gum compositions also may include flavors (i.e., flavorings or flavor agents). Flavors which may be used include those flavors known to the skilled artisan, such as natural and artificial flavors. These flavors may be chosen from synthetic flavor oils and flavoring aromatics and/or oils, oleoresins and extracts derived from plants, leaves, flowers, fruits, and so forth, and combinations thereof. Non-limiting representative flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, yazu, sudachi, and fruit essences including apple, pear, peach, grape, strawberry, raspberry, cherry, plum, pineapple, watermelon, apricot, banana, melon, ume, cherry, raspberry, blackberry, tropical fruit, mango, mangosteen, pomegranate, papaya, and so forth. Other potential flavors include a milk flavor, a butter flavor, a cheese flavor, a cream flavor, and a yogurt flavor; a vanilla flavor; tea or coffee flavors, such as a green tea flavor, a oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a camomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor. These flavors may be used in liquid or solid form and may be used individually or in admixture. Commonly used flavors include mints such as peppermint, menthol, spearmint, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in Chemicals Used in Food Processing, publication 1274, pages 63-258, by the National Academy of Sciences, may be used. This publication is incorporated herein by reference.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, and mixtures thereof.

In some embodiments, the flavor agent may be employed in either liquid form and/or dried form. When employed in the latter form, suitable drying means such as spray drying the oil may be used. Alternatively, the flavor agent may be absorbed onto water-soluble materials, such as cellulose, starch, sugar, maltodextrin, gum arabic and so forth or may be encapsulated. The actual techniques for preparing such dried forms are well-known.

In some embodiments, the flavor agents may be used in many distinct physical forms well-known in the art to provide an initial burst of flavor and/or a prolonged sensation of flavor. Without being limited thereto, such physical forms include free forms, such as spray dried, powdered, beaded forms, encapsulated forms, and mixtures thereof.

The amount of flavor agent employed herein may be a matter of preference subject to such factors as the individual flavor and the strength of flavor desired. Thus, the amount of flavoring may be varied in order to obtain the result desired in the final product and such variations are within the capabilities of those skilled in the art without the need for undue experimentation. In general, the flavor agent is present in amounts from about 0.02% to about 5.0% by weight and, more specifically, from about 0.1% to about 4.0% by weight of the chewing gum product, and even more specifically, about 0.8% to about 3.0%

A variety of other traditional ingredients also may be included in the chewing gum products in effective amounts such as coloring agents, antioxidants, preservatives, and the like. Coloring agents may be used in amounts effective to produce the desired color. The coloring agents may include pigments which may be incorporated in amounts up to about 6%, by weight of the composition. For example, titanium dioxide may be incorporated in amounts up to about 2%, and preferably less than about 1%, by weight of the composition. The colorants may also include natural food colors and dyes suitable for food, drug and cosmetic applications. These colorants are known as F.D.& C. dyes and lakes. The materials acceptable for the foregoing uses are preferably water-soluble. Illustrative non-limiting examples include the indigoid dye known as F.D.& C. Blue No. 2, which is the disodium salt of 5,5-indigotindisulfonic acid. Similarly, the dye known as F.D.& C. Green No. 1 comprises a triphenylmethane dye and is the monosodium salt of 4-[4-(N-ethyl-p-sulfoniumbenzylamino)diphenylmethylene]-[1-(N-ethyl-N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857-884, which text is incorporated herein by reference.

Additional additives, such as sensates including physiological cooling agents; warming agents and tingling agents; throat-soothing agents; spices; herbs and herbal extracts, tooth-whitening agents; breath-freshening agents; vitamins and minerals; bioactive agents; caffeine; nicotine; drugs and other actives may also be included in any or all portions or regions of the chewing gum products. Such components may be used in amounts sufficient to achieve their intended effects.

With respect to cooling agents, a variety of well-known cooling agents may be employed. For example, among the useful cooling agents are included menthol, xylitol, erythritol, dextrose, sorbitol, menthane, menthone, ketals, menthone ketals, menthone glycerol ketals, substituted p-menthanes, acyclic carboxamides, mono menthyl glutarate, substituted cyclohexanamides, substituted cyclohexane carboxamides, substituted ureas and sulfonamides, substituted menthanols, hydroxymethyl and hydroxymethyl derivatives of p-menthane, 2-mercapto-cyclo-decanone, 2-isopropanyl-5-methyl-cyclohexanol, hydroxycarboxylic acids with 2-6 carbon atoms, cyclohexanamides, menthyl acetate, menthyl lactate, methyl salicylate, N,2,3-trimethyl-2-isopropyl butanamide (WS-23), N-ethyl-p-menthane-3-carboxamide (WS-3), menthyl succinate, isopulegol, 3,1-menthoxypropane 1,2-diol, glutarate esters, 3-(1-menthoxy)-2-methylpropane-1,2-diol, p-menthane-2,3-diol, p-menthane-3,8-diol, 6-isopropyl-9-methyl-1,4-dioxaspiro[4,5]decane-2-methanol, menthyl succinate and its alkaline earth metal salts, trimethylcyclohexanol, N-ethyl-2-isopropyl-5-methylcyclohexanecarboxamide, Japanese mint oil, peppermint oil, 3-(1-menthoxy)ethan-1-ol, 3-(1-menthoxy)propan-1-ol, 3-(1-menthoxy)butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide, n-ethyl-t-2-c-6 nonadienamide, N,N-dimethyl menthyl succinamide, substituted p-menthanes, substituted p-menthane-carboxamides, 2-isopropanyl-5-methylcyclohexanol (from Hisamitsu Pharmaceuticals, hereinafter "isopregol"); menthone glycerol ketals (FEMA 3807, tradename FRESCOLAT® type MGA); 3-1-menthoxypropane-1,2-diol (from Takasago, FEMA 3784); and menthyl lactate; (from Haarman & Reimer, FEMA 3748, tradename FRESCOLAT® type ML), WS-30, WS-14, Eucalyptus extract (p-Mehtha-3,8-Diol), Menthol (its natural or synthetic derivatives), Menthol PG carbonate, Menthol EG carbonate, Menthol glyceryl ether, N-tertbutyl-p-menthane-3-carboxamide, P-menthane-3-carboxylic acid glycerol ester, Methyl-2-isopryl-bicyclo (2.2.1), Heptane-2-carboxamide; and Menthol methyl ether, and menthyl pyrrolidone carboxylate among others, and combinations thereof. These and other suitable cooling agents are further described in the following U.S. patents, all of which are incorporated in their entirety by reference hereto: U.S. Pat. Nos. 4,230,688 and 4,032,661 to Rowsell et al.; 4,459,425 to Amano et al.; 4,136,163 to Watson et al.; 5,266,592 to Grub et al.; and U.S. Pat. No. 6,627,233 to Wolf et al. Cooling agents are generally present in amount of 0.01% to about 10.0%.

Warming agents may be selected from a wide variety of compounds known to provide the sensory signal of warming to the individual user. These compounds offer the perceived sensation of warmth, particularly in the oral cavity, and often enhance the perception of flavors, sweeteners and other organoleptic components. Useful warming agents include those having at least one allyl vinyl component, which may bind to oral receptors. Examples of suitable warming agents include, but are not limited to: vanillyl alcohol n-butylether (TK-1000, supplied by Takasago Perfumery Company Ltd., Tokyo, Japan); vanillyl alcohol n-propylether; vanillyl alcohol isopropylether; vanillyl alcohol isobutylether; vanillyl alcohol n-aminoether; vanillyl alcohol isoamylether; vanillyl alcohol n-hexylether; vanillyl alcohol methylether; vanillyl alcohol ethylether; gingerol; shogaol; paradol; zingerone; capsaicin; dihydrocapsaicin; nordihydrocapsaicin; homocapsaicin; homodihydrocapsaicin; ethanol; isopropyl alcohol; isoamylalcohol; benzyl alcohol; glycerine; chloroform; eugenol; cinnamon oil; cinnamic aldehyde; phosphate derivatives thereof; and combinations thereof.

Tingling agents may provide a tingling, stinging or numbing sensation to the user. Tingling agents include, but are not limited to: Jambu Oleoresin or para cress (*Spilanthes* sp.), in which the active ingredient is Spilanthol; Japanese pepper extract (*Zanthoxylum peperitum*), including the ingredients known as Saanshool-I, Saanshool-II and Sanshoamide; black pepper extract (piper nigrum), including the active ingredients chavicine and piperine; Echinacea extract; Northern Prickly Ash extract; and red pepper oleoresin. In some embodiments, alkylamides extracted from materials such as jambu or sanshool may be included. Additionally, in some embodiments, a sensation is created due to effervescence. Such effervescence is created by combining an alkaline material with an acidic material, either or both of which may be encapsulated. In some embodiments, an alkaline material may include alkali metal carbonates, alkali metal bicarbonates, alkaline earth metal carbonates, alkaline earth metal bicarbonates and mixtures thereof. In some embodiments, an acidic material may include acetic acid, adipic acid, ascorbic acid, butyric acid, citric acid, formic acid, fumaric acid, glyconic acid, lactic acid, phosphoric acid, malic acid, oxalic acid, succinic acid, tartaric acid and combinations thereof. Examples of "tingling" type sensates can be found in U.S. Pat. No. 6,780,443, the entire contents of which are incorporated herein by reference for all purposes. Tingling agents are described in U.S. Pat. No. 6,780,443 to Nakatsu et al., U.S. Pat. No. 5,407,665 to McLaughlin et al., U.S. Pat. No. 6,159,509 to Johnson et al. and U.S. Pat. No. 5,545,424 to Nakatsu et al., each of which is incorporated by reference herein in its entirety.

The sensation of warming or cooling effects may be prolonged with the use of a hydrophobic sweetener as described in U.S. Patent Application Publication 2003/0072842 A1 to Johnson et al. which is incorporated in its entirety herein by reference. For example, such hydrophobic sweeteners include those of the formulae I-XI referenced therein. Perillartine may also be added as described in U.S. Pat. No. 6,159,509 also incorporated in its entirety herein by reference.

Breath-freshening agents, in addition to the flavors and cooling agents described hereinabove, may include a variety of compositions with odor-controlling properties. Such breath-freshening agents may include, without limitation, cyclodextrin and magnolia bark extract. The breath-freshening agents may further be encapsulated to provide a prolonged breath-freshening effect. Examples of malodor-controlling compositions are included in U.S. Pat. No. 5,300,305 to Stapler et al. and in U.S. Patent Application Publication Nos. 2003/0215417 and 2004/0081713, which are incorporated in their entirety herein by reference.

A variety of oral care products also may be included in some embodiments of the instant chewing gum compositions. Such oral care products may include tooth whiteners, stain removers, anti-calculus agents, and anti-plaque agents. Oral care agents that may be used include those actives known to the skilled artisan, such as, but not limited to, surfactants, breath-freshening agents, anti-microbial agents, antibacterial agents, oral malodor control agents, fluoride compounds, quaternary ammonium compounds, remineralization agents and combinations thereof. Examples of these include, but are not limited to hydrolytic agents including proteolytic enzymes, abrasives such as hydrated silica, calcium carbonate, sodium bicarbonate and alumina, other active stain-removing components such as surface-active agents, such as anionic surfactants such as sodium stearate, sodium palminate, sulfated butyl oleate, sodium oleate, salts of fumaric acid, glycerol, hydroxylated lecithin, sodium lauryl sulfate and chelators such as polyphosphates, which are typically employed in dentifrice compositions as tartar control ingredients. Also included are tetrasodium pyrophosphate and sodium tri-polyphosphate, sodium tripolyphosphate, xylitol, hexametaphosphate, and an abrasive silica. Further examples are included in the following U.S. patents which are incorporated in their entirety herein by reference: U.S. Pat. Nos. 5,227,154 to Reynolds, 5,378,131 to Greenberg and 6,685,916 to Holme et al. Suitable oral care actives such as remineralization agents, antimicrobials, and tooth-whitening agents are described in assignee's co-pending U.S. patent application Ser. No. 10/901,511, filed Jul. 29, 2004 and entitled "Tooth-Whitening Compositions and Delivery Systems Therefor," which is incorporated herein by reference in its entirely, and the like, and mixtures thereof.

A variety of drugs, including medications, herbs, and nutritional supplements may also be included in the chewing gum compositions. Examples of useful drugs include ace-inhibitors, antianginal drugs, anti-arrhythmias, anti-asthmatics, anti-cholesterolemics, analgesics, anesthetics, anti-convulsants, anti-depressants, anti-diabetic agents, anti-diarrhea preparations, antidotes, anti-histamines, anti-hypertensive drugs, anti-inflammatory agents, anti-lipid agents, anti-manics, anti-nauseants, anti-stroke agents, anti-thyroid preparations, anti-tumor drugs, anti-viral agents, acne drugs, alkaloids, amino acid preparations, anti-tussives, anti-uricemic drugs, anti-viral drugs, anabolic preparations, systemic and non-systemic anti-infective agents, anti-neoplastics, anti-parkinsonian agents, anti-rheumatic agents, appetite stimulants, biological response modifiers, blood modifiers, bone metabolism regulators, cardiovascular agents, central nervous system stimulates, cholinesterase inhibitors, contraceptives, decongestants, dietary supplements, dopamine receptor agonists, endometriosis management agents, enzymes, erectile dysfunction therapies such as sildenafil citrate, which is currently marketed as Viagra®, fertility agents, gastrointestinal agents, homeopathic remedies, hormones, hypercalcemia and hypocalcemia management agents, immunomodulators, immunosuppressives, migraine preparations, motion sickness treatments, muscle relaxants, obesity management agents, osteoporosis preparations, oxytocics, parasympatholytics, parasympathomimetics, prostaglandins, psychotherapeutic agents, respiratory agents, sedatives, smoking cessation aids such as bromocryptine or nicotine, sympatholytics, tremor preparations, urinary tract agents, vasodilators, laxatives, antacids, ion exchange resins, anti-pyretics, appetite suppressants, expectorants, anti-anxiety agents, anti-ulcer agents, anti-inflammatory substances, coronary dilators, cerebral dilators, peripheral vasodilators, psycho-tropics, stimulants, anti-hypertensive drugs, vasoconstrictors, migraine treatments, antibiotics, tranquilizers, anti-psychotics, anti-tumor drugs, anti-coagulants, anti-thrombotic drugs, hypnotics, anti-emetics, anti-nauseants, anti-convulsants, neuromuscular drugs, hyper- and hypo-glycemic agents, thyroid and anti-thyroid preparations, diuretics, anti-spasmodics, terine relaxants, anti-obesity drugs, erythropoietic drugs, anti-asthmatics, cough suppressants, mucolytics, DNA and genetic modifying drugs, and combinations thereof.

Examples of active ingredients contemplated for use in the present inventive chewing gum compositions include antacids, H2-antagonists, and analgesics. For example, antacid dosages can be prepared using the ingredients calcium carbonate alone or in combination with magnesium hydroxide, and/or aluminum hydroxide. Moreover, antacids can be used in combination with H2-antagonists.

Analgesics include opiates and opiate derivatives, such as Oxycontin, ibuprofen, aspirin, acetaminophen, and combinations thereof that may optionally include caffeine.

Other drug ingredients for use in embodiments include anti-diarrheals such as immodium AD, anti-histamines, anti-tussives, decongestants, vitamins, and breath-fresheners. Also contemplated for use herein are anxiolytics such as Xanax; anti-psychotics such as clozaril and Haldol; non-steroidal anti-inflammatories (NSAID's) such as ibuprofen, naproxen sodium, Voltaren and Lodine, anti-histamines such as Claritin, Hismanal, Relafen, and Tavist; anti-emetics such as Kytril and Cesamet; bronchodilators such as Bentolin, Proventil; anti-depressants such as Prozac, Zoloft, and Paxil; anti-migraines such as Imigra, ACE-inhibitors such as Vasotec, Capoten and Zestril; anti-Alzheimer's agents, such as Nicergoline; and CaH-antagonists such as Procardia, Adalat, and Calan.

Moreover, some embodiments of chewing gum compositions can include H2-antagonists. Examples of suitable H2-antagonist include cimetidine, ranitidine hydrochloride, famotidine, nizatidien, ebrotidine, mifentidine, roxatidine, pisatidine and aceroxatidine.

Active antacid ingredients include, but are not limited to, the following: aluminum hydroxide, dihydroxyaluminum aminoacetate, aminoacetic acid, aluminum phosphate, dihydroxyaluminum sodium carbonate, bicarbonate, bismuth aluminate, bismuth carbonate, bismuth subcarbonate, bismuth subgallate, bismuth subnitrate, bismuth subsilysilate, calcium carbonate, calcium phosphate, citrate ion (acid or salt), amino acetic acid, hydrate magnesium aluminate sulfate, magaldrate, magnesium aluminosilicate, magnesium carbonate, magnesium glycinate, magnesium hydroxide, magnesium oxide, magnesium trisilicate, milk solids, aluminum mono-ordibasic calcium phosphate, tricalcium phosphate, potassium bicarbonate, sodium tartrate, sodium bicarbonate, magnesium aluminosilicates, tartaric acids and salts.

A variety of other nutritional supplements also may be included in the gum compositions. Virtually any vitamin or mineral may be included. For example, vitamin A, vitamin C, vitamin D, vitamin E, vitamin K, vitamin $B_6$, vitamin $B_{12}$, thiamine, riboflavin, biotin, folic acid, niacin, pantothenic acid, sodium, potassium, calcium, magnesium, phosphorus, sulfur, chlorine, iron, copper, iodine, zinc, selenium, manganese, choline, chromium, molybdenum, fluorine, cobalt and combinations thereof, may be used.

Examples of nutritional supplements are set forth in U.S. Patent Application Publication Nos. 2003/0157213 A1, 2003/0206993 and 2003/0099741 A1, which are incorporated in their entirety herein by reference.

Various herbs also may be included such as those with various medicinal or dietary supplement properties. Herbs are generally aromatic plants or plant parts that can be used medicinally or for flavoring. Suitable herbs can be used singly or in various mixtures. Commonly used herbs include Echinacea, Goldenseal, Calendula, Aloe, Blood Root, Grapefruit Seed Extract, Black Cohosh, Cranberry, Ginko Biloba, St. John's Wort, Evening Primrose Oil, Yohimbe Bark, Green Tea, Maca, Bilberry, Lutein, and combinations thereof.

Acidulants also may be included in the chewing gum compositions. Suitable acidulants include, for example, malic acid, adipic acid, citric acid, tartaric acid, fumaric acid, and mixtures thereof.

Any of the aforementioned additives for use in a chewing gum composition, as well as other conventional additives known to one having ordinary skill in the art, such as thickeners, may be incorporated into the chewing gum base of the chewing gum compositions or any coating that the chewing gum product may contain.

The chewing gum compositions of the present invention may be formed into a variety of shapes and sizes and may take various product forms, including without limitation, sticks, slabs, chunks, balls, pillows, tablet, pellet, center-filled, pressed tablet, deposited, compressed chewing gum or any other suitable format, as well as coated and uncoated forms.

When the chewing gum compositions are formed into coated products, the coating may be applied by any method known in the art. The coating composition may be present in an amount from about 2% to about 60%, more specifically from about 25% to about 35% by weight of the total center-filled gum piece or from about 25% to about 45% by weight of the total chewing gum piece and even more specifically, in an amount about 30% by weight of the gum piece.

Such coated chewing gums are typically referred to as pellet gums. The outer coating may be hard or crunchy. Any suitable coating materials known to those skilled in the art may be employed. Typically, the outer coating may include sorbitol, maltitol, xylitol, isomalt, erythritol, isomalt, and other crystallizable polyols; sucrose may also be used. Furthermore, the coating may include several opaque layers, such that the chewing gum composition is not visible through the coating itself, which can optionally be covered with a further one or more transparent layers for aesthetic, textural and protective purposes. The outer coating may also contain small amounts of water and gum arabic. The coating can be further coated with wax. The coating may be applied in a conventional manner by successive applications of a coating solution, with drying in between each coat. As the coating dries it usually becomes opaque and is usually white, though other colorants may be added. A polyol coating can be further coated with wax. The coating can further include colored flakes or speckles. If the composition includes a coating, it is possible that one or more oral care actives can be dispersed throughout the coating. This is especially preferred if one or more oral care actives is incompatible in a single phase composition with another of the actives. Flavors may also be added to yield unique product characteristics.

Other materials may be added to the coating to achieve desired properties. These materials may include, without limitations, cellulosics such as carboxymethyl cellulose, gelatin, xanthan gum, and gum arabic.

In the case of center-filled chewing gum products, the coating may also be formulated to assist with increasing the thermal stability of the gum piece and preventing leaking of the liquid fill. In some embodiments, the coating may include a gelatin composition. The gelatin composition may be added as a 40% by weight solution and may be present in the coating composition from about 5% to about 10% by weight of the coating composition, and more specifically about 7% to about 8%. The gel strength of the gelatin may be from about 130 bloom to about 250 bloom.

Other materials may be added to the coating to achieve desired properties. These materials may include without limitations, cellulosics such as carboxymethyl cellulose, gelatin, pullulan, alginate, starch, carrageenan, xanthan gum, gum arabic and polyvinyl acetate (PVA).

The coating composition may also include a pre-coating which is added to the individual gum pieces prior to an optional hard coating. The pre-coating may include an application of polyvinyl acetate (PVA). This may be applied as a solution of PVA in a solvent, such as ethyl alcohol. When an outer hard coating is desired, the PVA application may be approximately 3% to 4% by weight of the total coating or about 1% of the total weight of the gum piece (including a liquid-fill, gum region and hard coating).

Some embodiments extend to methods of processing an elastomer in a gum base. In particular, some embodiments extend to methods of processing an elastomer for use in a gum base without substantially changing the Tg of the gum base as measured by differential scanning calorimetry (DSC). Such methods include the step of mixing at least one elastomer and at least one fat.

Differential scanning calorimetry (DSC) is a thermoanalytical technique in which the difference in the amount of heat required to increase the temperature of a sample and reference are measured as a function of temperature. The basic principle underlying this technique is that, when the sample undergoes a physical transformation such as phase transitions, more (or less) heat will need to flow to it than the reference to maintain both at the same temperature. Whether more or less heat must flow to the sample depends on whether the process is exothermic or endothermic. For example, as a solid sample melts to a liquid it will require more heat flowing to the sample to increase its temperature at the same rate as the reference. This is due to the absorption of heat by the sample as it undergoes the endothermic phase transition from solid to liquid. Likewise, as the sample undergoes exothermic processes (such as crystallization) less heat is required to raise the sample temperature. By observing the difference in heat flow between the sample and reference, differential scanning calorimeters are able to measure the amount of energy absorbed or released during such transitions. DSC is used to observe more subtle phase changes, such as glass transitions.

Other embodiments extend to methods of processing a solid elastomer that include: providing a solid elastomer composition suitable for use in a chewing gum base and combining with the solid elastomer composition a non-stick and/or degradability inducing component including at least one fat having an HLB range of about 3.5 to about 13. In such methods, the non-stick and/or degradability inducing component is present in amounts sufficient to permit mastication of the solid elastomer composition into a homogenous mass.

In some embodiments, the above-described methods of processing an elastomer are carried out in the presence of very low amounts of elastomer solvent. In such embodiments, the elastomer solvent includes a maximum of about 5.0% of any gum base made by masticating an elastomer as described above.

In other embodiments, the above-described methods of processing an elastomer are carried out in the absence of added elastomer solvent.

Some embodiments extend to methods of making a chewing gum base. In some embodiments, the methods of making a chewing gum base include providing at least one elastomer and mixing at least one non-stick and/or degradability inducing component with the elastomer to form a chewing gum base, wherein the at least one non-stick and/or degradability inducing component softens the elastomer without causing the chewing gum base to become sticky. In such embodiments, the chewing gum base has reduced stickiness in the presence of the non-stick and/or degradability inducing component as compared to in the absence of the non-stick and/or degradability inducing component.

In additional embodiments, the methods of making a chewing gum base include processing an elastomer for use in a gum base without substantially changing the Tg of the gum base as measured by DSC by mixing at least one elastomer and at least one fat or oil.

Moreover, in further embodiments, the methods of making a chewing gum base include providing a solid elastomer composition suitable for use in a chewing gum base and combining with the solid elastomer composition a non-stick and/or degradability inducing component that includes at least one fat or oil having an HLB range of about 3.5 to about 13. In such methods, the non-stick and/or degradability inducing component is present in amounts sufficient to permit processing of the solid elastomer composition into a softened, processable mass.

In some embodiments, the above-described methods of making a chewing gum base may be carried out in the presence of lower than conventional amounts of elastomer solvent. In such embodiments, the elastomer solvent includes a maximum of about 5.0% of the gum base. Desirably, an elastomer solvent can be mixed with an elastomer and non-stick and/or degradability inducing component to soften the elastomer without causing the resultant chewing gum base to become sticky.

In other embodiments, the above-described methods of making a chewing gum base are carried out in the absence of added elastomer solvent.

The manner in which the gum base components are mixed is not critical and such mixing is performed using standard apparatuses known to those skilled in the art. In a typical method, at least one elastomer is admixed with at least one mastication processing aid, which for purposes of the invention includes one or more non-stick and/or degradability inducing components, and agitated for a period of from 1 to 30 minutes. The remaining ingredients, such as the texture-modifier and/or softener are then admixed, either in bulk or incrementally, while the gum base mixture is blended again for 1 to 30 minutes.

The products may be prepared using standard techniques and equipment known to those skilled in the art, which processes generally involve melting the gum base, incorporating the desired ingredients while mixing and forming the batch into individual chewing gum pieces. The apparatus useful in accordance with the embodiments described herein includes mixing and heating apparatuses well-known in the chewing gum manufacturing arts, and therefore the selection of the specific apparatus will be apparent to the artisan. For general chewing gum preparation processes which are useful in some embodiments see U.S. Pat. Nos. 4,271,197 to Hopkins et al., 4,352,822 to Cherukuri et al. and 4,497,832 to Cherukuri et al., each of which is incorporated herein by reference in its entirety.

For instance, center-fill chewing gum embodiments may include a center-fill region, which may be a liquid or powder or other solid, and a gum region. Some embodiments also may include an outer gum coating or shell, which typically provides a crunchiness to the piece when initially chewed. The outer coating or shell may at least partially surround the gum region. Center-fill chewing gums and methods of preparing same are more fully described in assignee's co-pending U.S. patent application Ser. No. 10/925,822, filed on Aug. 24, 2004 and assignee's co-pending U.S. patent application Ser. No. 11/210,954, filed on Aug. 24, 2005, both entitled "Liquid-Filled Chewing Gum Composition," the contents of both of which are incorporated herein by reference.

Some other chewing gum embodiments may be in a compressed gum format, such as, for example, a pressed tablet gum. Such embodiments may include a particulate chewing gum base, which may include a compressible gum base composition and a tableting powder. Compressed chewing gums are more fully described in assignee's co-pending U.S. Provisional Application No. 60/734,680, filed on Nov. 8, 2005, and entitled "Compressible Gum System," the contents of which are incorporated herein by reference.

The features and advantages of the present invention are more fully shown by the following examples which are provided for purposes of illustration, and are not to be construed as limiting the invention in any way.

EXAMPLES

Example 1

TABLE 1

INVENTIVE GUM BASE COMPOSITIONS A-F

| Component | % by weight | | | | | |
|---|---|---|---|---|---|---|
| | A | B | C | D | E | F |
| Polyvinylacetate (Vinnapas B 30 sp) | 42.96 | 42.96 | 42.96 | 32.65 | 30.93 | 30.93 |
| Triacetin | 7.04 | 7.04 | 7.04 | 5.35 | 5.07 | 5.07 |
| GMS[1] | 2.86 | 5.71 | 4.29 | 9.14 | 8.29 | 8.29 |
| Butyl Rubber | 0 | 0 | 0 | 0 | 0 | 0 |
| Polyisobutylene (Oppanol B 50 SF) | 10 | 5 | 10 | 5 | 10 | 5 |
| Hydrogenated cottonseed oil 70° C. melting temperature | 7.14 | 14.29 | 10.71 | 22.86 | 20.71 | 20.71 |
| Hydrogenated cottonseed oil 45° C. melting temperature | 10 | 5 | 5 | 5 | 5 | 10 |
| Talc | 20 | 20 | 20 | 20 | 20 | 20 |
| Total | 100 | 100 | 100 | 100 | 100 | 100 |

[1]acronym for glycerol monostearate

TABLE 2

INVENTIVE GUM BASE COMPOSITIONS G–I

| Component | G | H | I |
|---|---|---|---|
| Polyvinylacetate (Vinnapas B 30 sp) | 30.93 | 42.96 | 35.91 |
| Triacetin | 5.07 | 7.04 | 5.89 |
| GMS | 6.86 | 4.29 | 6.8 |
| Butyl Rubber | 0 | 0 | 0 |
| Polyisobutylene (Oppanol B 50 SF) | 10 | 5 | 7.2 |
| Hydrogenated cottonseed oil 70 C. melting temperature | 17.14 | 10.71 | 17 |
| Hydrogenated cottonseed oil 45 C. melting temperature | 10 | 10 | 7.2 |
| Talc | 20 | 20 | 20 |
| Total | 100 | 100 | 100 |

Gum bases are prepared as set forth in Tables 1-2 above. In particular, inventive gum base compositions A-I are prepared as follows:

A Master Batch (masticated elastomer) was prepared in the following manner:

Elastomer (1250 grams) was put in 3000 ml kettle heated to 128° C. and was mixed for 15 minutes. Hydrogenated cottonseed oil with a melting point of about 70° C. (1250 grams) was added over a 90 minute period. Glycerol monohydrate (500 grams) was added over a period of 15 minutes. The batch was mixed for another 20 minutes to fully homogenize.

Gum Base

Gum base was then prepared from the Master Batch. Polyvinyl acetate (1200 grams) was added in the 3000 ml kettle heated to 128° C. and was mixed for 15 minutes. Master Batch (720 grams) prepared as previously described was added and mixed for 10 minutes. Hydrogenated cottonseed oil with a melting point of about 40° C. (283 grams) was added and mixed for 10 minutes. Triacetin (197 grams) was added and mixed for 10 minutes. Talc (600 grams) was added and mixed for 20 minutes to obtain a homogeneous mixture.

Example 2

Figure 1B:
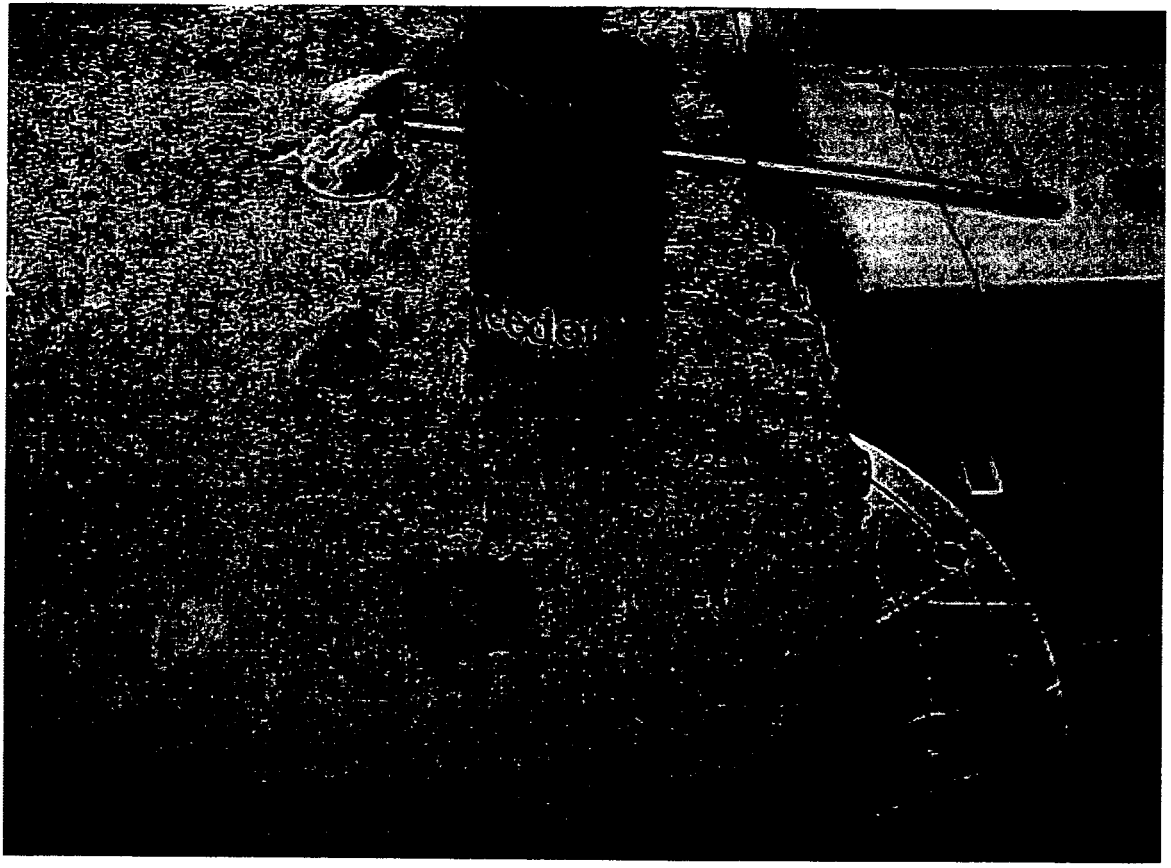

Inventive chewing gum compositions using the inventive gum base compositions A-I were chewed for 30 minutes and the cuds deposited on a concrete brick inside sample holders made out of 1.25 cm diameter PVC pipe. FIGS. 1A and 1B are photographs that illustrate how gum samples were applied to a brick and subjected to an adhesion test as described herein. The cuds were compressed to imbed them in the concrete. The brick with the imbedded cuds was conditioned for 72 hours at room temperature. Instron Corporation (Norwood, Mass.) universal material testing machine was used to measure the force required to remove the cuds from the concrete surface. When the sample was completely removed off the surface of the concrete the reading was a true measurement of adhesion. Reliable adhesion reading could not be obtained for the tested commercial samples since they broke apart (cohesive failure) during testing. The adhesion reading for those samples was assumed to be higher than the obtained reading for cohesive failure. Higher adhesion readings at room temperature are indicative of greater stickiness of the gum.

The inventive chewing gum bases contained a high melting point fat (i.e., hydrogenated cottonseed oil having a melting temperature of about 70° C.) and a low melting point fat (i.e., hydrogenated cottonseed oil having a melting point of about 40° C.).

Moreover, two commercially available chewing gum products, one sold under the trademark Freedent Peppermint by William Wrigley Jr., Company and the other sold under the trademark Orbit by William Wrigley, Jr., Company, also were deposited in a ½" PVC pipe and applied onto the brick in the same manner used with respect to inventive chewing gum bases A-I. The Freedent product is sold as a product that "Won't stick to most dental Work™".

The maximum breaking force of each of the samples was measured using an Instron testing machine. The testing was done at room temperature at a speed of 1 inch/minute. The results are set forth in Table 3 below.

TABLE 3

MAXIMUM BREAKING FORCE TO REMOVE GUM
CUD FROM BRICK OF EACH GUM SAMPLE

| Composition | Maximum Breaking Force lbs./in.$^2$ |
| --- | --- |
| Freedent Peppermint | 3.12* |
| Orbit | 1.21* |
| A | 1.73 |
| B | 2.20 |
| C | 2.04 |
| D | 0.04 |
| E | 0.04 |
| F | 0.05 |
| G | 0.05 |
| H | 0.70 |
| I | 1.79 |

*Gum sample broke apart before it could be removed from the surface. This is indicative of cohesive failure and is indicative of an even higher adhesive value.

Figure 2:
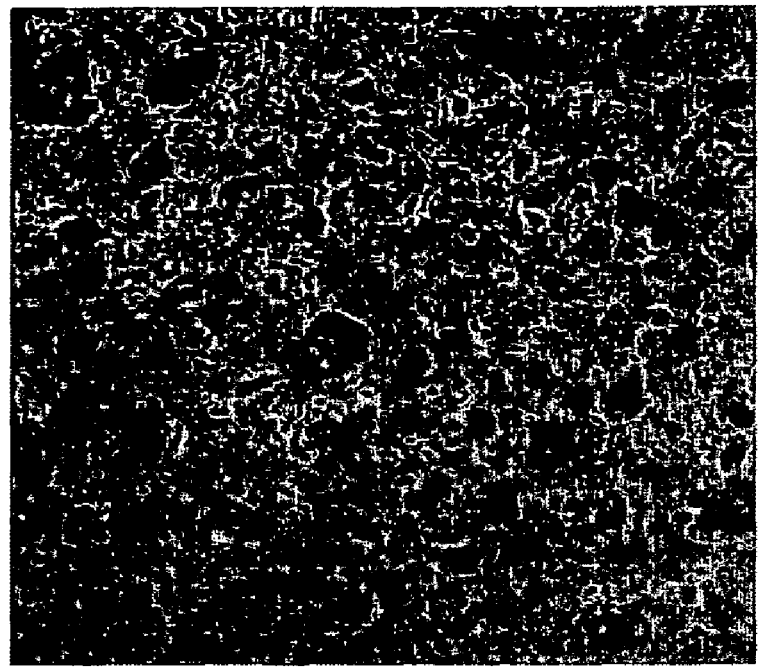
FIGS. 2 through 13 are photographs that illustrate the cud residues remaining on brick surfaces after force was applied to various gum samples to remove the gum samples from the brick in accordance with an adhesion test as described herein.
Figure 3:
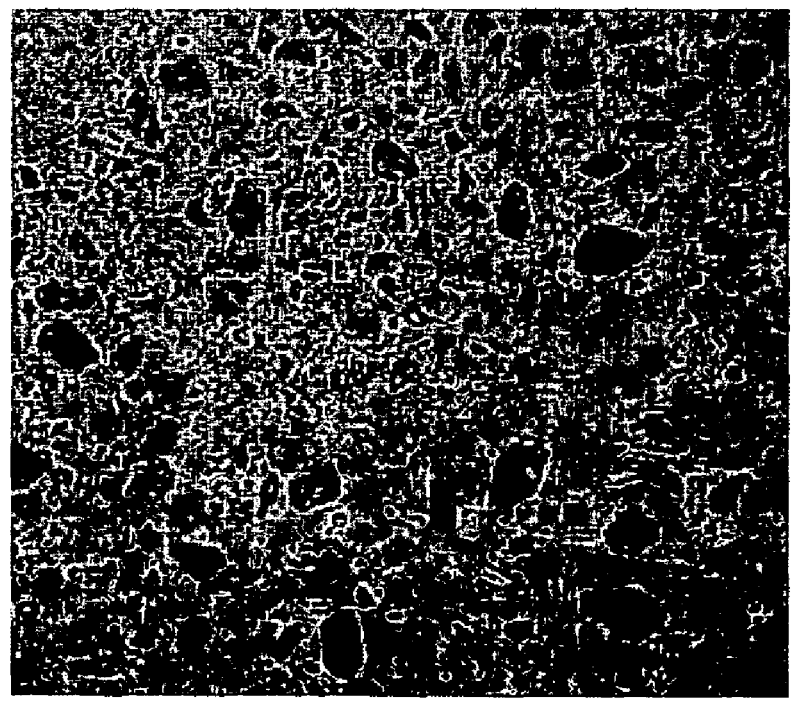
Figure 4:
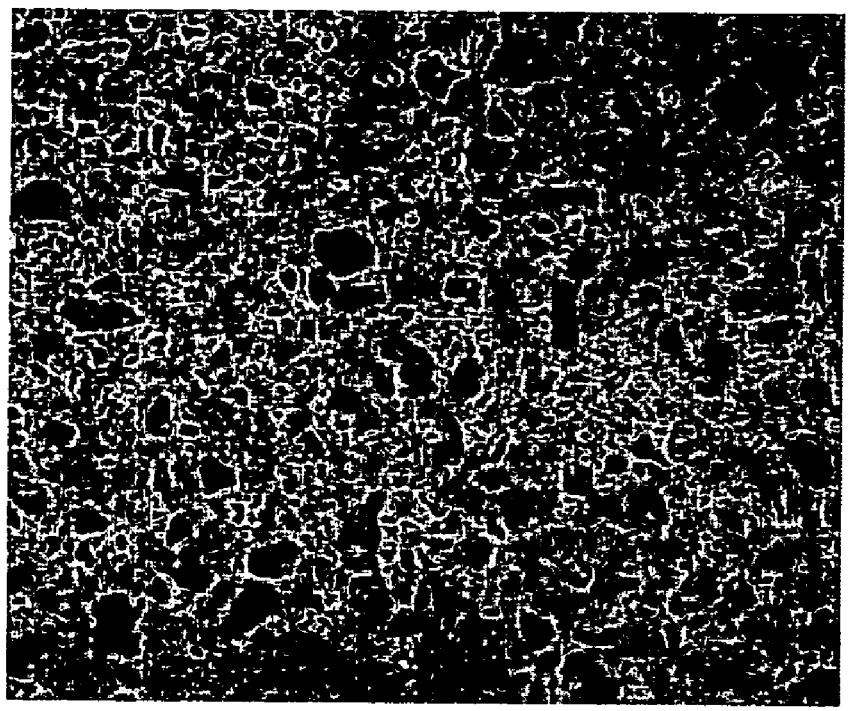
Figure 5:
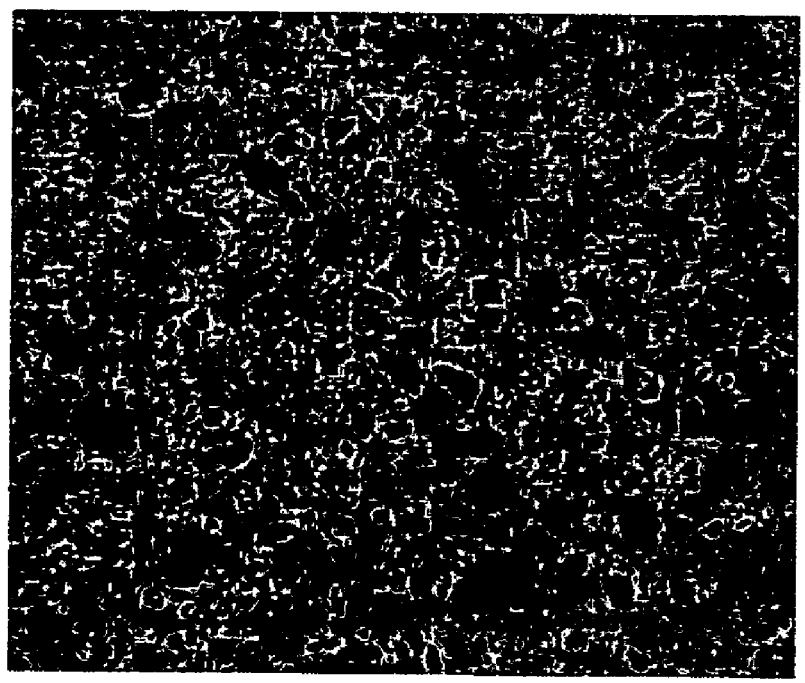
Figure 6:
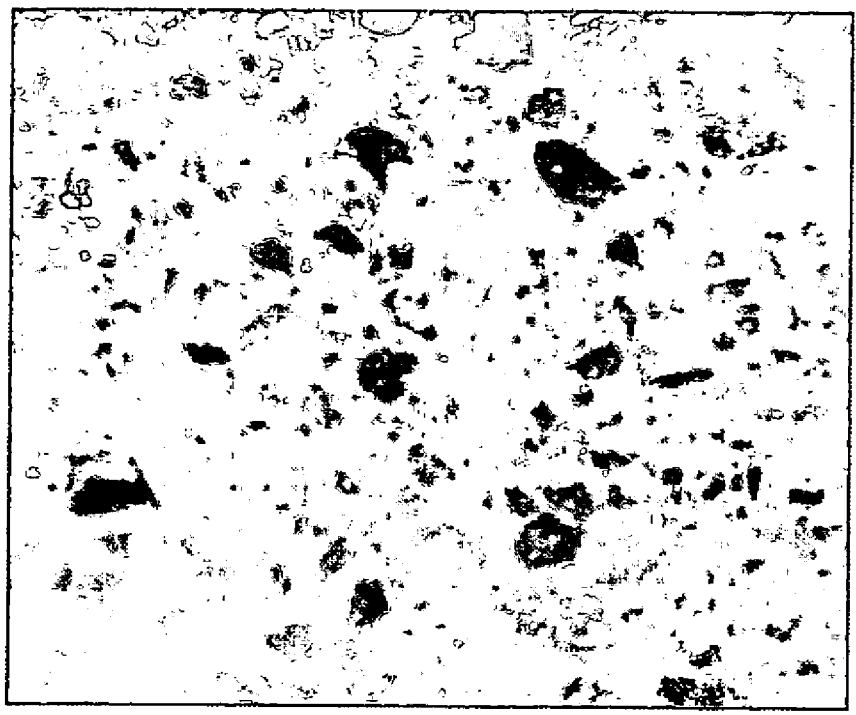
Figure 7:
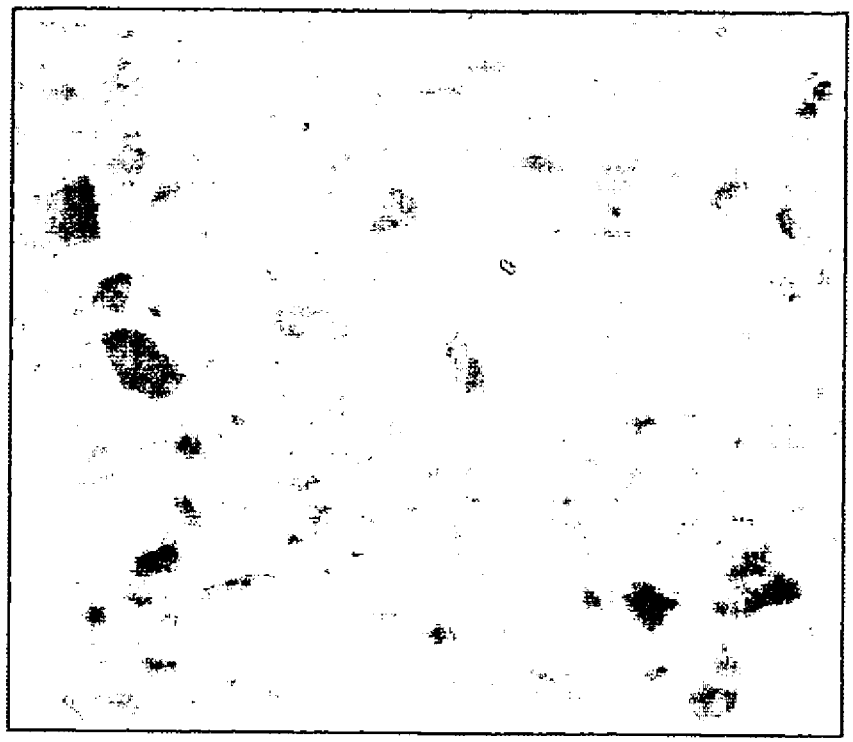
Figure 8:
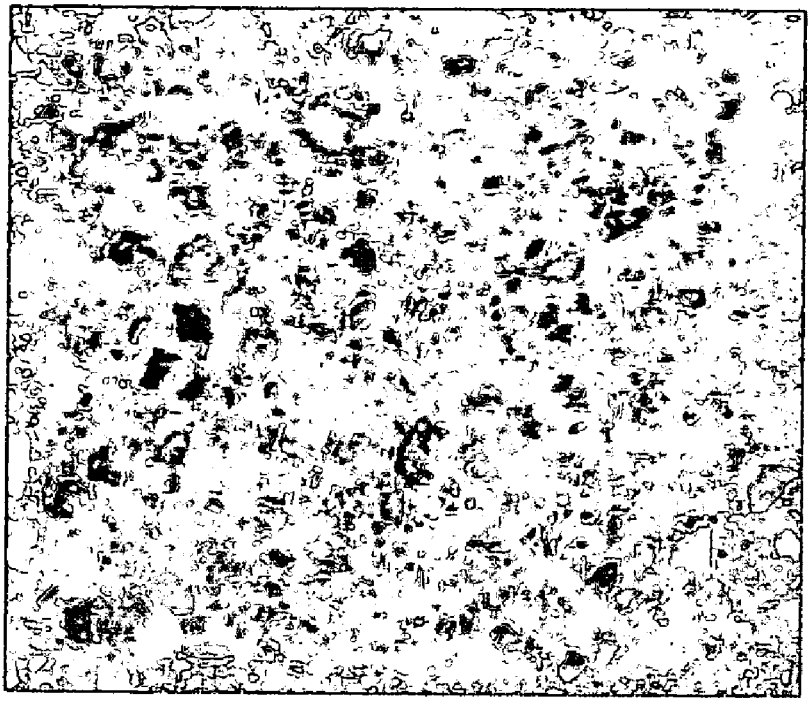
Figure 9:
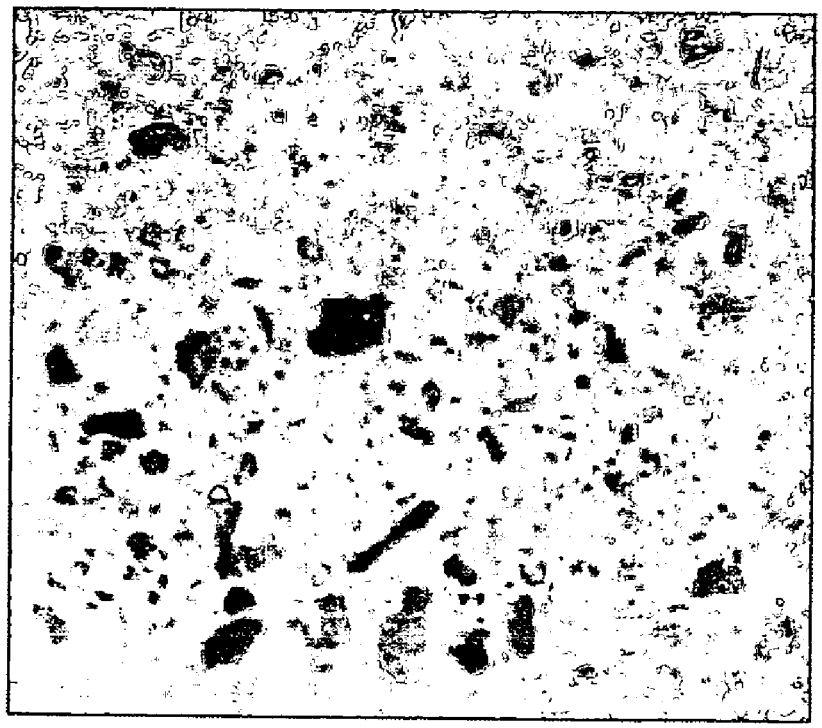
Figure 10:
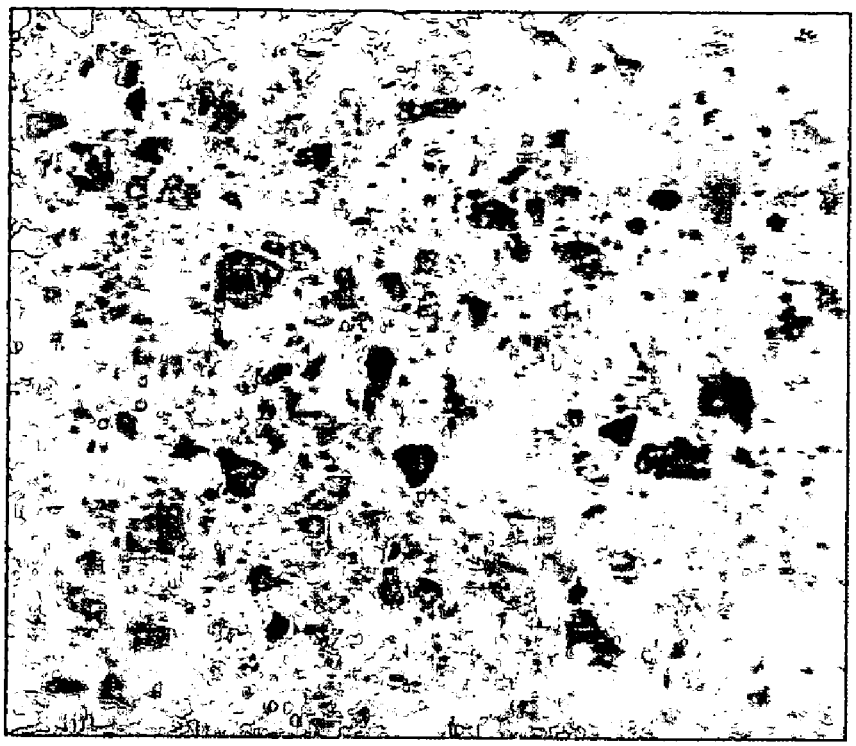
Figure 11:
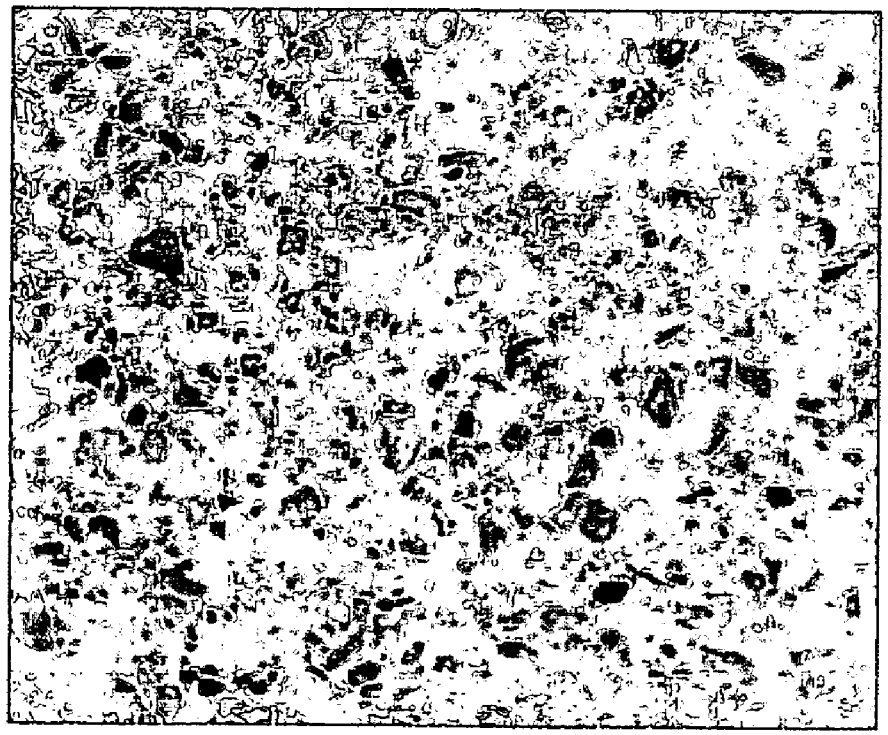
Figure 12:
Figure 13:
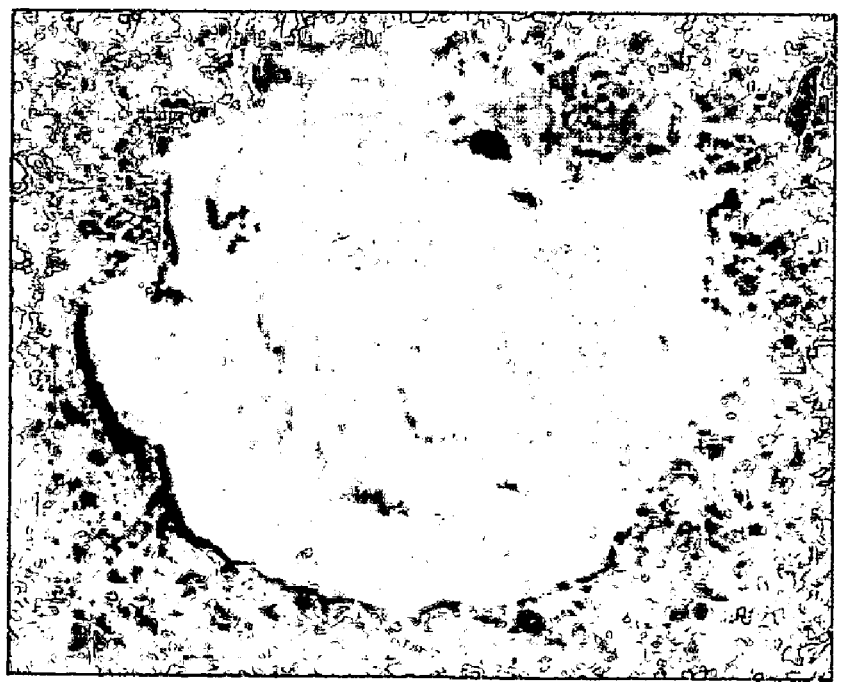

Furthermore, a photograph of any cud residue remaining on the brick after the application of removal force to each of the samples is shown in FIGS. 2-13. In particular, FIG. 2 is a photograph of any cud remaining on the brick after the application of a removal force to Inventive Gum Sample A. FIG. 3 is a photograph of any cud remaining on the brick after the application of a removal force to Inventive Gum Sample B. FIG. 4 is a photograph of any cud remaining on the brick after the application of a removal force to Inventive Gum Sample C. FIG. 5 is a photograph of any cud remaining on the brick after the application of a removal force to Inventive Gum Sample D. FIG. 6 is a photograph of any cud remaining on the brick after the application of a removal force to Inventive Gum Sample E. FIG. 7 is a photograph of any cud remaining on the brick after the application of a removal force to Inventive Gum Sample F. FIG. 8 is a photograph of any cud remaining on the brick after the application of a removal force to an Inventive Gum Sample G. FIG. 9 is a photograph of any cud remaining on the brick after the application of a removal force to Inventive Gum Sample H. FIG. 10 is a photograph of any cud remaining on the brick after the application of a removal force to Inventive Gum Sample I. FIG. 11 is a photograph of any cud remaining on the brick after the application of a removal force to Inventive Gum Sample J. FIG. 12 is a photograph of any cud remaining on the brick after the application of a removal force to the Freedent Gum Sample. FIG. 13 is a photograph of any cud remaining on the brick after the application of removal force to the Orbit Gum Sample.

As is apparent from Table 3 above and the photographs attached as FIGS. 2-11, chewing gums made from inventive chewing gum base compositions all could be completely or substantially removed from the brick. The Freedent Peppermint and Orbit samples broke apart cohesively and were not able to be removed from the brick surface as seen in FIGS. 12 and 13.

Example 3

TABLE 4

INVENTIVE GUM BASE COMPOSITIONS M-S

| Component | % by weight | | | | | | |
| --- | --- | --- | --- | --- | --- | --- | --- |
| | M | N | O | P | Q | R | S |
| Polyvinylacetate (Vinnapas B 30 sp)$^1$ | 42.98 | 32 | 15 | 43 | 40 | 43 | 40 |
| Polyvinylacetate (Vinapas B 1.5 sp)$^2$ | 0 | 0 | 28 | 0 | 0 | 0 | 0 |
| Triacetin | 2.58 | 5.25 | 2.46 | 7.05 | 6.56 | 7.05 | 6.56 |
| GMS$^3$ | 18.15 | 17.75 | 6.54 | 4.95 | 4 | 4 | 4.44 |
| Butyl Rubber | 9.55 | 0 | 0 | 0 | 0 | 10 | 8 |
| Polyisobutylene (Oppanol B 50 SF)$^4$ | 0 | 10 | 10 | 10 | 10 | 0 | 0 |
| Hydrogenated cottonseed oil 70 C. melting temperature | 9.55 | 15 | 18 | 15 | 10 | 10 | 8 |
| Hydrogenated cottonseed oil 45 C. melting temperature | 0 | 0 | 0 | 0 | 9.44 | 5.95 | 6 |
| Talc | 17.19 | 20 | 20 | 20 | 20 | 20 | 20 |
| Starch | 0 | 0 | 0 | 0 | 0 | 0 | 7 |
| Total | 100 | 100 | 100 | 100 | 100 | 100 | 100 |

$^1$available from Wacker Specialties
$^2$available from Wacker Specialties
$^3$acronym for glycerol monostearate
$^4$available from BASF Corp.

Gum base compositions are prepared as set forth in Table 4 above. In particular, inventive gum bases M-S are prepared in similar manner as described for the compositions described in Tables 1 and 2.

Example 4

TABLE 5

INVENTIVE GUM BASE COMPOSITION T

| Component | % by weight |
| --- | --- |
| PVAc 30 | 40 |
| Triacetin | 6.56 |
| Polyethylene Wax AC6 | 5 |
| GMS | 4 |
| PIB B50 | 10 |
| Hydrogenated Cottonseed Oil | 10 |
| Partially Hydrogenated Cottonseed Oil | 4.44 |
| Talc | 20 |

An additional inventive gum base is shown in Table 5 above. The non-stick properties of the gum base were not affected by the incorporation of the polyethylene wax AC6 therein, which is a conventional softening component used in chewing gum base compositions.

Example 5

Table 6 below provides an example of a sugared chewing gum composition useful with any of the inventive gum base compositions.

TABLE 6

SUGARED REDUCED-STICKINESS CHEWING GUM COMPOSITIONS

| Component | % | grams |
|---|---|---|
| Gum base | 28 | 70 |
| Corn syrup (glucose) | 14 | 35 |
| Sugar pulverized | 56 | 140 |
| Natural Peppermint oil | 2 | 5 |
| Total | 100 | 250 |

A gum product can be prepared as set forth in Table 7 using any of the inventive chewing gum bases.

Example 6

Table 7 provides an example of a sugarless chewing gum composition useful with any of the inventive gum base compositions.

TABLE 7

SUGARLESS REDUCED-STICKINESS CHEWING GUM COMPOSITIONS

| Gum Sugarless | % | grams |
|---|---|---|
| Inventive gum base | 30 | 75 |
| Sorbitol | 46.8 | 117 |
| Maltitol | 9.9 | 24.75 |
| Peppermint flavor | 3 | 7.5 |
| Glycerin | 5 | 12.5 |
| Acesulfame K | 0.1 | 0.25 |
| Aspartame | 0.2 | 0.5 |
| Calcium Carbonate | 5 | 12.5 |
| Total | 100 | 250 |

Example 7

The glass transitions of butyl rubber (BR) and styrene rubber (SBR) gum base samples were determined using modulated differential scanning calorimetry (DSC). Additionally, the glass transitions (Tg) of gum base samples AA-DD having the components set forth in Table 8 below were determined using DSC. In particular, all of the samples were heated under nitrogen purge from −100° C. to 200° C. at 3° C. per minute. The instrument used to measure the glass transition was a TA Instrument 2920 MDSC. Additionally, the melt endotherms for each of the samples were determined using modulated differential calorimetry.

TABLE 8

INVENTIVE AND COMPARATIVE GUM BASE COMPOSITIONS

| | % by weight | | | |
|---|---|---|---|---|
| Component | Comparative Master Batch Gum Base AA | Inventive Master Batch Gum Base BB | Comparative Master Batch Gum Base CC | Inventive Master Batch Gum Base DD |
| Butyl Rubber | 50% | 50% | — | — |
| Styrene Butadiene Rubber | — | — | 50% | 50% |
| Resin[1] | 50% | — | 50% | — |
| Fat[2] | — | 50% | — | 50% |

[1]Resin glycerol ester of wood rosin (RS-5).
[2]Hydrogenated cottonseed oil having a melting point of 70° C.

Comparative Master Batch Gum Base composition AA was prepared by masticating butyl rubber with resin while Inventive Master Batch Gum Base composition BB was prepared by masticating butyl rubber with a fat. Moreover, Comparative Master Batch Gum Base CC composition was prepared by masticating styrene butadiene rubber with resin, while Inventive Master Batch Gum Base DD composition was prepared by masticating styrene butadiene with fat. Although a master batch process was used to make the gum base, other processes such as a one-step, continuous kettle process or continuous extrusion process may be used.

The glass transitions of each of the samples are set forth in Table 9 below. Moreover, the melt endotherms for each of the samples are set forth in Table 10 below:

TABLE 9

| Sample | Glass Transitions (Tg) |
|---|---|
| butyl rubber (BR) | −66° C. |
| styrene butadiene rubber (SBR) | −30° C. |
| Comparative Master Batch Gum Base Composition AA | −61° C., 33° C. |
| Inventive Master Batch Gum Base Composition BB | −66° C. |
| Comparative Master Batch Gum Base Composition CC | −5° C. |
| Inventive Master Batch Gum Base Composition DD | −29° C. |

TABLE 10

| Sample | Melt Endotherms |
|---|---|
| butyl rubber | — |
| styrene butadiene rubber | — |
| Comparative Gum Base AA | — |
| Inventive Gum Base BB | 62° C. |
| Comparative Gum Base CC | — |
| Inventive Gum Base DD | 62° C. |

As is apparent from Table 9, the Tg of the inventive Master Batch Composition BB gum base containing butyl rubber masticated with fat was the same as the Tg of the sample containing only butyl rubber. Moreover, as is further apparent from Table 9 above, the Tg of the inventive gum base Master Batch DD containing styrene butadiene rubber masticated with fat was only one degree different (greater) than the Tg of SBR rubber alone. Accordingly, the Tg of the inventive Master Batch gum base compositions BB and DD did not change or substantially change upon mastication with a fat as compared to the elastomer alone. In contrast, as is further apparent from the Comparative AA and CC compositions in Table 9 above, mastication with a resin, i.e., a solvent plasticizer traditionally used for rubber mastication, increased the Tg of butyl rubber by at least five degrees (5° C.) and increased the Tg of styrene butadiene styrene rubber by at least twenty five degrees (25° C.).

Furthermore, each of the Inventive Master Batch gum base samples BB and DD contained crystalline fat in a separate phase, as each of those samples exhibited a melt endotherm at 62° C. Accordingly, Inventive Master Batch gum bases BB and DD contain domains of crystalline fat in accordance with the present invention.

Example 8

TABLE 11

INVENTIVE GUM BASE COMPOSITIONS

| Component | % Weight | % Weight |
|---|---|---|
| Polyvinyl acetate (Vinnapass B-30) | 40% | 28% |
| Polyvinyl acetate laurate (Vinnapass B 500/20 VL) | — | 13.5% |
| Polyisobutylene (Oppanol B 50 SF) | 10% | 6.5% |
| Hydrogenated cottonseed oil (melting point 70° C.) | 10% | 6.5% |
| Hydrogenated cottonseed oil (melting point 45° C.) | 9.44% | 25% |
| Triacetin | 6.56% | 4.4% |
| Glycerol monostearate | 4% | 2.6% |
| Talc | 20% | 13.5% |

Street Test

Gum base was prepared using the above compositions and incorporated into the chewing gum composition of Table 7 to make chewing gum products. The resultant chewing gums were chewed for 30 minutes and the cuds were deposited on an asphalt parking lot. The cuds were further imbedded in the asphalt by a weighted object for about ten (10) seconds. Simultaneously commercially distributed gums (Freedent and Orbit from Wrigley's and Mintaburst from Cadbury Adams) were deposited and imbedded in the asphalt next to the inventive formulations in a similar fashion. After 24 hours more than 50% of the inventive cuds were removed by pedestrian and automobile traffic. The remaining inventive cuds could easily be completely removed without leaving residue by scraping them with a spatula. Attempts to remove the cuds of the commercial gums required substantially more effort and resulted only in partial removal of the cud, i.e., the residues constituted about 10 to 30% of the original weight of the gum product and covered the original area of the cud.

Example 9

This example demonstrates embodiments of the invention which contain distinct domains. Master Batch Gum base (i.e., masticated elastomer) samples EE-KK having the formulations set forth in Table 12 below were prepared by in accordance with the methods discussed herein. Gum base master batch Samples GG-KK are examples of embodiments which contain at least one non-stick inducing component which is a fat or oil having more than twelve carbon atoms. All of the samples were subjected to photomicroscopy using polarized light and the crystal or domain formulations were clearly present. Photomicrographs of each of samples EE-KK are shown in FIGS. 14-20.

TABLE 12

GUM BASE COMPOSITIONS

| | % by weight | | | | | | |
|---|---|---|---|---|---|---|---|
| Component | EE | FF | GG | HH | II | JJ | KK |
| butyl rubber | 50 | 50 | 41.6 | — | 0 | 50 | 50 |
| polyisobutylene | 0 | 0 | 0 | 41.6 | 0 | 0 | 0 |
| styrene butadiene rubber | 0 | 0 | 0 | — | 41.6 | 0 | 0 |
| resin | 50 | 0 | 0 | — | 0 | 0 | 0 |
| medium chain triglyercides (MCTs)[1] | 0 | 50 | 0 | — | 0 | 0 | 0 |
| "Non-Stick Inducing Component"[2] | 0 | 0 | 41.6 | 41.6 | 41.6 | 50 | 0 |
| oil containing more than 12 carbon atoms[3] | 0 | 0 | 0 | 0 | 0 | 0 | 50 |
| GMS | 0 | — | 16.8 | 16.8 | 16.8 | 0 | 0 |
| Total | 100 | 100 | 100 | 100 | 100 | 100 | 100 |

[1]Triglycerides containing no more than twelve carbon atoms.
[2]Hydrogenated cottonseed oil (m.p. 70° C.)
[3]Palm kernel oil.

By way of background, when polarized light passes through a liquid or other uniform phase, a photograph of the liquid or other uniform phase will appear dark as there is no birefringence. However, when polarized light passes through a discontinuous phase containing a crystalline or other structure in a separate phase, a photograph of the discontinuous phase will appear as a bright image as a result of birefringence of the crystalline or other structure in a separate phase, i.e., as a result of the crystalline or other structure in the separate phase being illuminated by polarized light.

Figure 14:
FIG. 14 is a polarized light photomicrograph of a gum base containing only an elastomer and resin.
Figure 15:
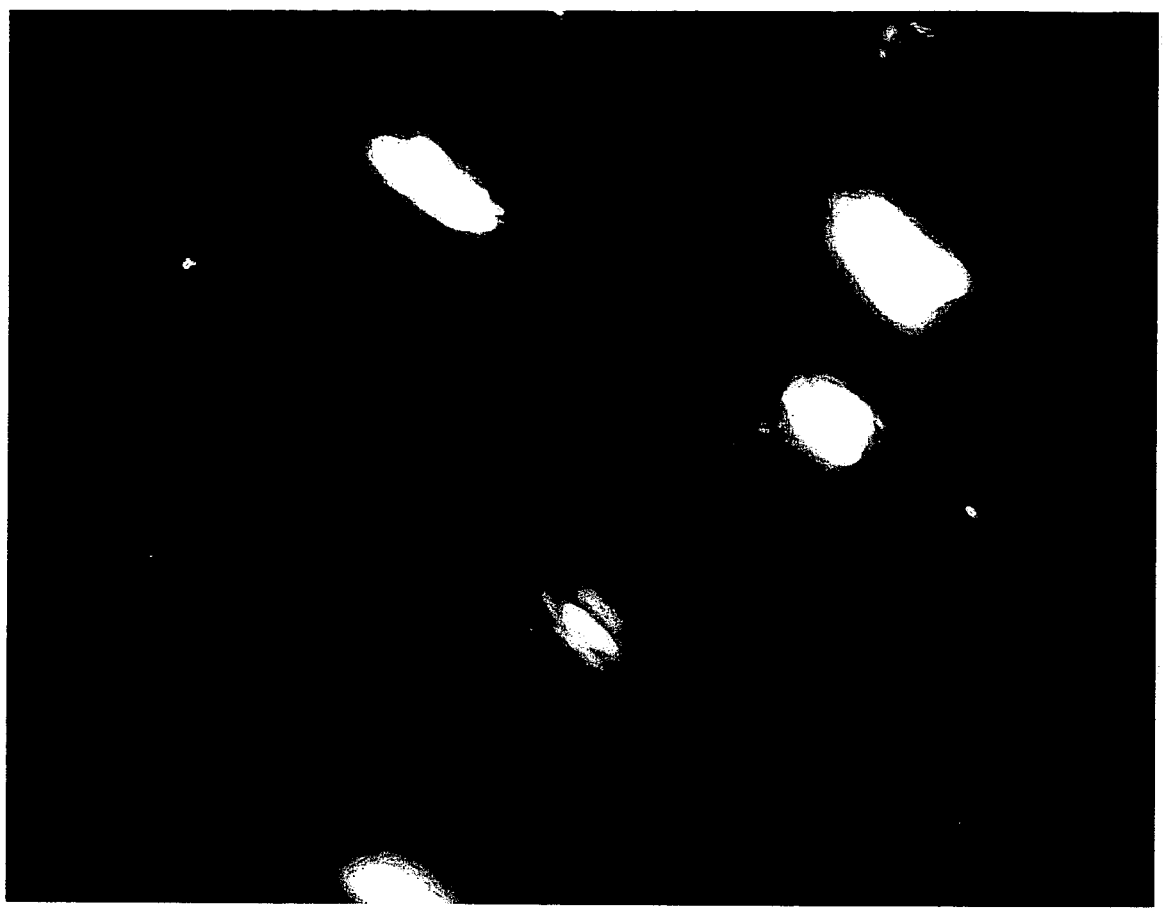
FIG. 15 is a polarized light photomicrograph of a gum base containing only an elastomer and medium chain triglycerides.
Figure 16:
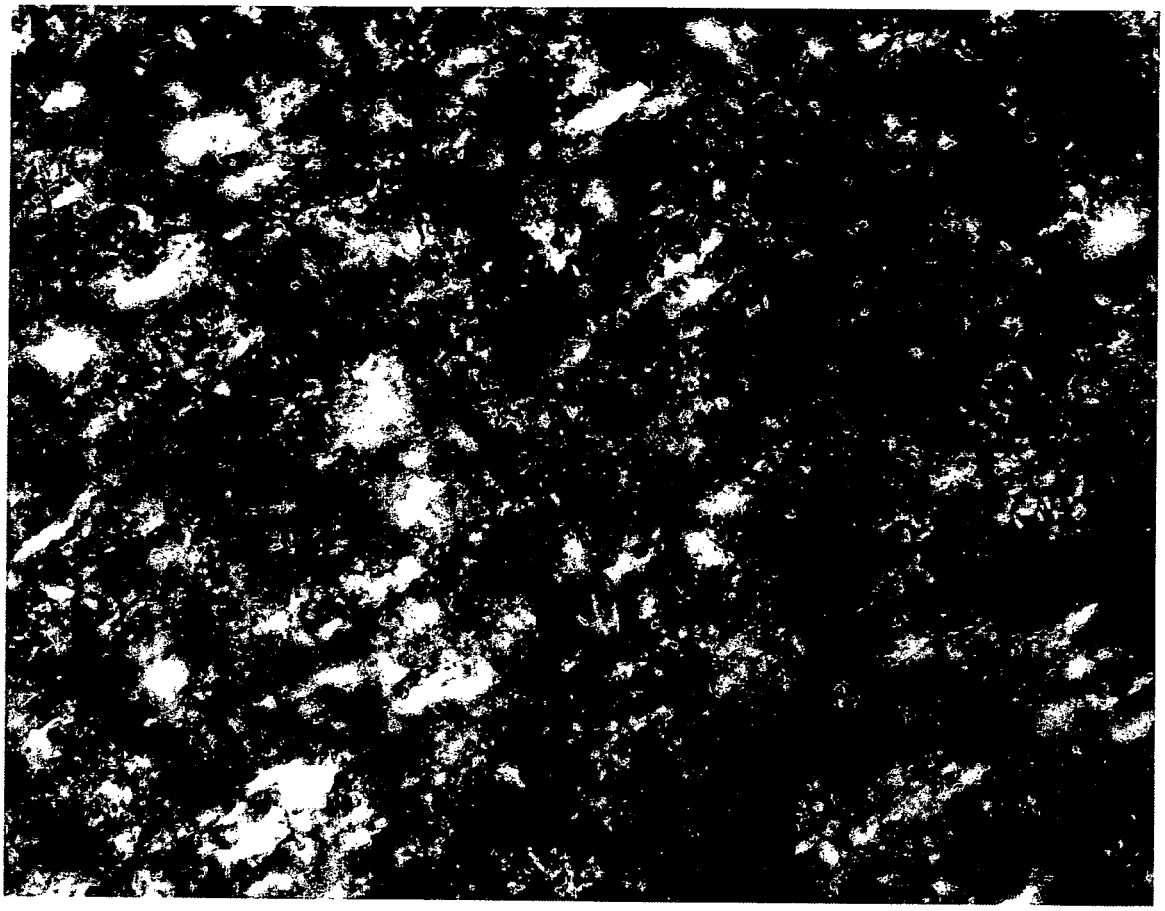
FIGS. 16-19 are each polarized light photomicrographs of gum bases containing an elastomer and more than one non-stick inducing component of the present invention.
Figure 17:
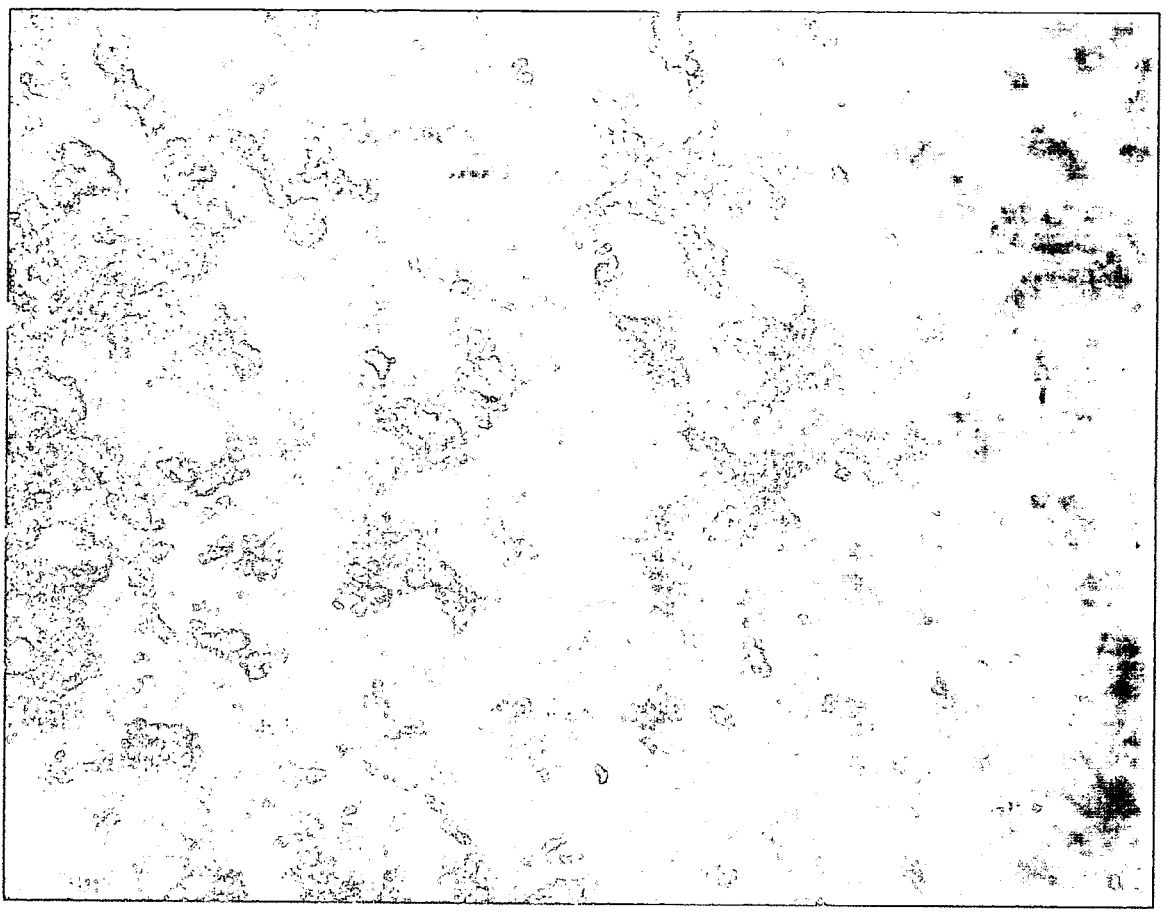
Figure 18:
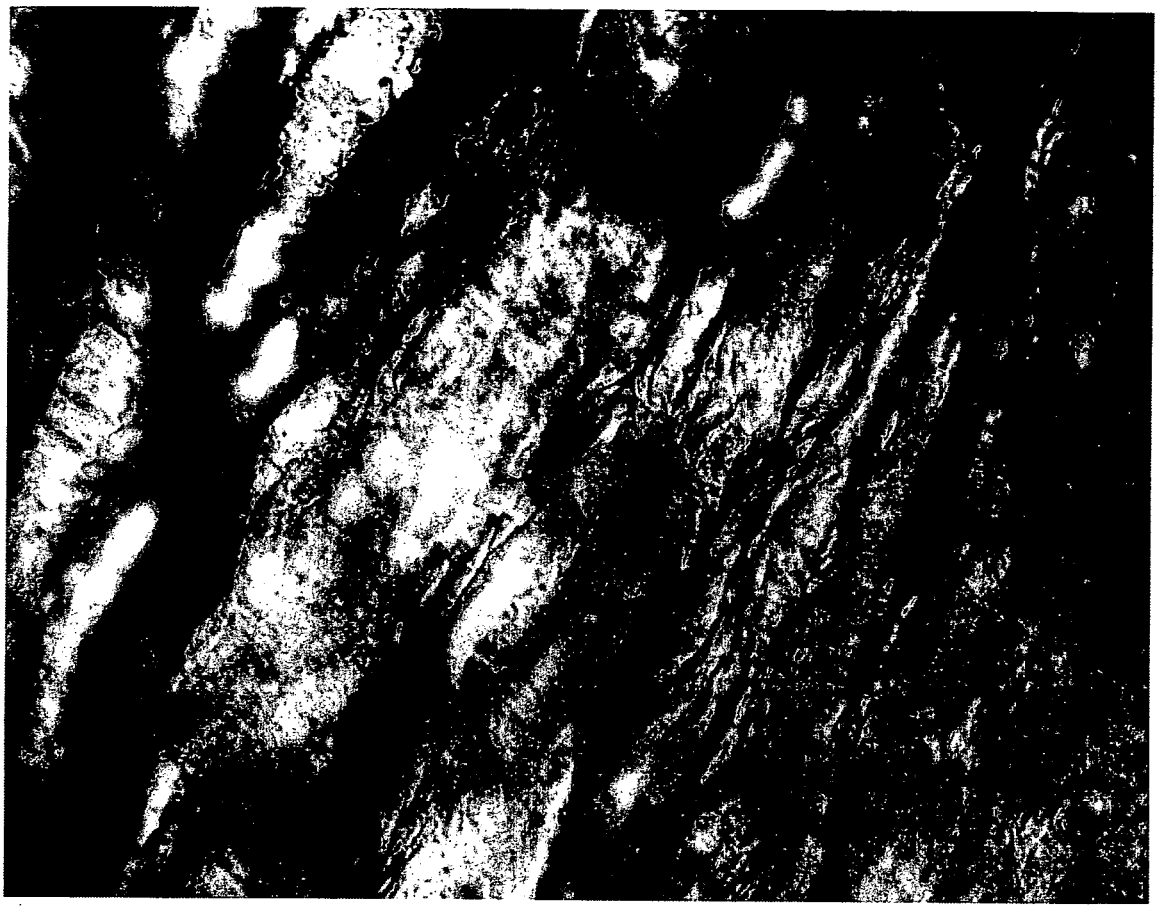
Figure 19:
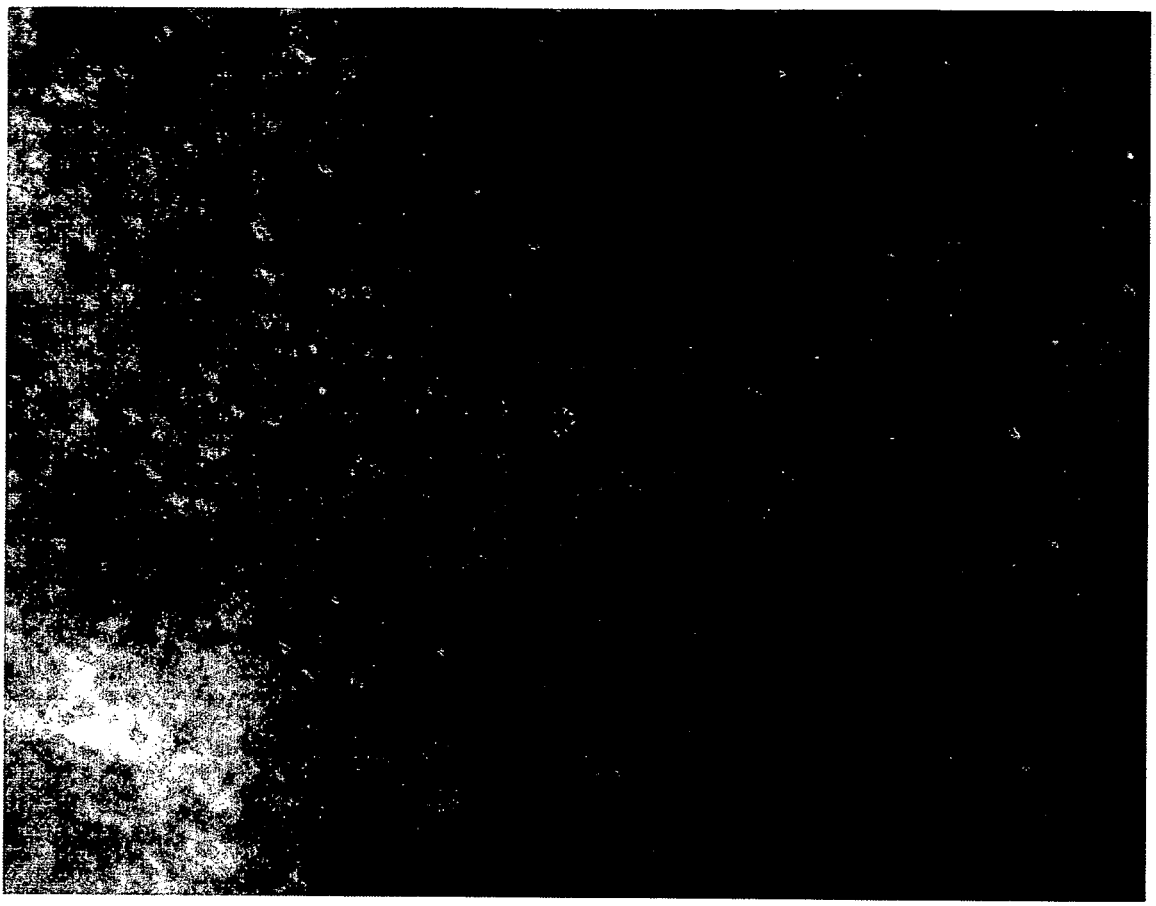
Figure 20:
FIG. 20 is a polarized light photomicrograph of a gum base containing an elastomer and one non-stick inducing component of the present invention.

As is apparent from FIGS. 14 and 15 the Master Batch gum base compositions not containing a non-stick inducing component of the present invention (i.e., gum bases EE and FF) were dark, indicating that the absence of a discontinuous phase. It should be noted that due to the presence of air bubbles, there are a few large bright spots. These are not attributable to the presence of separate domains, but are due to the refraction of light off the bubble. However, as is apparent from FIGS. 16-20, the photographs of the gum base Master Batch compositions containing at least one non-stick inducing component (i.e., inventive gum base Master Batches GG-KK) all show overall lighter images (light in color), indicating the presence of a discontinuous phase and evidencing crystallization of the non-stick inducing component (i.e. the fat or oil containing more than 12 carbon atoms) to form domains.

Example 10

Inventive Gum Base Compositions Incorporating Low Amounts of Conventional Elastomer Solvents The following inventive gum base compositions were prepared. These compositions included a combination of the non-stick inducing components with conventional elastomer solvents (5%). These gum base compositions were incorporated into the chewing gum composition of Table 7. The chewing gums formed therefrom maintained reduced stickiness and non-stick properties even in the presence of a small amount of elastomer solvent.

TABLE 13

INVENTIVE GUM BASE COMPOSITIONS

| Component | Weight % | |
|---|---|---|
| Polyvinyl acetate | 38 | 40.00 |
| Polyisobutylene | 9.5 | 10.00 |
| Glycerol monostearate | 3.8 | 4.00 |
| High melting fat (melting point 70° C.) | 9.5 | 10.00 |
| Low melting fat (melting point 45° C.) | 8.97 | 4.44 |
| Triacetin | 6.23 | 6.56 |
| Talc | 19.00 | 20.00 |
| Glycerol ester of resin (elastomer solvent)[1] | 5.00 | 5.00 |

[1]Available from Hercules Corp.

Example 11

A study was conducted to measure the molecular changes occurring in chewing gum when exposed to sunlight with and without the presence of photosensitizer. The molecular structure of the polymers (elastomers) is related to their physical properties. The adhesion is strongly affected by the molecular weight of the polymer. For instance, chewing gum compositions frequently use polyisbutylene (PIB). When all other conditions are the same, the molecular mass of the polymer widely determines the adhesiveness of the polymer. Low molecular weight PIB adheres to most surfaces and poses a problem of handling the material because of its stickiness. On the other hand, high molecular weight PIB has been discovered to be not adhesive and exhibits a very weak tendency to cold flow. The adhesiveness of the polymers may be defined by their ability to form weak bonds with the adjacent surfaces. In order to form these weak bonds, the polymer has to come in close proximity to the adjacent surface. This may be achieved faster and easier by smaller molecules than the larger molecules. It has been discovered that a polymer of the same chemical composition may generally adhere more if it has relatively lower molecular weight.

Light may induce changes in the elastomer polymers such as crosslinking, degradation and oxidation. This process occurs in the materials when exposed to the environment. However, the rate at which the photo-induced reactions are occurring is slow to have noticeable impact on the physical properties of the polymers. It has been discovered that photosensitizers such as chlorophyll, when added to compositions containing elastomers accelerate the photo-induced reactions significantly.

Gum base compositions were made with three different types of elastomer, namely polyisbutylene (PIB), butyl rubber (BR), and styrene butadiene rubber (SBR). Each type of gum base composition (PIB, BR and SBR) was divided into two samples; to the first sample 0.1% chlorophyll was added as a photosensitizer. The other was left as a control sample. These inventive gum base compositions are set forth in Table 14 below.

TABLE 14

INVENTIVE GUM BASE COMPOSITIONS

| Component | LL | MM | NN | OO | PP | QQ |
|---|---|---|---|---|---|---|
| Polyvinylacetate | 40.0 | 40.0 | 40.0 | 39.96 | 40.0 | 40.0 |
| Polyisobutylene | 10.0 | — | — | 9.99 | — | — |
| Butyl Rubber | — | 10.0 | — | — | 9.99 | — |
| Styrene Butadiene Rubber | — | — | 10.0 | — | — | 9.99 |
| Hydrogenated Cottonseed Oil (melting point 70° C.) | 10.0 | 10.0 | 10.0 | 9.99 | 9.99 | 9.99 |
| Hydrogenated Cottonseed Oil (melting point 45° C.) | 9.44 | 9.44 | 9.44 | 9.43 | 9.43 | 9.43 |
| Triacetin | 6.56 | 6.56 | 6.56 | 6.55 | 6.55 | 6.55 |
| Glycerol Monostearate | 4.0 | 4.0 | 4.0 | 4.0 | 4.0 | 4.0 |
| Filler | 20.0 | 20.0 | 20.0 | 19.98 | 19.98 | 19.98 |
| Chlorophyll | — | — | — | 0.1 | 0.1 | 0.1 |

Each gum base was then incorporated into chewing gum compositions as shown in Table 15 below.

TABLE 15

INVENTIVE CHEWING GUM COMPOSITIONS

| Component | RR | SS | TT | UU | VV | WW |
|---|---|---|---|---|---|---|
| Gum Base LL | 30 | — | — | — | — | — |
| Gum Base MM | — | 30 | — | — | — | — |
| Gum Base NN | — | — | 30 | — | — | — |
| Gum Base OO | — | — | — | 30 | — | — |
| Gum Base PP | — | — | — | — | 30 | — |
| Gum Base QQ | — | — | — | — | — | 30 |
| Sorbitol | 49.3 | 49.3 | 49.3 | 49.3 | 49.3 | 49.3 |
| Maltitol | 10.4 | 10.4 | 10.4 | 10.4 | 10.4 | 10.4 |
| Glycerin | 3.0 | 3.0 | 3.0 | 3.0 | 3.0 | 3.0 |
| Acesulfame K | 0.1 | 0.1 | 0.1 | 0.1 | 0.1 | 0.1 |
| Aspartame | 0.2 | 0.2 | 0.2 | 0.2 | 0.2 | 0.2 |
| Peppermint Flavor | 2.0 | 2.0 | 2.0 | 2.0 | 2.0 | 2.0 |
| Calcium Carbonate | 5.0 | 5.0 | 5.0 | 5.0 | 5.0 | 5.0 |

Results

The samples of BR and PIB without chlorophyll were easier to remove and left fewer residues than the samples of SBR without chlorophyll. The addition of chlorophyll hindered the removal of the PIB-containing samples, but improved the removal of the BR and SBR samples.

Figure 21:
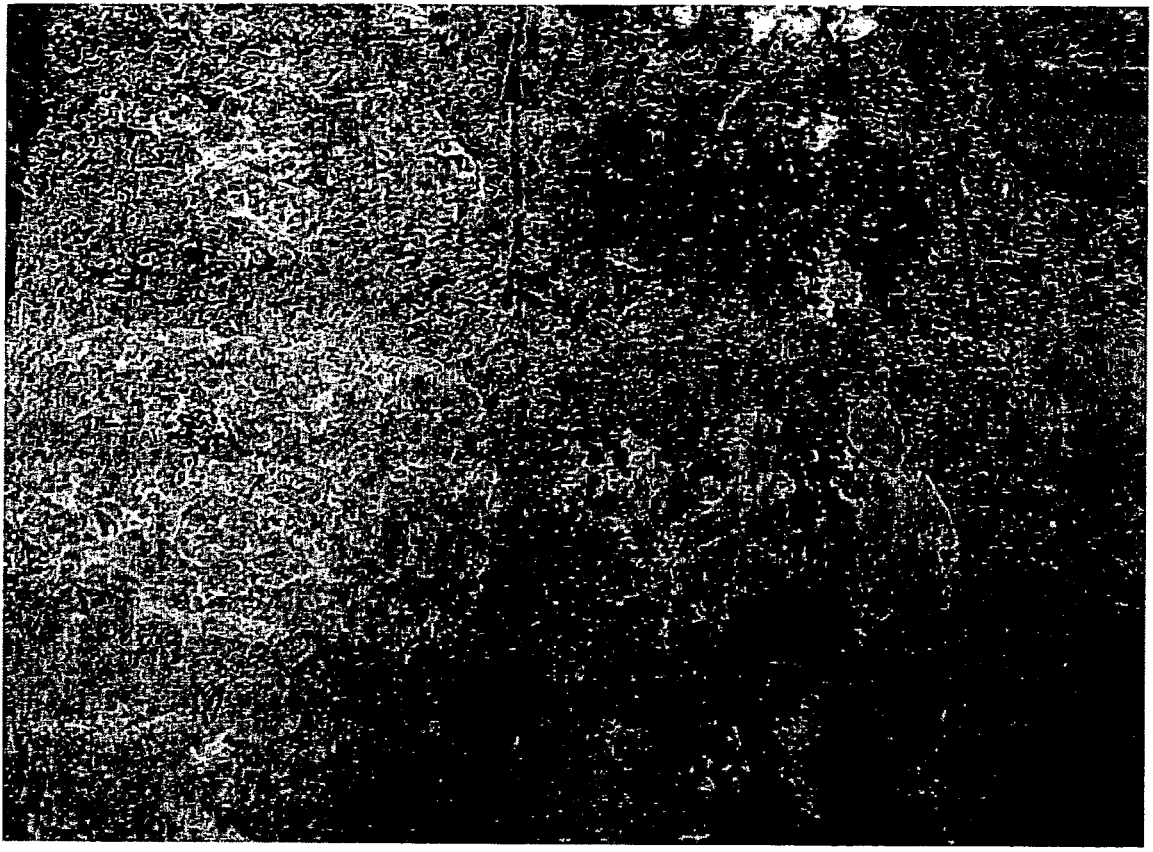
FIG. 21 is a photograph of the results of adhesion tests showing a brick surface subsequent to removal of polyisobutylene rubber-containing inventive chewing gums, one of which contained chlorophyll.
Figure 22:
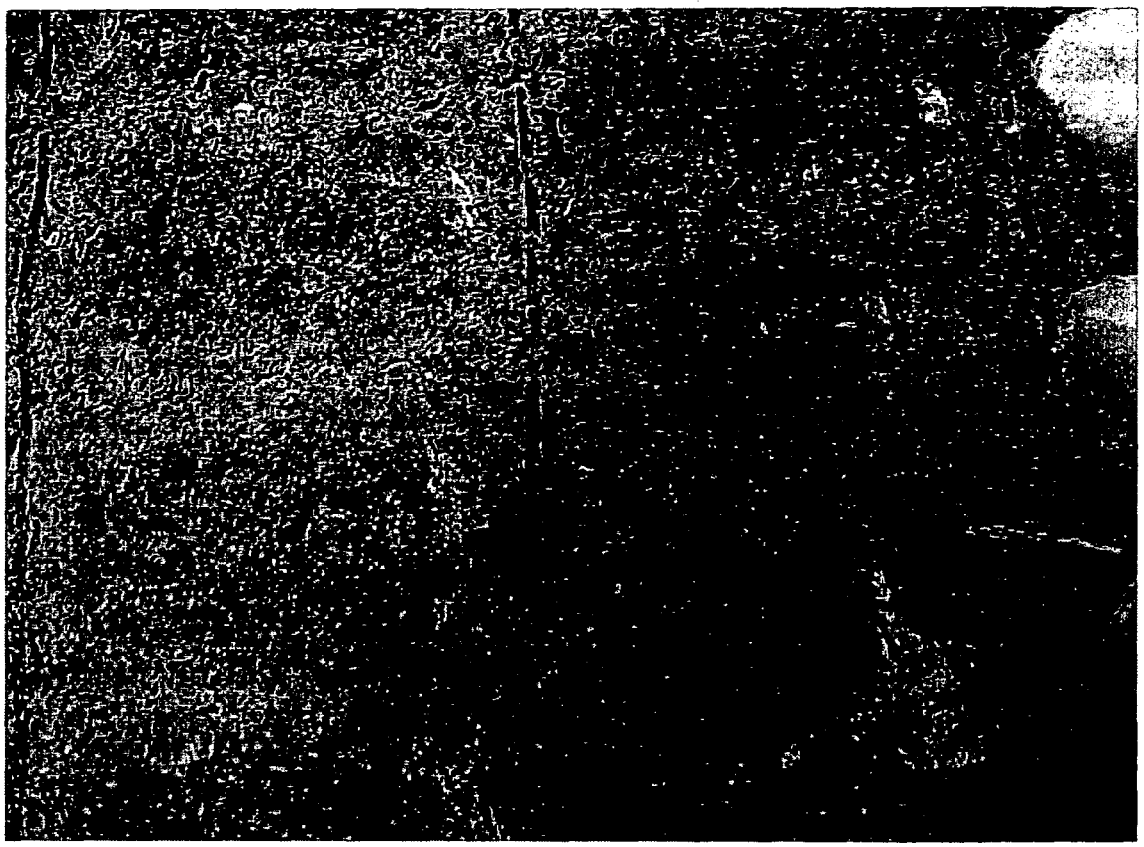
FIG. 22 is a photograph of the results of adhesion tests showing a brick surface subsequent to removal of butyl rubber-containing inventive chewing gums, one of which contained chlorophyll.
Figure 23:
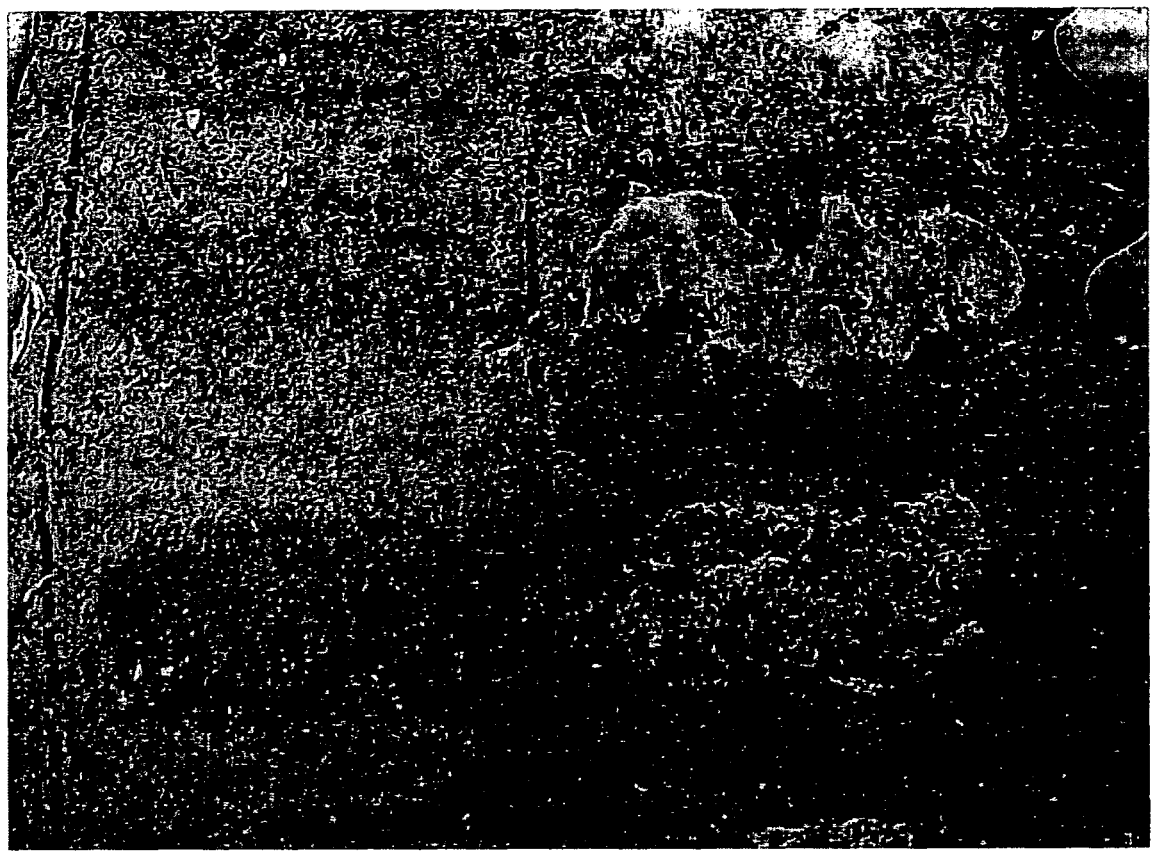
FIG. 23 is a photograph of the results of adhesion tests showing removal of styrene-butadiene rubber-containing inventive chewing gums, one of which contained chlorophyll.

Samples were then tested for molecular weight changes to the polymers. The results are shown in Tables 16-17 below. Additionally, FIGS. 21-23 show the results of adhesion tests on brick surfaces for the BR, PIB and SBR containing samples. The tests were conducted as previously discussed.

FIG. 21 shows the sample cuds of chewing gum made using PIB. The left side of the Figure shows gum containing chlorophyll. The right side of the Figure does not contain chlorophyll (control). As is apparent, both sides showed substantial removal from the brick, with minor residue.

FIG. 22 shows the sample cuds of chewing gum made using BR gum. The left side of this Figure contains chlorophyll and the right side of the Figure is the control with no chlorophyll. As is apparent, both sides showed substantial removal from the brick, with minor residue.

FIG. 23 shows the sample cuds of chewing gum made using SBR. The left side contains chlorophyll and the right side is the control with no chlorophyll. As is apparent, the left side which contained chlorophyll showed substantially less residue than the right side without chlorophyll.

The sample containing PIB had a slight increase in both molecular weight and molecular number of PVAc when chlorophyll was added. There was another compound detected with solubility similar to PVAc. The PIB sample containing chlorophyll had reduced average molecular weight and lower molecular weight number after exposure to sunlight.

TABLE 16

MOLECULAR WEIGHT OF PIB CHEWING GUMS

| Composition | | Average Molecular Weight (Mw), Daltons | Molecular Weight Number (Mn), Daltons |
|---|---|---|---|
| RR (PIB without chlorophyll) | Poly (vinyl acetate) | $1.282 \times 10^6$ | $1.281 \times 10^6$ |
| | Poly (isobutylene) | $1.803 \times 10^8$ | $1.452 \times 10^8$ |
| UU (PIB with chlorophyll) | Poly (vinyl acetate) | $8.440 \times 10^6$ | $3.076 \times 10^6$ |
| | Unknown peak | $9.334 \times 10^6$ | $5.499 \times 10^6$ |
| | Poly (isobutylene) | $1.000 \times 10^8$ | $4.578 \times 10^6$ |

Subsequent to exposure to sunlight, BR samples had a decrease in the average molecular weight and molecular weight number of the PVAc when chlorophyll was added. The chlorophyll had the opposite effect on the BR fraction, i.e. both molecular weight average and molecular number increased. The increase in the molecular number was more pronounced than the increase in the molecular number.

TABLE 17

MOLECULAR WEIGHT OF BR CHEWING GUMS

| Composition | | Average Molecular Weight (Mw), Daltons | Molecular Weight Number (Mn), Daltons |
|---|---|---|---|
| SS (BR without chlorophyll) | Poly (vinyl acetate) | $1.449 \times 10^7$ | $1.066 \times 10^7$ |
| | Butyl rubber | $1.658 \times 10^8$ | $3.815 \times 10^6$ |
| VV | Poly (vinyl acetate) | $6.811 \times 10^6$ | $6.015 \times 10^5$ |
| | Unknown peak | $4.699 \times 10^7$ | $5.653 \times 10^6$ |
| | Butyl rubber | $6.252 \times 10^8$ | $1.447 \times 10^8$ |

Subsequent to exposure to sunlight, the SBR samples showed similar trend as the BR samples. There was decrease in the average molecular weight of the PVAc when chlorophyll was added. The molecular number of the PVA was higher when chlorophyll was added. Both the molecular weight average and the molecular number of the SBR increased.

TABLE 18

MOLECULAR WEIGHT OF SBR CHEWING GUMS

| Composition | | Average Molecular Weight (Mw), Daltons | Molecular Weight Number (Mn), Daltons |
|---|---|---|---|
| TT (SBR without chlorophyll) | Poly (vinyl acetate) | $1.4400 \times 10^7$ | $9.327 \times 10^5$ |
| | Styrene butadiene rubber | $2.680 \times 10^6$ | $2.278 \times 10^6$ |
| WW (SBR with chlorophyll) | Poly (vinyl acetate) | $6.011 \times 10^6$ | $1.642 \times 10^6$ |
| | Unknown peak | $5.320 \times 10^7$ | $3.715 \times 10^6$ |
| | Styrene butadiene rubber | $5.683 \times 10^8$ | $5.741 \times 10^7$ |

Free radicals generated by the chlorophyll may act in a different way depending on the system they are in. They may cause several reactions in the polymers, such as crosslinking, degradation and oxidation depending on the structure of the compounds they encounter. The level of the oxidation was not measured in this study, only crosslinking and degradation as witnessed by changes in the molecular weight was measured. The changes in the poly (vinyl acetate) (PVAc) were not expected to have significant impact on the gum stickiness. However, the changes in the molecular weight of the rubbers proved to have significant impact on the stickiness of the samples.

Subsequent to exposure to sunlight, the PIB containing sample had slight increase in both molecular weight and molecular number of PVAc when chlorophyll was added, suggesting that the PVAc crosslinked either with itself or with the PIB. The compound detected with solubility similar to PVAc may be this reaction product. The PIB had reduced average molecular weight and lower molecular weight number. This is consistent with reactions of degradation. One high molecular weight polymer molecule gives rise to several molecules with much lower molecular weight upon degradation. Low molecular weight PIB was quite sticky. The decrease in the molecular weight of the PIB resulted in the increase in the stickiness of the PIB samples.

The higher increase in the molecular weight number as compared to increase in the average molecular weight of the BR samples could be explained by the lower amounts of low molecular weight polymer fraction as a result of crosslinking. Low molecular weight rubber was a bigger contributor to stickiness due to its higher mobility. The reduction in the lower molecular weight fraction and the increase of the average molecular weight of the rubber is believed to explain the observed reduction of gum stickiness.

Subsequent to exposure to sunlight, the SBR samples showed a large increase in both the molecular weight number and the average molecular weight. This is believed to explain the largest decrease in the stickiness observed physically when chlorophyll was added.

As seen from the above results, the chlorophyll addition reduced the adhesion of compositions containing unsaturated rubbers (BR and SBR) after exposure to sunlight. This observation was confirmed by the increase in both the molecular weight and the molecular number of these rubbers.

Example 12

This examples demonstrates how the incorporation of a polymer containing at least one hydrolyzable unit (particularly, a GANTREZ® copolymer) in gum bases that are exposed to conditions of high pH (e.g., pH 12.0) promotes the breakdown of the gum bases as compared to gum bases that do not contain such a polymer.

3-kilogram batches of four gum bases #1-#4 were prepared in accordance with Tables 19-22, respectively, below.

TABLE 19

GUM BASE #1

| COMPONENT | WEIGHT (%) | WEIGHT (g) | STEAM | MIXING TIME (minutes) |
|---|---|---|---|---|
| Butyl Rubber | 5.00 | 150.00 | On | |
| Polyisobutylene Oppanol 12 (PIB Oppanol 12)[1] | 14.00 | 420.00 | On | 5 |
| Material RS Ester 5[2] | 7.00 | 210.00 | Off | |
| Calcium carbonate | 19.00 | 570.00 | Off | 15 |
| PVA Vinnapas B30[3] | 27.00 | 810.00 | On | 5 |
| Material HO[4] | 15.00 | 450.00 | On | 5 |
| Paraffin | 4.00 | 120.00 | On | 3 |
| Material NL (Lecithyn) | 1.00 | 30.00 | | 1 |
| GMS[5] | 3.00 | 90.00 | On | 1 |
| Triacetin | 5.00 | 150.00 | On | 15 |
| TOTALS | 100.00 | 3000.00 | | 42.00 |

[1]In Tables 19-22 herein, PIB Oppanol 12 is an acronym for Polyisobutylene Oppanol 12.
[2]In Tables 19-22 herein, Material RS Ester 52 is a glycerol ester of partially hydrogenated refined wood rosin.
[3]In Tables 19-22 herein, PVA is an acronym for polyvinylacetate.
[4]In Tables 19-22 herein, Material HO is a hydrogenated blend of cottonseed oil and soybean oil with a melting temperature of about 70° C.
[5]In Tables 19-22 herein, GMS is an acronym for glycerol monostearate.

TABLE 20

GUM BASE #2

| COMPONENT | WEIGHT (%) | WEIGHT (g) | STEAM | MIXING TIME (minutes) |
|---|---|---|---|---|
| Butyl Rubber | 10.00 | 300.00 | On | |
| PIB Oppanol 12 | 10.00 | 300.00 | On | 5 |
| Material RS Ester 5 | 5.00 | 150.00 | Off | |
| Luzenac 225 Talc | 10.00 | 300.00 | Off | 10 |
| Material RS Ester 5 | 10.00 | 300.00 | Off | |
| Luzenac 225 Talc | 9.00 | 270.00 | Off | 10 |
| PVA Vinnapas B17 | 23.00 | 690.00 | On | 5 |
| Material HO | 10.00 | 300.00 | On | 5 |
| Paraffin | 7.00 | 210.00 | On | 3 |
| Material NL (Lecithyn) | 1.00 | 30.00 | On | 1 |
| GMS | 1.00 | 30.00 | On | 1 |
| Triacetin | 4.00 | 120.00 | On | 15 |
| TOTALS | 100.00 | 3000.00 | | 47.00 |

TABLE 21

GUM BASE #3

| COMPONENT | WEIGHT (%) | WEIGHT (g) | STEAM | MIXING TIME (minutes) |
|---|---|---|---|---|
| Butyl Rubber | 10.00 | 300.00 | On | |
| PIB Oppanol 12 | 10.00 | 300.00 | On | 5 |
| Material RS Ester 5 | 5.00 | 150.00 | Off | |
| Luzenac 225 Talc | 10.00 | 300.00 | Off | 10 |
| Material RS Ester 5 | 10.00 | 300.00 | Off | |
| Luzenac 225 Talc | 9.00 | 270.00 | Off | 10 |
| PVA Vinnapas B17 | 4.00 | 120.00 | On | 5 |
| PVA Vinnapas B1.5 | 25.00 | 750.00 | On | |
| Material HO | 7.00 | 210.00 | On | 5 |
| Paraffin | 5.00 | 150.00 | On | 3 |
| Material NL (Lecithyn) | 1.00 | 30.00 | | 1 |
| GMS | 3.00 | 90.00 | On | 1 |
| Triacetin | 1.00 | 30.00 | On | 15 |
| TOTALS | 100.00 | 3000.00 | | 47.00 |

TABLE 22

GUM BASE #4

| COMPONENT | WEIGHT (%) | WEIGHT (g) | STEAM | MIXING TIME (minutes) |
|---|---|---|---|---|
| SBR 1028[1] | 5.00 | 150.00 | On | |
| PIB Oppanol 12 | 15.00 | 450.00 | On | 5 |
| Material RS Ester 5 | 5.00 | 150.00 | Off | |
| Calcium carbonate | 10.00 | 300.00 | Off | 10 |
| Material RS Ester 5 | 9.00 | 270.00 | Off | |
| Calcium carbonate | 9.00 | 270.00 | Off | 10 |
| PVA Vinnapas B30 | 20.00 | 600.00 | On | |
| PVA Vinnapas B1.5 | 5.00 | 150.00 | On | 5 |
| Material HO | 10.00 | 300.00 | On | 5 |
| Paraffin | 5.00 | 150.00 | On | 3 |
| Material NL (Lecithyn) | 1.00 | 30.00 | | 1 |
| GMS | 2.00 | 60.00 | On | 1 |
| Triacetin | 4.00 | 120.00 | On | 15 |
| TOTALS | 100.00 | 3000.00 | | 47.00 |

[1]SBR is an acronym for styrene rubber.

Two 270 g batches of each of the gum bases #1-#4 were then individually softened at 80° C. in a 2 kg Z-blade mixer. GANTREZ® AN 169 copolymer was then added to one of the 270 g samples of each of the gum bases #1-4 in an amount that was 5% w/w of each of the gum bases #1-#4 to form inventive gum bases aa-dd. The batches to which GANTREZ® AN 169 copolymer was not added are referred to herein as control gum bases a-d.

For the samples to which GANTREZ® AN 169 copolymer was to be added, 13.5 g GANTREZ® AP copolymer was dry-mixed with 499 g sorbitol powder before the GANTREZ® copolymer was added to the softened gum bases. GANTREZ® AN 169 copolymer is a copolymer of methyl vinyl ether and maleic anhydride and has a molecular weight range of about 200,000 to about 2,000,000. Separately, 170 g maltitol syrup (Lycasin 80/55), 30 g Mannitol 60, 20 g glycerol, 2 g aspartame, and 1 g acesulfame-K were mixed together and added to the sorbitol/gum base blend and mixed in a Z-blade mixer for 1 hr at 80° C. Finally, 8 ml Trebor Extra Strong mint flavor oil was added and mixed for an additional 2 minutes.

Each batch of finished gum base was then removed from the Z-blade mixer and cooled, yielding four finished gum products containing GANTREZ® copolymer (i.e., inventive gum products aa-dd) and four finished gum products not containing GANTREZ® copolymer (i.e., a-d). All of the finished gum products were then stored in sealed plastic bags.

A portion of each of the eight finished gums was rolled using a Rondo roller to 5 mm thick slabs. Individual pieces were bored from the slab using a No. 11 cork borer with a diameter of 15 mm. Each piece weighed approximately 1.5 g. The slabs and individual pieces were stored in a 20° C. incubator.

Individual pieces of each of the finished gum products a-d and aa-dd were placed in an Erweka DRT-1 chewing gum machine between two nylon nets. The gap between the jaws was set to 2.5 mm. The pieces then were chewed mechanically at 40 strokes per minute for 30 minutes in 20 ml 0.1M sodium phosphate buffer at pH 8.0 (to simulate the pH of the mouth) to form cuds. At the end of the 30 minutes, the buffer was removed with a syringe and stored at 20° C. until further use.

An additional 20 ml of 0.1M sodium phosphate buffer at pH 12.0 was then introduced to the Erweka chewing machine, and the cuds were subjected to an additional 30 minutes of chewing at 40 strokes per minute. This buffer was then removed with a syringe and stored at −20° C.

Frozen supernatants from the Erweka chewing machine were completely thawed and their turbidity measured in a Hach Analytical Nephelometer. Samples were diluted so that they could be compared with either 10 or 100 nephelometric turbidity unit (ntu) standards.

The above-described experiment was carried out three times for each gum product containing a GANTREZ® copolymer (i.e., gum products aa-dd) and for each gum base product not containing a GANTREZ® copolymer (i.e., gum products a-d). The turbidity data from each of the three trials is shown below in Table 23 and summarized in the bar graph shown in FIG. 24. Turbidity was measured for the purpose of demonstrating the relative amounts of hydrolysis by-product at various pHs. Higher turbidity indicates higher hydrolytic breakdown of the chewing gum.

TABLE 23

TURBIDITY DATA

| GUM PRODUCT | DILUTION | TRIAL #1 - TURBIDITY (ntu) | TRIAL #2 - TURBIDITY (ntu) | TRIAL #3 - TURBIDITY (ntu) | AVERAGE | AVGERAGE × DILUTION |
|---|---|---|---|---|---|---|
| a - No GANTREZ ® copolymer pH 8.0 | 10 | 3.3 | 1.8 | 1.9 | 2.33 | 23.3 |
| b - No GANTREZ ® copolymer pH 8.0 | 10 | 3.8 | 2.5 | 1.5 | 2.60 | 26.0 |
| c - No GANTREZ ® copolymer pH 8.0 | 10 | 3.4 | 2.4 | 1.2 | 2.33 | 23.3 |
| d - No GANTREZ ® copolymer pH 8.0 | 10 | 2.8 | 2.1 | 2.8 | 2.57 | 25.7 |
| a - No GANTREZ ® copolymer pH 12.0 | 10 | 22 | 32 | 10 | 21.33 | 213.3 |
| b - No GANTREZ ® copolymer pH 12.0 | 10 | 2.8 | 3.6 | 2.4 | 2.93 | 29.3 |
| c - No GANTREZ ® copolymer pH 12.0 | 10 | 2.4 | 2.3 | 7.6 | 4.10 | 41.0 |
| d - No GANTREZ ® copolymer pH 12.0 | 10 | 22 | 63 | 13 | 32.67 | 326.7 |
| aa - 5 wt. % GANTREZ ® copolymer pH 8.0 | 10 | 15 | 13 | 27 | 18.33 | 183.3 |
| bb - 5 wt. % GANTREZ ® copolymer pH 8.0 | 10 | 6.1 | 17 | 29 | 17.37 | 173.7 |
| cc - 5 wt. 5% GANTREZ ® copolymer pH 8.0 | 10 | 3.2 | 2.7 | 2.8 | 2.90 | 29.0 |
| dd - 5 wt. % GANTREZ ® copolymer pH 8.0 | 10 | 5.8 | 15 | 6.9 | 9.23 | 92.3 |
| aa - 5 wt. % GANTREZ ® copolymer pH 12.0 | 30 | 88 | 100 | 100 | 96.00 | 2880.0 |
| bb - 5 wt. % GANTREZ ® copolymer pH 12.0 | 30 | 20 | 45 | 20 | 28.33 | 849.9 |
| cc - 5 wt. % GANTREZ ® copolymer 12.0 | 50 | 40 | 25 | 17 | 27.33 | 1366.5 |
| dd - 5 wt. % GANTREZ ® copolymer pH 12.0 | 50 | 80 | 80 | 60 | 73.33 | 3666.5 |

Figure 24:
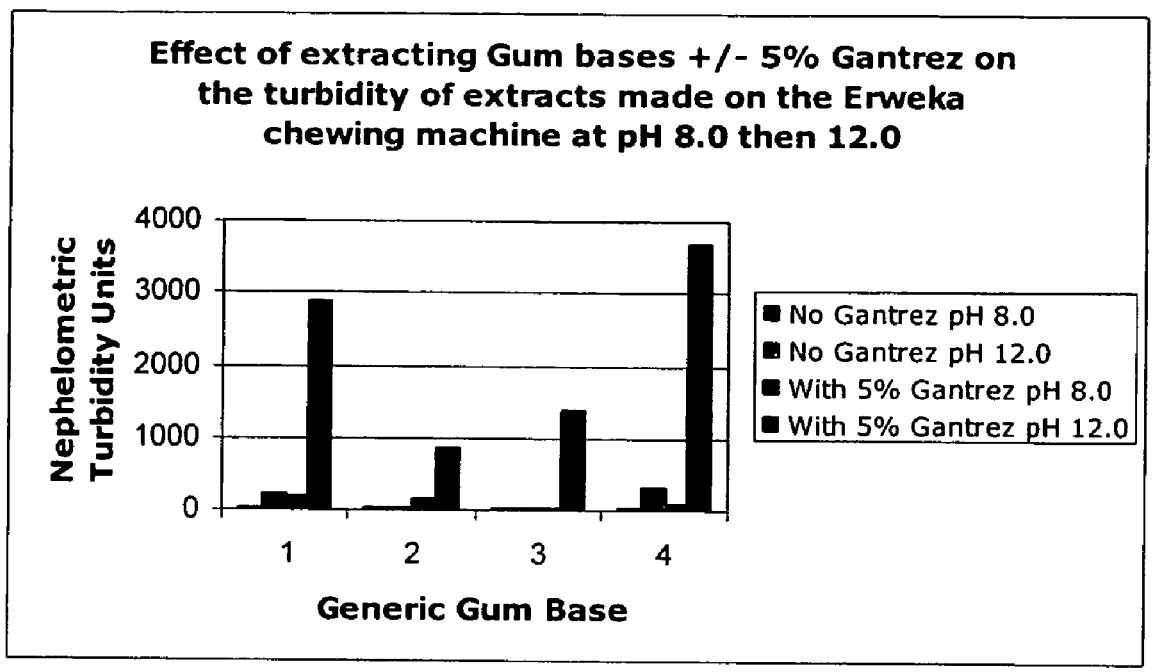
FIG. 24 is a bar graph depicting turbidity data generated from the experiment described in Example 1 herein.

As is apparent from Table 23 and FIG. 24, the chewing gum pieces extracted at pH 8.0 that contained 5% GANTREZ® copolymer in the gum bases (i.e., gum products aa-dd) all showed higher turbidity values, on average, than those pieces not containing GANTREZ® copolymer (i.e., gum products a-d) which were extracted at pH 8.0. In particular, all of the pieces from the gum products not containing GANTREZ® copolymer had very low turbidity values at pH 8.0. Accordingly, it may be assumed that at pH 8.0 there will be very little breakdown of the chewing gum cuds themselves. Rather, the very low turbidity observed is likely attributable to the solubilization of the sugar replacements (polyols) and sweeteners.

Although slightly more turbidity was observed at pH 12.0 for gum products B and C, gum products A and D showed roughly an order of magnitude increase in turbidity at pH 12.0 as compared to the turbidity of those samples at pH 8.0.

As is further apparent from Table 23 and FIG. 24, the turbidity measurements of all of the gum products containing GANTREZ® copolymer (i.e., gum products aa-dd) which were extracted at pH 12.0 were greater than the turbidity measurements of all of the gum products (i.e., gum products a-d) not containing GANTREZ® copolymer which were extracted at pH 12.0. Moreover, the turbidity measurements for the gum products containing GANTREZ® copolymer (i.e., gum products aa-dd) which were extracted at pH 12.0 are about one hundred fold greater than the turbidity measurements for the chewing gum products not containing GANTREZ® copolymer (i.e., gum products a-d) with no GANTREZ® copolymer extracted at pH 8.0. This data evidences that chewing gum cuds will breakdown to a significant extent when GANTREZ® copolymer is incorporated into gum bases, especially when the gum bases are exposed to conditions of high pH (such as pH 12.0).

Example 13

This example demonstrates the compatibility of certain polymers containing at least one hydrolyzable unit (particularly, GANTREZ® copolymer and polysuccinnimide) with a gum base. As used herein, the term "compatibility" refers to the ability of a polymer to be mixed with a gum base into a homogenous or substantially homogenous mixture.

250 g of a carbonate-based gum base was allowed to soften at 90° C. and then mixed for 5 minutes using a Winkworth labscale mixer. A hydrophilic precursor polymer (particularly, GANTREZ™ 139 copolymer) was then added to the mixture in an amount that was about 5% by weight of the gum base. Samples were subsequently removed at five minute intervals, cast into a silicone tray, and allowed to cool.

A carbonate gum base containing about 10% of an alternative hydrophilic precursor polymer (particularly, polysuccinnimide) was then prepared in the same manner. Samples were removed at five minute intervals, cast into a silicone tray, and allowed to cool.

The carbonate-based gum base samples containing GANTREZ™ 139 copolymer were completely homogenous after only 5 minutes of mixing, indicating the compatibility of GANTREZ™ 139 copolymer with the carbonate-based gum base. Even the (poly)succinimide appeared to be somewhat compatible with the carbonate-based gum base, showing only a partial phase separation after 30 minutes of mixing.

Example 14

This example demonstrates the compatibility of a polymer containing at least one hydrolyzable unit (particularly, GANTREZ® copolymer) with a carbonate-based gum base containing a polyol. Moreover, this example demonstrates how the incorporation of a polymer containing a hydrolyzable unit (particularly, GANTREZ AN™ copolymer) increases the rate of fragmentation of a gum base upon exposure to an agent having a basic pH.

A 200 g batch of a placebo gum base having the formulation set forth in Table 24 below was prepared.

TABLE 24

CHEWING GUM FORMULATION

| COMPONENT | WT. % |
|---|---|
| carbonate-based gum base | 29 |
| Sorbitol | 62.8 |
| Mannitol | 3 |
| Aspartame | 0.2 |

The chewing gum formulation set forth in Table 24 was then mixed at 90° C. for 30 minutes. Thereafter, GANTREZ AN™ 139 copolymer was added to the gum base and mixed at 90° C. for 120 minutes in a Winkworth labscale mixer to form inventive gum bases ee-hh. Accordingly, inventive gum bases ee-hh were prepared by first mixing a polyol (particularly, sorbitol) with a carbonate-based gum base and other components (i.e., mannitol and aspartame) prior to the addition of the GANTREZ® copolymer.

A sample of the placebo gum base formulation was then cast onto a silicone tray and allowed to cool. Likewise, samples of each of the inventive gum bases ee-hh were then cast onto silicone trays and allowed to cool. All of the samples containing GANTREZ AN™ 139 copolymer additive i.e., inventive gum base samples ee-hh, were completely homogenous with no phase separation of the GANTREZ AN™ 139 additive.

The placebo gum base sample was placed in a buffered solution having a pH of 8.0. The four inventive samples, meanwhile, were placed in a buffered solution having a pH as set forth in Table 25 below:

TABLE 25 pH CONDITIONS FOR INVENTIVE SAMPLES ee-hh

| INVENTIVE SAMPLE | pH of BUFFERED SOLUTION |
|---|---|
| ee | 12 |
| ff | 10 |
| gg | 8 |
| hh | 6 |

All of the inventive samples ee-hh containing GANTREZ AN™ copolymer fragmented completely or substantially within 30 minutes in contrast to the placebo gum base. Moreover, intermediate pH values showed equally rapid disintegration.

Example 15

This example sets forth inventive chewing gum compositions in accordance with the present invention.

Four 250 g batches of chewing gum base composition samples (i-l) were prepared as set forth in Table 26. The gum base samples were mixed in a Winkworth labscale mixer at 65-75° C. for 20 minutes. The samples were prepared in the order shown in Table 26 with a cleaning stage between the carbonate-based gums and the talc-based gums. Each sample was cast onto aluminum foil and cooled at 4° C. before being rolled into a slab approximately 5 mm thick. The samples were then stamped out using a 15 mm cork borer.

TABLE 26

CHEWING GUM COMPOSITIONS i-l

| COMPONENT | i<br>% w/w (g) | j<br>% w/w (g) | k<br>% w/w (g) | l<br>% w/w (g) |
|---|---|---|---|---|
| Sorbitol Powder: P60 | 49.90 | 49.90 | 49.90 | 49.90 |
| Sugar free gum base | 27.00 Carbonate[1] | 27.00 Carbonate[1] | 27.00 Talc[2] | 27.00 Talc[2] |
| Maltitol Syrup: Lycasin 80/55 | 17.00 | 17.00 | 17.00 | 17.00 |
| Mannitol 60 | 3.00 | 3.00 | 3.00 | 3.00 |
| Glycerol | 2.00 | 2.00 | 2.00 | 2.00 |
| Aspartame | 0.20 | 0.20 | 0.20 | 0.20 |
| Acesulfame | 0.10 | 0.10 | 0.10 | 0.10 |
| Mint flavor | 0.80 | 0.80 | 0.80 | 0.80 |
| Total percentage | 100.00 | 100.00 | 100.00 | 100.00 |
| Total gum base | 250 g | 250 g | 250 g | 250 g |

[1]Carbonate filler in gum base.
[2]Talc filler in gum base.

GANTREZ AN™ 139 copolymer was then added to each of the gum bases to form inventive chewing gum compositions ii-ll as set forth in Table 27.

TABLE 27

INVENTIVE CHEWING GUM COMPOSITIONS ii-ll

| COMPONENT | ii<br>% w/w (g) | jj<br>% w/w (g) | kk<br>% w/w (g) | ll<br>% w/w (g) |
|---|---|---|---|---|
| Sorbitol Powder: P60 | 49.90 | 49.90 | 49.90 | 49.90 |
| Sugar free gum base | 27.00 Carbonate[1] | 27.00 Carbonate[1] | 27.00 Talc[2] | 27.00 Talc[2] |
| Maltitol Syrup: Lycasin 80/55 | 17.00 | 17.00 | 17.00 | 17.00 |
| Mannitol 60 | 3.00 | 3.00 | 3.00 | 3.00 |
| Glycerol | 2.00 | 2.00 | 2.00 | 2.00 |
| Aspartame | 0.20 | 0.20 | 0.20 | 0.20 |
| Acesulfame | 0.10 | 0.10 | 0.10 | 0.10 |
| Mint flavor | 0.80 | 0.80 | 0.80 | 0.80 |
| Total percentage | 100.00 | 100.00 | 100.00 | 100.00 |
| Total gum base | 250 g | 250 g | 250 g | 250 g |
| GANTREZ AN ™ AN139 (g) | 0.675 g | 3.375 g | 0.675 g | 3.375 g |
| GANTREZ AN ™ AN139 (%) | 1% | 5% | 1% | 5% |

[1]Carbonate filler in gum base.
[2]Talc filler in gum base.

Inventive samples ii-ll thus prepared were placed in batches of six plugs in polythene bags containing 75 ml deionised water and subjected to mechanical compression in a Seward Ltd Stomacher 400 Circulator laboratory stomaching machine on slow speed setting for 10, 30, and 60 minutes. The bags were then placed inside new bags at 30 minutes to avoid rupture. At each of the 10, 30, and 60 minute time points, each of the inventive samples ii-ll were removed, separated, and placed into vials containing deionised water, rain water, or a 50% solution of domestic cleaning product.

Each of the inventive samples which were stomached for 10, 30, or 60 minutes were observed after 0 hours in rain water, after 0 hours in deionised water, and after 0 hours in a 50% aqueous solution of domestic cleaning solution. These samples were used as a baseline for relative comparison of the inventive compositions.

Example 16

This example demonstrates the effect of mechanical agitation on chewing gum compositions of the present invention. Moreover, this example demonstrates how the inventive chewing gum compositions of the present invention containing GANTREZ® copolymer will fragment over time upon exposure to an agent having a basic pH (particularly, upon placement in a domestic cleaning solution).

Each of inventive samples ii-ll prepared as described in Example 15 was kept in a domestic cleaning solution for 11 days after initial stomaching for 10 minutes, 30 minutes, or 60 minutes.

The talc-based gum samples stomached for 10, 30, and 60 minutes showed the fastest rates of fragmentation, with the 5% GANTREZ AN™ copolymer sample demonstrating clear disintegration within 4 hours of immersion in a 50% aqueous solution of domestic cleaning solution. Moreover, it was observed that the amount of fragmentation decreased with increasing initial stomaching time.

The talc-based chewing gum samples containing 1% GANTREZ AN™ 139 copolymer (i.e., inventive samples kk) that were stomached for 10 minutes began to fragment in the domestic cleaning solution at around 50 hours. Onset of fragmentation for the talc-based chewing gum samples containing 1% GANTREZ AN™ 139 copolymer (i.e., inventive samples kk) that were stomached for 30 and 60 minutes was not apparent, however, until after about 10 days. Thus, there appears to be a correlation between lesser mechanical agitation and an earlier onset of fragmentation.

Example 17

This example demonstrates the effect of gum-base type and the effect of the amount of GANTREZ® copolymer on fragmentation. Moreover, this example further demonstrates the effect of mechanical agitation on gum bases of the present invention. Additionally, this example demonstrates how the nature of the treatment of the gum bases effects fragmentation. In particular, this example demonstrates how exposure to an agent having a basic pH increases the rate of fragmentation of the inventive gum bases.

Each of inventive samples ii-ll prepared as described in Example 15 were kept in rain water for 11 days after initial stomaching for 10 minutes, 30 minutes, and 60 minutes and in deionised water for 11 days after initial stomaching for 10 minutes, 30 minutes, and 60 minutes.

The inventive samples ii-ll were observed after 19 hours, 74 hours, 139 hours, 170 hours, 10 days, and 11 days in rain after initial stomaching for 10 minutes. The inventive samples ii-ll were observed after 0 hours, 19 hours, 74 hours, 139 hours, 170 hours, and 10 days in deionised water. Moreover, the inventive samples ii-ll prepared as described in Example 15 were observed after placement in rain water or deionised water for 10 days.

Effect of Gum-Base Type and Amount of GANTREZ on Fragmentation

The carbonate-based gum bases exhibited less fragmentation than the talc-based chewing gum compositions in rain water. Although the onset of fragmentation of the talc-based chewing gum compositions containing 5% GANTREZ AN™ 139 copolymer (i.e., inventive sample ll) that were stomached for 10 minutes was apparent after 139 hours in rain water, the other samples, including the carbonate-based gum base sample including 5% GANTREZ AN™ 139 copolymer (i.e., inventive sample jj), did not fragment even after 11 days in rain water.

Similarly, the carbonate-based gum bases exhibited less fragmentation than the talc-based chewing gum compositions containing 5% GANTREZ AN™ 139 copolymer (i.e., inventive sample ll) in deionised water Although the onset of fragmentation of the talc-based chewing gum compositions containing 5% GANTREZ AN™ 139 (i.e., inventive sample ll) that was stomached for 10 minutes was apparent after 170 hours in deionised water, the other samples, including the carbonate-based chewing gum composition sample including 5% GANTREZ AN™ 139 copolymer (i.e., inventive sample jj), did not fragment even after 10 days in deionised water.

Effect of Mechanical Agitation on Fragmentation

It was observed that stomaching for longer than 10 minutes reduced the amount of fragmentation. Accordingly, the amount of mechanical agitation that the chewing gum is exposed to has an effect on the fragmentation rate.

Effect of the Nature of the Treatment of the Chewing Gum on Fragmentation

Moreover, based on a comparison of the results from the experiments discussed in Examples 16 and 17, it is apparent that the nature of the treatment of the chewing gum also has an effect on the fragmentation rate. In particular, the extent of fragmentation was less for inventive samples ii-kk that were stomached for 10 minutes and exposed to rain water for 11 days as compared to the inventive samples ii-kk that were stomached and exposed to the domestic cleaning solution (50% Mr. Muscle, pH ca. 12) for 11 days. Likewise, it was observed that the extent of fragmentation was less for inventive samples ii-kk that were stomached and exposed to deionised water for 11 days as compared to the inventive samples ii-kk that were stomached for 10 minutes and exposed to the domestic cleaning solution (50% Mr. Muscle, pH ca. 12) for 11 days. In particular, the apparent rate of fragmentation of the inventive gum samples was lower in rain water and deionised water than in domestic cleaning solution (50% Mr. Muscle, pH ca. 12). Without wishing to be bound to any particular theory, it is surmised that the elevated pH of the domestic cleaning solution and the wetting action of the surfactants present in the domestic surface cleaner accelerated the rate of fragmentation.

Example 18

This example demonstrates that a hydrophobic component, i.e., a hydrophilic precursor component, in accordance with the present invention may be successfully incorporated into a SBS block copolymer to create films having enhanced hydrophilicity at the surface. In particular, GANTREZ® copolymer 169 (i.e., a poly methylvinyl ether maleic anhydride copolymer) was successfully incorporated into a SBS block copolymer at concentrations up to about 10 wt. % without macroscopic phase separation by dispersing the powdered GANTREZ® copolymer into a toluene solution of SBS and then casting films by air drying. After allowing the films to soak in water overnight, the initially transparent films became white and opaque, indicating that the anhydride hydrolyzed to the free acid and phase-separated from the hydrophobic polymer. Moreover, the surface of the polymer film became extremely slippery following soaking, indicating enhanced hydrophilicity of the surface of the film.

Example 19

The example sets forth inventive gum base compositions of the present invention.

TABLE 28

| INVENTIVE GUM BASE COMPOSITIONS | | | | |
|---|---|---|---|---|
| COMPONENT | mm | nn | oo | pp |
| Styrene Butadiene Rubber | 5 | 0 | 0 | 0 |
| Butyl Rubber | 0 | 10 | 10 | 5 |
| Polyisobutylene Rubber (Low Molecular Weight up to 75,000) | 15 | 10 | 10 | 14 |

TABLE 28-continued

INVENTIVE GUM BASE COMPOSITIONS

| COMPONENT | mm | nn | oo | pp |
|---|---|---|---|---|
| Polyvinylacetate (High Molecular Weight - above 200,000) | 20 | 0 | 0 | 27 |
| Polyvinylacetate (Intermediate Molecular Weight - 20,000 to 50,000) | 0 | 23 | 4 | 0 |
| Polyvinylacetate (Low Molecular Weight - up to 20,000) | 5 | 0 | 25 | 0 |
| Glycerol Ester of Wood Rosin | 14 | 15 | 15 | 7 |
| Hydrogenated Vegetable Oil | 10 | 10 | 7 | 15 |
| Glycerol Monostearate | 2 | 1 | 3 | 3 |
| Paraffin | 5 | 7 | 5 | 4 |
| Triacetin | 4 | 4 | 1 | 5 |
| Lecithin | 1 | 1 | 1 | 1 |
| Talc | 0 | 19 | 19 | 0 |
| Calcium Carbonate | 19 | 0 | 0 | 19 |
| GANTREZ ® copolymer | 1-5 | 1-5 | 1-5 | 1-5 |

Each gum base was then incorporated into chewing gum compositions as shown in Table 29 below.

TABLE 29

INVENTIVE CHEWING GUM COMPOSITIONS

| Component | mmm | nnn | ooo | ppp |
|---|---|---|---|---|
| Gum Base mm | 30 | — | — | — |
| Gum Base nn | — | 30 | — | — |
| Gum Base oo | — | — | 30 | — |
| Gum Base pp | — | — | — | 30 |
| Sorbitol | 49.3 | 49.3 | 49.3 | 49.3 |
| Maltitol | 10.4 | 10.4 | 10.4 | 10.4 |
| Glycerin | 3.0 | 3.0 | 3.0 | 3.0 |
| Acesulfame K | 0.1 | 0.1 | 0.1 | 0.1 |
| Aspartame | 0.2 | 0.2 | 0.2 | 0.2 |
| Peppermint Flavor | 2.0 | 2.0 | 2.0 | 2.0 |
| Calcium Carbonate | 5.0 | 5.0 | 5.0 | 5.0 |

It is expected that inventive chewing gum compositions mmm-ppp will exhibit enhanced degradability upon exposure to a condition that promotes hydrolysis in comparison to chewing gum compositions having the same formulations except for the inclusion of the hydrophilic precursor component (particularly, a GANTREZ® copolymer).

Example 20

TABLE 30

INVENTIVE GUM BASE COMPOSITIONS

| COMPONENT | qq (g) | rr (g) | ss (g) | tt (g) |
|---|---|---|---|---|
| Polyhydroxyalkanoate-1 (PHA-1) (copolymer of 3-hydroxyoctanoate and 3-hydroxyhexanoate)[1] | 35 | 0 | 35 | 35 |
| Polyhydroxyalkanoate-2 (PHA-2)[2] (copolymer of units with side chains $C_8$ and $C_{10}$) | 0 | 35 | 0 | 0 |
| Calcium Carbonate Powder (mean particle = 4.5-5.0 micron) | 20 | 20 | 0 | 0 |
| Talc | 0 | 0 | 0 | 20 |
| Oat Fiber | 0 | 0 | 20 | 0 |
| Fully Hydrogenated Cottonseed Oil | 2.5 | 2.5 | 2.5 | 2.5 |
| Partially Hydrogenated Soya Oil | 2 | 2 | 2 | 2 |
| GANTREZ ® copolymer | 1-5 | 1-5 | 1-5 | 1-5 |

[1] About 91:9 ratio; Tg of = −35° C.; Tm of 61° C.; Heat of Fusion Δ = 15.0 J/g as revealed by differential scanning calorimetry (DSC); Mn = 75,000 and Mw = 127,000 as measured by gel permeation chromatography relative to polystyrene standards; X-ray crystallinity less than 25%.
[2] Mn = 65,000 g/mol and Mw = 106,700 g/mol as measured by gel permeation chromatography relative to polystyrene standards; Tg = −30° C., Tm = 61° C., and Δ = 15.0 J/g.

Inventive gum base composition qq may be prepared by adding 35 grams of PHA-1 and 20 grams of calcium carbonate powder in the amounts set forth in Table 30 to a laboratory gum base mixer that is set at 90° C. Thereafter, 20 grams of calcium carbonate powder is slowly added to the mixture. After 20 minutes of mixing, 2.5 grams of the fully hydrogenated cottonseed oil and 2 grams of the partially hydrogenated soya oil are added to form a homogenous mixture. GANTREZ® copolymer is then added to the mixture in an amount that is between about 1% by weight and about 5% by weight.

Inventive gum base composition rr may be prepared in the same manner as inventive gum base composition qq except that PHA-2 was used in place of PHA-1.

Inventive gum base composition ss may be prepared in the same manner as inventive gum base composition qq except that oat fiber was used in place of the calcium carbonate.

Inventive gum base composition tt may be prepared in the same manner as inventive gum base composition qq except that talc was used in place of the calcium carbonate.

Each gum base was then incorporated into chewing gum compositions as shown in Table 31 below.

TABLE 31

INVENTIVE CHEWING GUM COMPOSITIONS qqq-ttt

| Component | qqq (g) | rrr (g) | sss (g) | ttt (g) |
|---|---|---|---|---|
| Gum Base qq | 25 | — | — | — |
| Gum Base rr | — | 25 | — | — |
| Gum Base ss | — | — | 25 | — |
| Gum Base tt | — | — | — | 25 |
| Sugar | 77 | 77 | 77 | 77 |
| Corn Syrup | 25.5 | 25.5 | 25.5 | 25.5 |
| Glycerol (96%) | 0.6 | 0.6 | 0.6 | 0.6 |
| Peppermint Flavor | 0.8 | 0.8 | 0.8 | 0.8 |

Inventive chewing gum composition qqq may prepared by mixing 25 grams of inventive chewing gum base qq, 77 grams of sugar, and 25.5 grams of corn in a laboratory gum mixer set at 50° C. for 20 minutes. Then, 0.6 g 96% glycerol and 0.8 grams peppermint flavor are added, and the resultant mixture is mixed for an additional five minutes to form inventive chewing gum composition qqq.

Inventive chewing gum composition rrr may prepared by mixing 25 grams of inventive chewing gum base rr, 77 grams of sugar, and 25.5 grams of corn in a laboratory gum mixer set at 50° C. for 20 minutes. Then, 0.6 g 96% glycerol and 0.8 grams peppermint flavor are added, and the resultant mixture is mixed for an additional five minutes to form inventive chewing gum composition rrr.

Inventive chewing gum composition sss may prepared by mixing 25 grams of inventive chewing gum base ss, 77 grams of sugar, and 25.5 grams of corn in a laboratory gum mixer set at 50° C. for 20 minutes. Then, 0.6 g 96% glycerol and 0.8 grams peppermint flavor are added, and the resultant mixture is mixed for an additional five minutes to form inventive chewing gum composition sss.

Inventive chewing gum composition ttt may prepared by mixing 25 grams of inventive chewing gum base tt, 77 grams of sugar, and 25.5 grams of corn in a laboratory gum mixer set at 50° C. for 20 minutes. Then, 0.6 g 96% glycerol and 0.8 grams peppermint flavor are added, and the resultant mixture is mixed for an additional five minutes to form inventive chewing gum composition ttt.

TABLE 32

INVENTIVE GUM BASE COMPOSITION uuu

| COMPONENT | uuu (g) |
|---|---|
| Polyhydroxyalkanoate-2 (PHA-2)$^2$ (copolymer of units with side chains $C_8$ and $C_{10}$) | 20 |
| Calcium Carbonate Powder | 5 |
| Sugar | 59.4 |
| Corn Syrup | 20 |
| GANTREZ ® copolymer | 1-5 |
| Peppermint Oil | 0.6 |

Inventive chewing gum composition uuu may prepared by mixing 20 grams of PHA-2, 5 grams of calcium carbonate powder, 59.4 grams of sugar powder, and 20 grams of corn syrup in a laboratory gum mixer set at 50° C. for 20 minutes. Then, 0.6 grams of peppermint oil is added, and the resultant mixture is mixed for five minutes to form inventive chewing gum composition uuu.

Example 21

This example demonstrates that gum samples containing a GANTREZ AN™ copolymer will fragment upon exposure to rainfall.

Carbonate-based gum base samples containing 1 wt. %, 2.5 wt. %, 5 wt. %, 7.5 wt. %, and 10 wt. % of a GANTREZ AN™ copolymer were cast from toluene solution. The gum base samples were then placed on pavement and exposed to transient rainfall.

It was observed that exposure to transient rainfall for over a month was effective in fragmenting the samples to a powder removable by brushing.

Example 22

This example demonstrates the effect of exposing chewing gum cuds to environmental factors (i.e., weather conditions). In particular, eight chewing gum cuds were prepared in the same manner except that four of the cuds contained a GANTREZ® copolymer while four the cuds did not contain a GANTREZ® copolymer. The chewing gum cuds were placed on a slab and placed outside such that they were exposed to weather conditions for 56 days.

Figure 25:
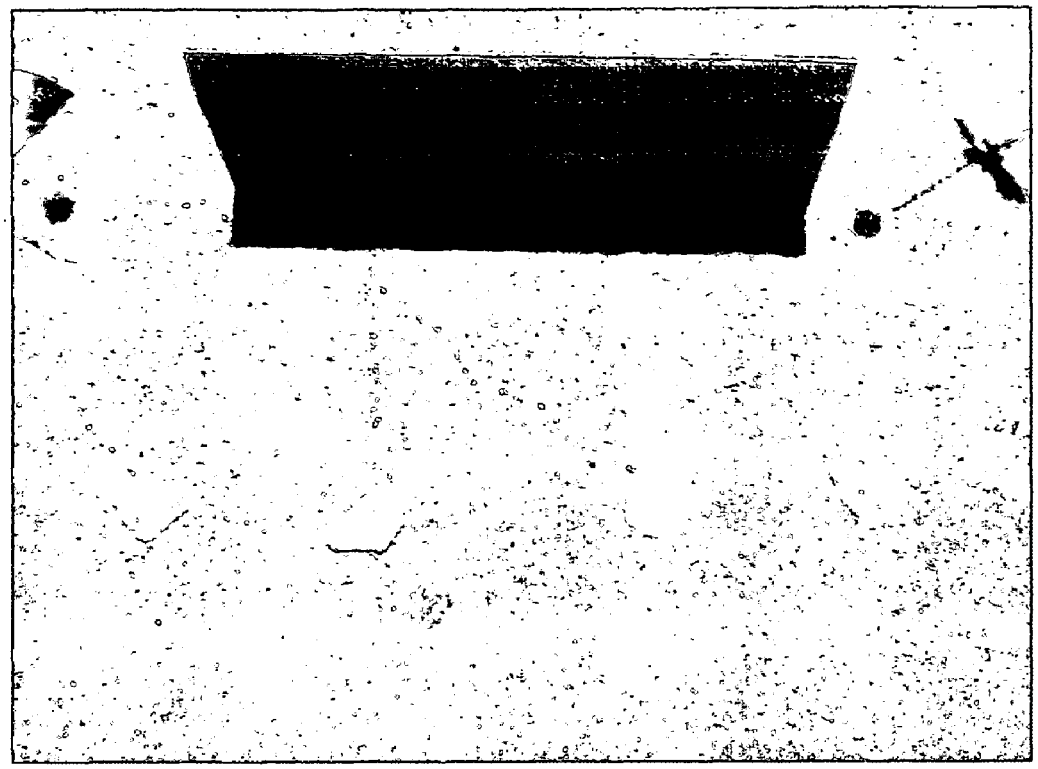
FIG. 25 is a photograph of chewing gum cuds not containing a GANTREZ® copolymer after exposure to environmental factors (i.e., weather conditions) after 56 days.
Figure 26:
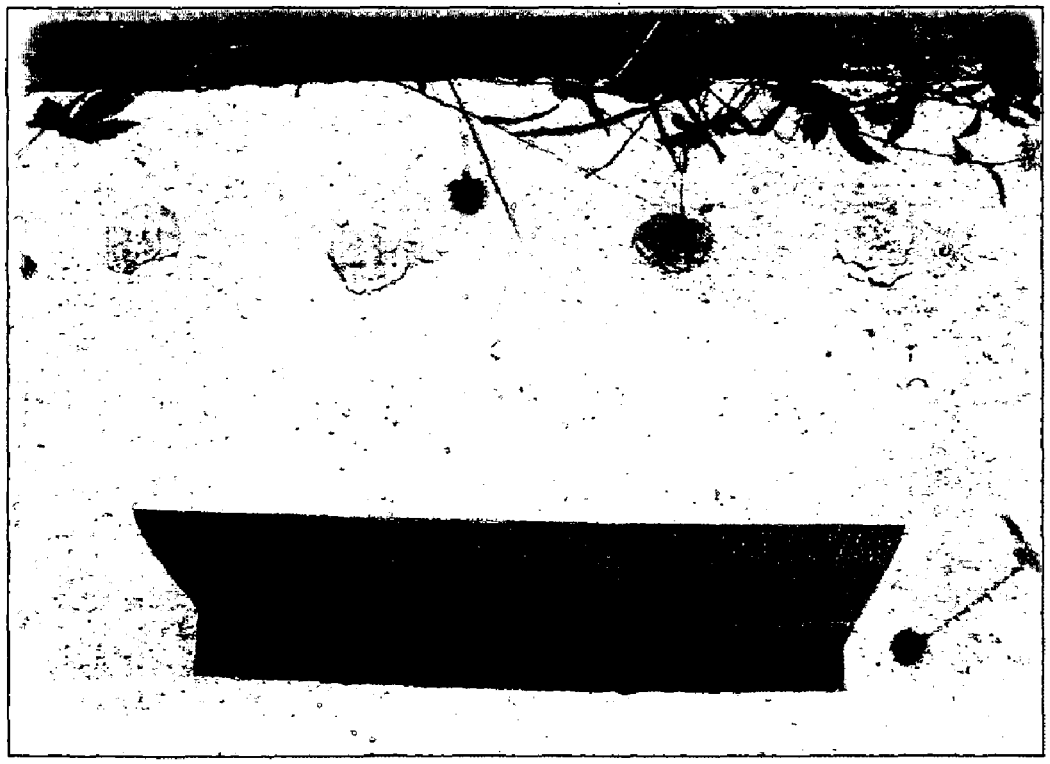
FIG. 26 is a photograph of chewing gum cuds containing a GANTREZ® copolymer after exposure to environmental factors (i.e., weather conditions) after 56 days.
Figure 27:
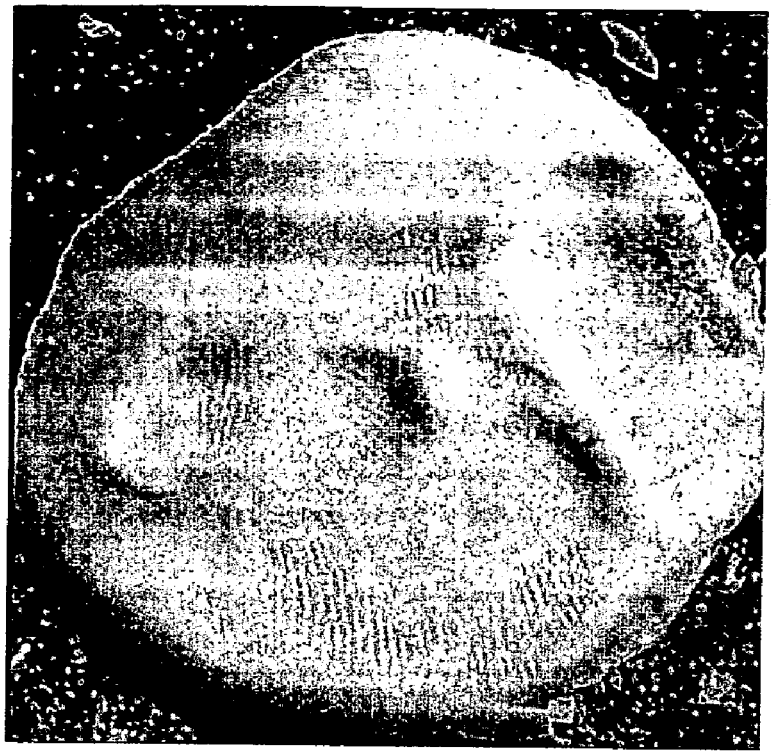
FIGS. 27-31 are photographs of carbonate-based chewing gum bases containing a GANTREZ® copolymer after exposure to environmental factors (i.e., weather conditions) after various durations of time.
Figure 28:
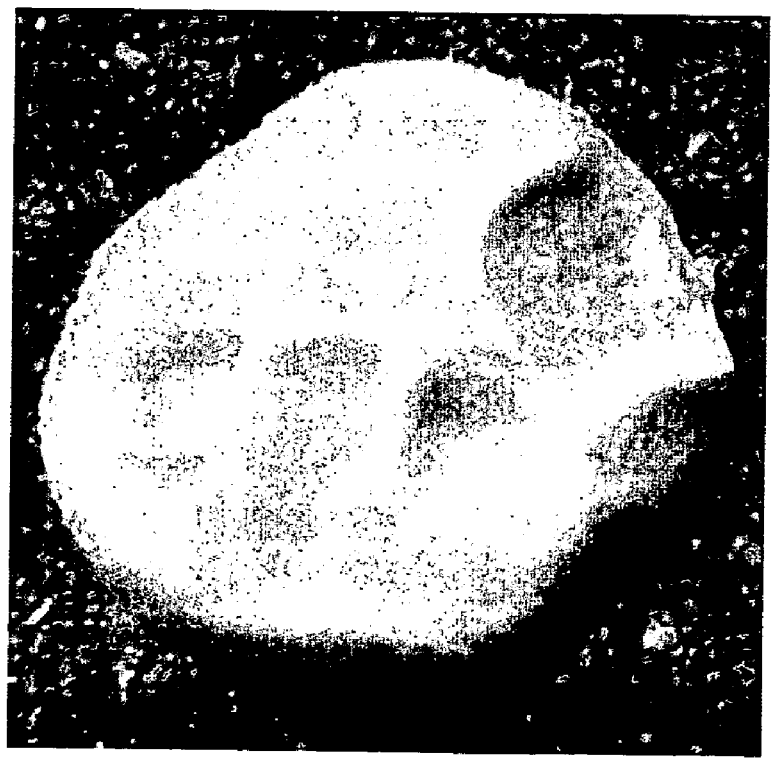
Figure 29:
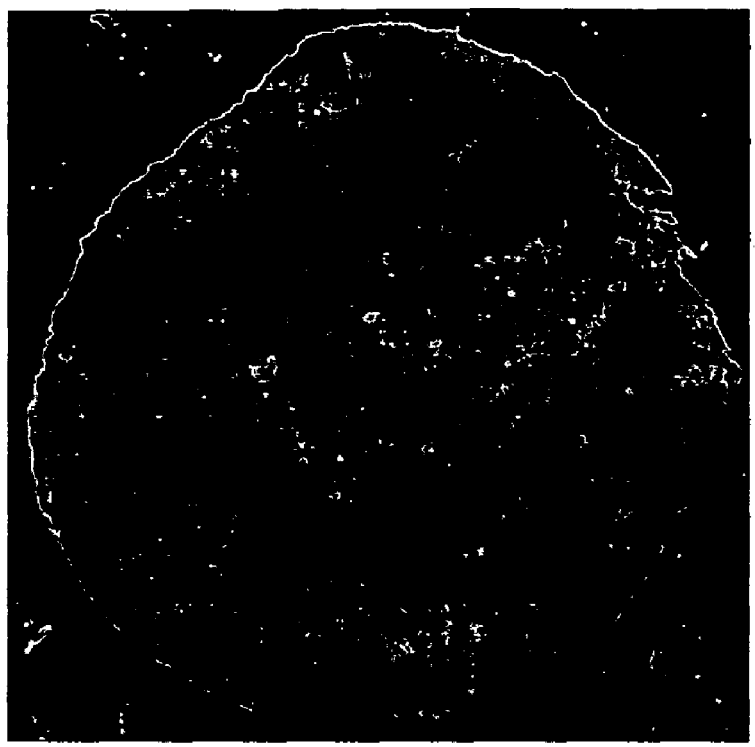
Figure 30:
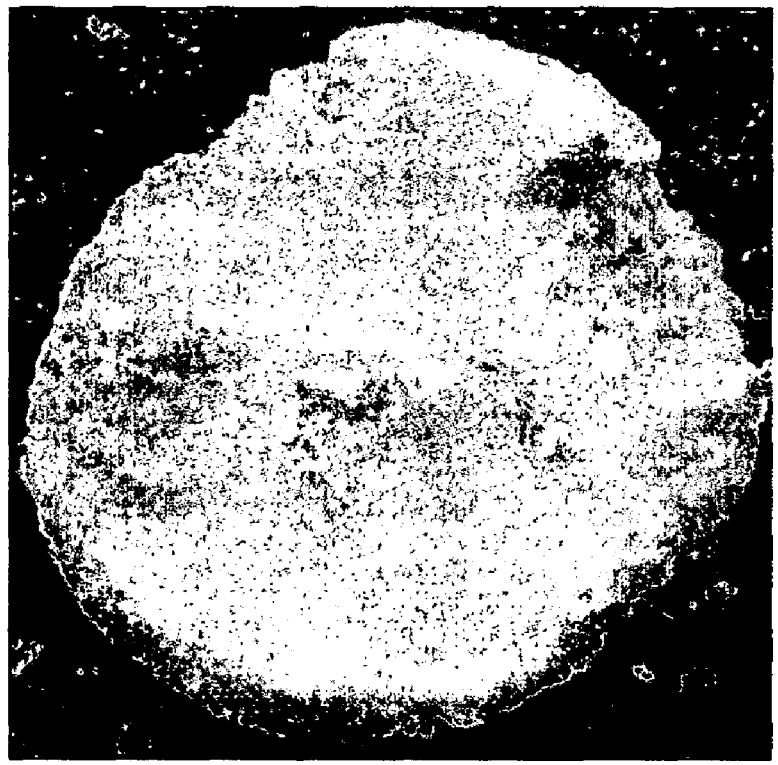
Figure 31:
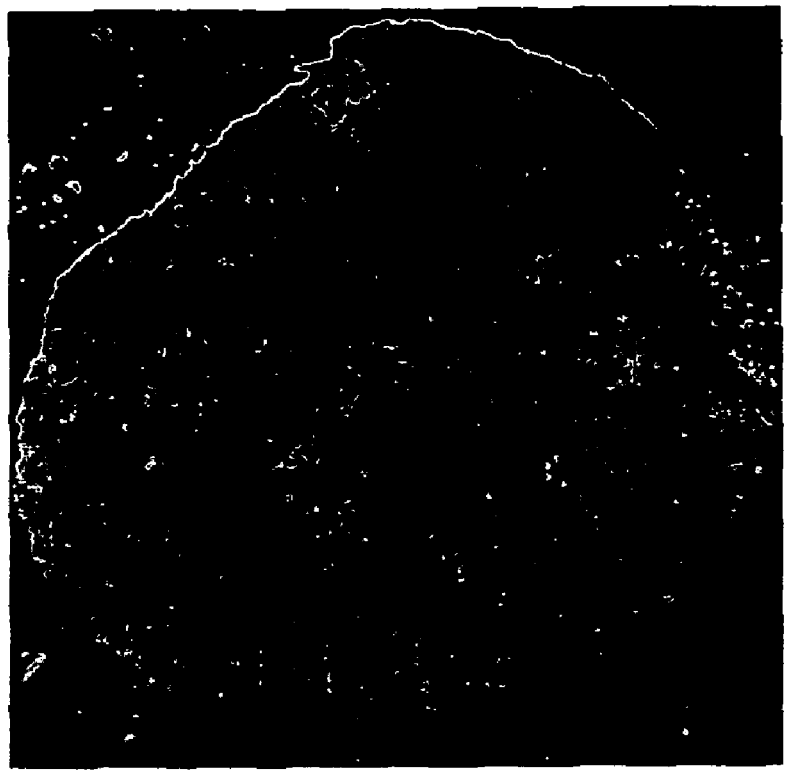

FIG. 25 is a photograph of the chewing gum cuds that did not contain the GANTREZ® copolymer after 56 days, while FIG. 26 is a photograph of the chewing gum cuds that did contain the GANTREZ® copolymer after 56 days. As is apparent from FIG. 26, the chewing gum cuds containing GANTREZ® copolymer started to peel and crack off of the slab after 56 days while the chewing gum cuds not containing GANTREZ® copolymer did not exhibit any peeling from the surface after 56 days as shown in the photograph in FIG. 25.

Example 23

This example demonstrates how a carbonate-based gum base containing a GANTREZ® copolymer will fragment over time upon exposure to cycling weather conditions (i.e., to cycling conditions of rainfall and sunlight). In particular, a carbonate-based gum base containing 10% GANTREZ AN™ copolymer was placed on a piece of paving stone material along with a carbonate-based gum base that was made in the same manner but did not include the GANTREZ AN™ copolymer. The piece of paving stone material was then exposed to prevailing weather conditions (including exposure to rainfall followed by sunny conditions) for a period of five weeks.

Figure 32:
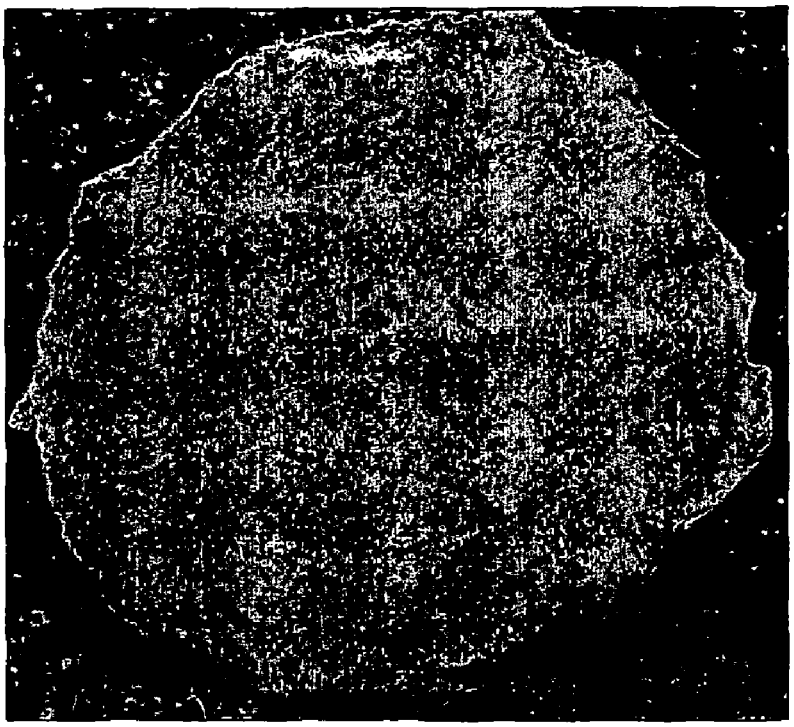
FIG. 32 is a photograph of carbonate-based chewing gum base which did not contain GANTREZ® copolymer and which was exposed to environmental factors (i.e., weather conditions) for 5 weeks.

FIGS. 27-31, respectively, are photographs of the carbonate-based gum base at (a) time 0, (b) one week, (c) three weeks, (d) three weeks after two days of heavy rain, and (d) five weeks. FIG. 32 is a photograph of the control carbonate gum base containing no GANTREZ AN™ copolymer. As is apparent from FIG. 31, a significant change in surface morphology of the carbonate-based gum base sample containing GANTREZ AN™ copolymer was evident after five weeks. Moreover, light brushing of the surface removed a white powdery material, evidencing fragmentation of the sample. In contrast, no fragmentation was seen with regard to the control sample which did not contain GANTREZ AN™, as shown in FIG. 32.

The invention claimed is:

1. A gum base comprising:
   (a) about 5% to about 10% by weight based on the weight of the gum base of a salt of a polymer comprising hydrolyzable units, wherein said polymer is selected from the group consisting of a copolymer of methyl vinyl ether and maleic anhydride, a copolymer of polystyrene and maleic anhydride, and combinations thereof, wherein said gum base has increased degradability and/or reduced-stick properties in the presence of the salt of a polymer comprising hydrolyzable units as compared to in the absence of the salt of the polymer comprising hydrolyzable units;
   (b) an elastomer;
   (c) a non-stick inducing component consisting of one or more members selected from the group consisting of hydrogenated cottonseed oil, hydrogenated soybean oil, hydrogenated canola oil, hydrogenated olive oil, hydrogenated grape seed oil, hydrogenated peanut oil, hydrogenated sunflower oil, hydrogenated safflower oil, hydrogenated palm oil, hydrogenated cocoa butter, hydrogenated coconut oil, hydrogenated palm kernel oil, animal fats, fatty esters of sugars and phospholipids, wherein said gum base exhibits increased degradability and/or reduced-stick properties in the presence of the non-stick inducing component as compared to in the absence of the non-stick inducing component; and
   (d) at least one component that promotes hydrolysis, wherein said component is f talc, and wherein the gum base that contains the at least one component that promotes hydrolysis will degrade faster than a gum base that does not contain the at least one component that promotes hydrolysis.

2. The gum base of claim 1, wherein the hydrolyzable unit is selected from the group consisting of an ester bond and an ether bond.

3. The gum base of claim 1, wherein the salt of the polymer comprising hydrolyzable units is selected from the group consisting of an alkali metal salt and an alkaline earth metal salt.

4. The gum base of claim 1, wherein the polymer has a molecular weight in the range of about 10,000 to about 5,000,000.

5. The gum base of claim 4, wherein the polymer has a molecular weight in the range of about 90,000 to about 200,000.

6. The gum base of claim 1, wherein the elastomer is present in amount of about 5% by weight to about 95% by weight of the gum base.

7. The gum base of claim 1, further including a solvent or softener for said elastomer.

8. The gum base of claim 1, wherein said elastomer is selected from the group consisting of polyisobutylene, butyl rubber, styrene-butadiene rubber, styrene-butadiene-styrene rubber, and combinations thereof.

9. The gum base of claim 1, further comprising at least one component selected from the group consisting of sweeteners, flavors, physiological cooling agents, warming agents, tingling agents, and combinations thereof.

10. A chewing gum product comprising:
    (a) a gum base comprising:
        (i) about 5% to about 10% by weight based on the weight of the gum base of a salt of a polymer comprising hydrolyzable units; wherein said polymer is selected from the group consisting of a copolymer of methyl vinyl ether and maleic anhydride, a copolymer of polystyrene and maleic anhydride, and combinations thereof, wherein said gum base has increased degradability and/or reduced-stick properties in the presence of the salt of the polymer comprising hydrolyzable units as compared to in the absence of the salt of the polymer comprising hydrolyzable units;
        (ii) an elastomer;
        (iii) a solvent or softener for said elastomer;
        (iv) a non-stick inducing component consisting of one or more members selected from the group consisting of hydrogenated cottonseed oil, hydrogenated soybean oil, hydrogenated canola oil, hydrogenated olive oil, hydrogenated grape seed oil, hydrogenated peanut oil, hydrogenated sunflower oil, hydrogenated safflower oil, hydrogenated palm oil, hydrogenated cocoa butter, hydrogenated coconut oil, hydrogenated palm kernel oil, animal fats, fatty esters of sugars and phospholipids, wherein said gum base exhibits increased degradability and/or reduced-stick properties in the presence of the non-stick inducing component as compared to in the absence of the non-stick inducing component; and
        (v) at least one component that promotes hydrolysis, wherein said component is talc, and wherein the gum base that contains the at least one component that promotes hydrolysis will degrade faster than a gum base that does not contain the at least one component that promotes hydrolysis; and
    (b) at least one component selected from the group consisting of sweetener, flavors, physiological cooling agents, warming agents, tingling agents, and combinations thereof.

11. A method of preparing a chewing gum composition comprising:
    (a) providing a gum base comprising:
        (i) about 5% to about 10% by weight based on the weight of the gum base of at least one salt of a polymer comprising hydrolyzable units, wherein said polymer is selected from the group consisting of a copolymer of methyl vinyl ether and maleic anhydride, a copolymer of polystyrene and maleic anhydride, and combinations thereof, wherein said gum base has increased degradability and/or reduced-stick properties in the presence of the salt of the polymer comprising hydrolyzable units as compared to in the absence of the salt of the polymer comprising hydrolyzable units;
        (ii) an elastomer;
        (iii) a solvent or softener for said elastomer;
        (iv) a non-stick inducing component consisting of one or more members selected from the group consisting of hydrogenated cottonseed oil, hydrogenated soybean oil, hydrogenated canola oil, hydrogenated olive oil, hydrogenated grape seed oil, hydrogenated peanut oil, hydrogenated sunflower oil, hydrogenated safflower oil, hydrogenated palm oil, hydrogenated cocoa butter, hydrogenated coconut oil, hydrogenated palm kernel oil, animal fats, fatty esters of sugars and phospholipids, wherein said gum base exhibits increased degradability and/or reduced-stick properties in the presence of the non-stick inducing component as compared to in the absence of the non-stick inducing component; and
        (v) at least one component that promotes hydrolysis, wherein said component is talc, and wherein the gum base that contains the at least one component that promotes hydrolysis will degrade faster than a gum base that does not contain the at least one component that promotes hydrolysis; and
    (b) combining said gum base with at least one component selected from the group consisting of sweeteners, flavors, physiological cooling agents, warming agents, tingling agents, and combinations thereof.

12. A method of increasing the degradability of a chewing gum base comprising:
    (a) providing a gum base comprising:
        (i) about 5% to about 10% by weight based on the weight of the gum base of at least one salt of a polymer comprising hydrolyzable units, wherein said polymer is selected from the group consisting of a copolymer of methyl vinyl ether and maleic anhydride, a copolymer of polystyrene and maleic anhydride, and combinations thereof, wherein said gum base has increased degradability and/or reduced-stick properties in the presence of the salt of the polymer comprising hydrolyzable units as compared to in the absence of the salt of the polymer comprising hydrolyzable units;
        (ii) an elastomer;
        (iii) a solvent or softener for said elastomer;
        (iv) a non-stick inducing component consisting of one or more members selected from the group consisting of hydrogenated cottonseed oil, hydrogenated soybean oil, hydrogenated canola oil, hydrogenated olive oil, hydrogenated grape seed oil, hydrogenated peanut oil, hydrogenated sunflower oil, hydrogenated safflower oil, hydrogenated palm oil, hydrogenated cocoa butter, hydrogenated coconut oil, hydrogenated palm kernel oil, animal fats, fatty esters of sugars and phospholipids, wherein said gum base exhibits increased degradability and/or reduced-stick properties in the presence of the non-stick inducing component as compared to in the absence of the non-stick inducing component; and
        (v) at least one component that promotes hydrolysis, wherein said component is talc, and wherein the gum base that contains the at least one component that promotes hydrolysis will degrade faster than a gum base that does not contain the at least one component that promotes hydrolysis; and (b) exposing the chewing gum base to mastication in the oral cavity of an individual; wherein at least one hydrolyzable unit of the polymer begins to hydrolyze or hydrolyzes upon mastication in the oral cavity.

13. A method of increasing the degradability of a chewing gum base composition comprising:

(a) providing a gum base composition comprising:
(i) about 5% to about 10% by weight based on the weight of the gum base of at least one salt of a polymer comprising hydrolyzable units, wherein said polymer is selected from the consisting of a copolymer of methyl vinyl ether and maleic anhydride, a copolymer of polystyrene and maleic anhydride, and combinations thereof, wherein said gum base has increased degradability and/or reduced-stick properties in the presence of the salt of the polymer comprising hydrolyzable units as compared to in the absence of the salt of the polymer comprising hydrolyzable units;
(ii) an elastomer;
(iii) a solvent or softener for said elastomer;
(iv) a non-stick inducing component consisting of one or more members selected from the group consisting of hydrogenated cottonseed oil, hydrogenated soybean oil, hydrogenated canola oil, hydrogenated olive oil, hydrogenated grape seed oil, hydrogenated peanut oil, hydrogenated sunflower oil, hydrogenated safflower oil, hydrogenated palm oil, hydrogenated cocoa butter, hydrogenated coconut oil, hydrogenated palm kernel oil, animal fats, fatty esters of sugars and phospholipids, wherein said gum base exhibits increased degradability and/or reduced-stick properties in the presence of the non-stick inducing component as compared to in the absence of the non-stick inducing component; and
(v) at least one component that promotes hydrolysis, wherein said component is talc, and wherein the gum base that contains the at least one component that promotes hydrolysis will degrade faster than a gum base that does not contain the at least one component that promotes hydrolysis; and (b) contacting the chewing gum base with water; wherein at least one hydrolyzable unit of the polymer begins to hydrolyze or hydrolyzes upon contact with the water.

14. The method of claim 13, wherein said contacting with water comprises exposing the gum base composition to rain water.

15. A chewing gum composition comprising:

a) a gum base comprising:
(i) about 5% to about 10% by weight based on the weight of the gum base of a salt of a polymer comprising hydrolyzable units, wherein said polymer is selected from the group consisting of a copolymer of methyl vinyl ether and maleic anhydride, a copolymer of polystyrene and maleic anhydride, and combinations thereof, wherein said gum base has increased degradability and/or reduced-stick properties in the presence of the salt of the polymer comprising hydrolyzable units as compared to in the absence of the salt of the polymer comprising hydrolyzable units;
(ii) an elastomer;
(iii) a solvent or softener for said elastomer;
(b) at least one component selected from the group consisting of sweeteners, flavors, physiological cooling agents, warming agents, tingling agents, and combinations thereof;

(c) a non-stick inducing component consisting of one or more members selected from the group consisting of hydrogenated cottonseed oil, hydrogenated soybean oil, hydrogenated canola oil, hydrogenated olive oil, hydrogenated grape seed oil, hydrogenated peanut oil, hydrogenated sunflower oil, hydrogenated safflower oil, hydrogenated palm oil, hydrogenated cocoa butter, hydrogenated coconut oil, hydrogenated palm kernel oil, animal fats, fatty esters of sugars and phospholipids, wherein said gum base exhibits increased degradability and/or reduced-stick properties in the presence of the non-stick inducing component as compared to in the absence of the non-stick inducing component-stick component as compared to in the absence of the non-stick inducing component; and (d) at least one component that promotes hydrolysis, wherein said component is talc, and wherein the gum base that contains the at least one component that promotes hydrolysis will degrade faster than a gum base that does not contain the at least one component that promotes hydrolysis.

16. A chewing gum composition comprising:

(a) a gum base comprising:
(i) about 5% to about 10% by weight based on the weight of the gum base of a salt of a polymer comprising hydrolyzable units, wherein said polymer is selected from the group consisting of a copolymer of methyl vinyl ether and maleic anhydride, a copolymer of polystyrene and maleic anhydride, and combinations thereof, wherein said gum base has increased degradability and/or reduced-stick properties in the presence of the salt of the polymer comprising hydrolyzable units as compared to in the absence of the salt of the polymer comprising hydrolyzable units;
(ii) an elastomer;
(iii) a solvent or softener for said elastomer;
(iv) a non-stick inducing component consisting of one or more members selected from the group consisting of hydrogenated cottonseed oil, hydrogenated soybean oil, hydrogenated canola oil, hydrogenated olive oil, hydrogenated grape seed oil, hydrogenated peanut oil, hydrogenated sunflower oil, hydrogenated safflower oil, hydrogenated palm oil, hydrogenated cocoa butter, hydrogenated coconut oil, hydrogenated palm kernel oil, animal fats, fatty esters of sugars and phospholipids, wherein said gum base exhibits increased degradability and/or reduced-stick properties in the presence of the non-stick inducing component as compared to in the absence of the non-stick inducing component; and
(v) at least one component that promotes hydrolysis, wherein said component is of talc, and wherein the gum base that contains the at least one component that promotes hydrolysis will degrade faster than a gum base that does not contain the at least one component that promotes hydrolysis; and (b) at least one component selected from the group consisting of sweeteners, flavors, physiological cooling agents, warming agents, tingling agents, and combinations thereof; and (c) a photodegradation component.

17. A chewing gum product comprising:

(a) a gum base comprising:
(I) about 5% to about 10% by weight based on the weight of the gum base of a salt of a polymer comprising hydrolyzable units, wherein said polymer is selected from the group consisting of a copolymer of methyl vinyl ether and maleic anhydride, a copolymer of polystyrene and maleic anhydride, and combinations thereof, wherein said gum base has increased degradability and/or reduced-stick properties in the presence of the salt of the polymer comprising hydrolyzable units as compared to in the absence of the salt of the polymer comprising hydrolyzable units;

(ii) an elastomer;

(iii) a solvent or softener for said elastomer;

(iv) a non-stick inducing component consisting of one or more members selected from the group consisting of hydrogenated cottonseed oil, hydrogenated soybean oil, hydrogenated canola oil, hydrogenated olive oil, hydrogenated grape seed oil, hydrogenated peanut oil, hydrogenated sunflower oil, hydrogenated safflower oil, hydrogenated palm oil, hydrogenated cocoa butter, hydrogenated coconut oil, hydrogenated palm kernel oil, animal fats, fatty esters of sugars and phospholipids, wherein said gum base exhibits increased degradability and/or reduced-stick properties in the presence of the non-stick inducing component as compared to in the absence of the non-stick inducing component; and (v) at least one component that promotes hydrolysis, wherein said component is talc, and wherein the gum base that contains the at least one component that promotes hydrolysis will degrade faster than a gum base that does not contain the at least one component that promotes hydrolysis; and (b) at least one component selected from the group consisting of sweetener, flavors, physiological cooling agents, warming agents, tingling agents, and combinations thereof.

* * * * *